(12) United States Patent
Fukuda et al.

(10) Patent No.: US 11,168,462 B2
(45) Date of Patent: Nov. 9, 2021

(54) CONTROL METHOD FOR HYDRAULIC SYSTEM IN WORK MACHINE

(71) Applicant: KUBOTA CORPORATION, Osaka (JP)

(72) Inventors: Yuji Fukuda, Sakai (JP); Daiki Abe, Sakai (JP); Jun Tomita, Sakai (JP); Yuya Konishi, Sakai (JP); Ryosuke Kinugawa, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 16/848,849

(22) Filed: Apr. 15, 2020

(65) Prior Publication Data

US 2020/0240113 A1  Jul. 30, 2020

Related U.S. Application Data

(63) Continuation of application No. 15/473,632, filed on Mar. 30, 2017, now Pat. No. 10,648,156.

(30) Foreign Application Priority Data

Mar. 30, 2016 (JP) .................................. 2016-069469
Mar. 30, 2016 (JP) .................................. 2016-069470

(Continued)

(51) Int. Cl.
*E02F 9/22* (2006.01)
*F15B 13/044* (2006.01)
(Continued)

(52) U.S. Cl.
CPC .............. *E02F 9/22* (2013.01); *E02F 9/2235* (2013.01); *E02F 9/2246* (2013.01);
(Continued)

(58) Field of Classification Search
CPC ....... E02F 9/2225; E02F 9/2296; E02F 9/128; E02F 9/2267; E02F 9/22; F16H 61/4157; B60T 13/22
See application file for complete search history.

(56) References Cited

U.S. PATENT DOCUMENTS

9,316,310 B2 * 4/2016 Kinugawa ............. F16H 61/421

FOREIGN PATENT DOCUMENTS

JP   07-38703 U    7/1995
JP   07-293508    11/1995
(Continued)

OTHER PUBLICATIONS

Office Action issued by the U.S. Patent and Trademark Office for the U.S. Appl. No. 15/473,632, dated May 17, 2018.
(Continued)

*Primary Examiner* — Abiy Teka
(74) *Attorney, Agent, or Firm* — Mori & Ward, LLP

(57) ABSTRACT

A hydraulic system for a work machine includes a travel hydraulic device which changes a travel speed in accordance with switching positions of a hydraulic switch valve. A controller controls a proportional valve so as to change a pressure of an operation fluid at an increasing rate over a time while the hydraulic switch valve is switched from a first switching position to a second switching position to increase the travel speed from a first speed to a second speed, and at a decreasing rate over the time while the hydraulic switch valve is switched from the second switching position to the first switching position to decrease the travel speed from the second speed to the first speed. A magnitude of the increasing rate is different from one of the decreasing rate to output an operation fluid.

10 Claims, 53 Drawing Sheets

(30) Foreign Application Priority Data

Mar. 30, 2016 (JP) .................................. 2016-069471
Mar. 31, 2016 (JP) .................................. 2016-072870

(51) Int. Cl.
*F15B 11/16* (2006.01)
*E02F 3/34* (2006.01)

(52) U.S. Cl.
CPC .......... *E02F 9/2267* (2013.01); *F15B 11/163* (2013.01); *F15B 13/0442* (2013.01); *E02F 3/3414* (2013.01)

(56) References Cited

FOREIGN PATENT DOCUMENTS

| JP | 2010-078047 | 4/2010 |
| JP | 2013-036276 | 2/2013 |
| JP | 2015-218537 | 12/2015 |

OTHER PUBLICATIONS

Office Action with Form PTO-892 Notice of References Cited issued by the U.S. Patent and Trademark Office for the U.S. Appl. No. 15/473,632, filed Feb. 4, 2019.
Office Action issued by the U.S. Patent and Trademark Office for the U.S. Appl. No. 15/473,632, filed May 3, 2019.
Office Action issued by the U.S. Patent and Trademark Office for the U.S. Appl. No. 15/473,632, filed May 31, 2019.
Office Action issued by the U.S. Patent and Trademark Office for the U.S. Appl. No. 15/473,632, dated Jan. 7, 2020.

* cited by examiner

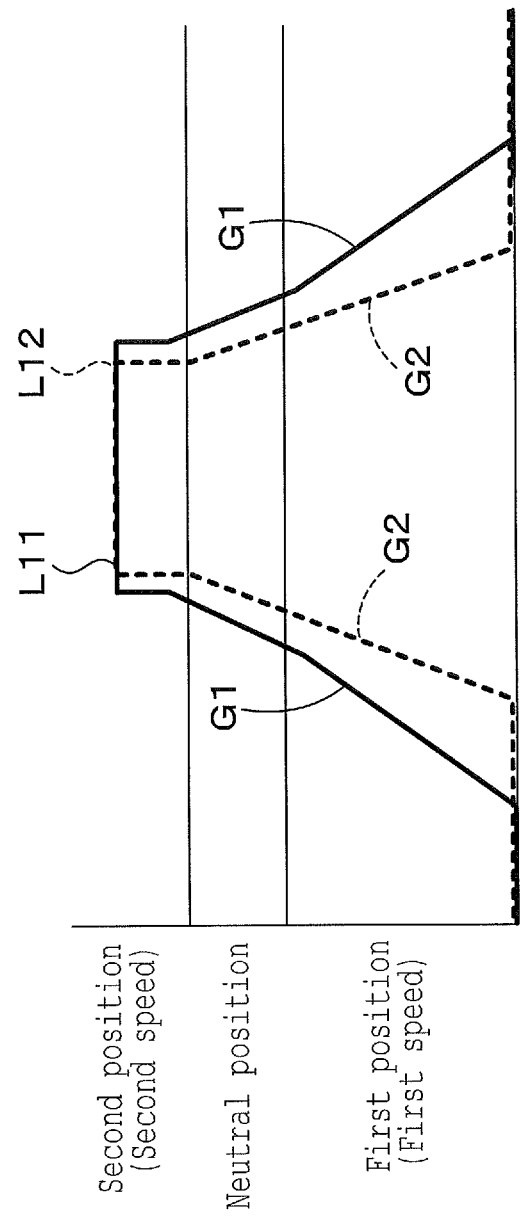

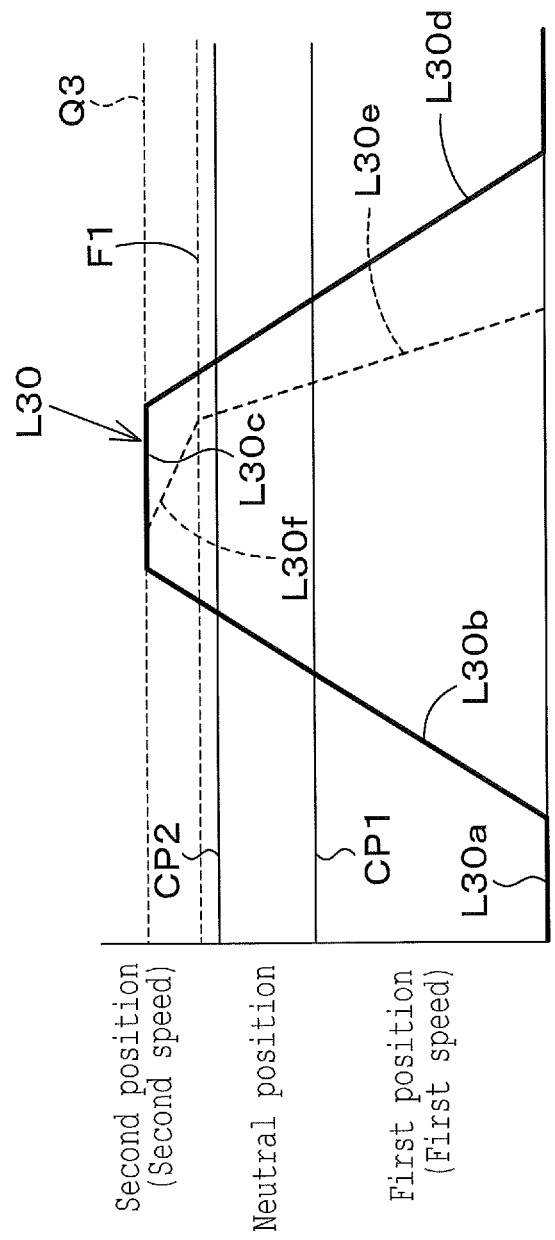

CONTROL METHOD FOR HYDRAULIC SYSTEM IN WORK MACHINE

CROSS-REFERENCE TO RELATED APPLICATIONS

The present application is a continuation application of the U.S. patent application Ser. No. 15/473,632 filed Mar. 30, 2017, which claims priority under 35 U.S.C. § 119 to Japanese Patent Application No. 2016-069469, filed Mar. 30, 2016, to Japanese Patent Application No. 2016-069470, filed Mar. 30, 2016, to Japanese Patent Application No. 2016-069471, filed Mar. 30, 2016, and to Japanese Patent Application No. 2016-072870, filed Mar. 31, 2016. The contents of these applications are incorporated herein by reference in their entirety.

BACKGROUND OF THE INVENTION

Field of the Invention

The present invention relates to a hydraulic system for a work machine.

Discussion of the Background

Japanese Patent Application Publication No. 2013-36276 is known and discloses a hydraulic system for a work machine such as a skid steer loader, a compact truck loader, and the like.

Japanese Patent Application Publication No. 2013-36276 discloses a hydraulic system for traveling including an HST motor capable of being switched between a low speed (a first speed) and a high speed (a second speed), a hydraulic switch valve capable of switching the HST motor to the first speed and to the second speed, and a direction switch valve capable of being switched to a plurality of positions. In Japanese Patent Application Publication No. 2013-36276, the direction switch valve is switched to a predetermined position, thereby changing a pressure of an operation fluid applied to a pressure-receiving portion of the hydraulic switch valve. As the result, the hydraulic switch valve is switched to the first position corresponding to the first speed and switched the second position corresponding to the second speed. That is, the hydraulic system for traveling switches the direction switch valve to the predetermined position, thereby switching the hydraulic switch valve (the HST motor) to the first speed and to the second speed.

In addition, a hydraulic system for operating switches a control valve (a hydraulic switch valve) connected to a hydraulic actuator by a fluid tube, thereby operating the hydraulic actuator.

SUMMARY OF THE INVENTION

According to one aspect of the present invention, a hydraulic system for a work machine includes a hydraulic bump, a hydraulic switch valve, a proportional valve, a travel hydraulic device, and the controller. The hydraulic pump outputs an operation fluid. The hydraulic switch valve is switched among switching positions in accordance with a pressure of the operation fluid. The proportional valve changes the pressure of the operation fluid applied to the hydraulic switch valve. The travel hydraulic device changes a travel speed in accordance with the switching positions of the hydraulic switch valve. The hydraulic switch valve is switched between a first switching position allowing the travel speed to be a first speed and a second switching position allowing the travel speed to be a second speed greater than the first speed. The controller controls the proportional valve so as to change the pressure of the operation fluid at an increasing rate over a time while the hydraulic switch valve is switched from the first switching position to the second switching position to increase the travel speed from the first speed to the second speed, and at a decreasing rate over the time while the hydraulic switch valve is switched from the second switching position to the first switching position to decrease the travel speed from the second speed to the first speed. A magnitude of the increasing rate is different from one of the decreasing rate.

According to another aspect of the present invention, a hydraulic system for a work machine includes a hydraulic pump, a hydraulic switch, a proportional valve, a travelling hydraulic device, and a controller. The hydraulic pump outputs an operation fluid. The hydraulic switch valve is switched among switching positions in accordance with a pressure of the operation fluid. The proportional valve changes the pressure of the operation fluid applied to the hydraulic switch valve. The travel hydraulic device changes a travel speed in accordance with the switching positions of the hydraulic switch valve. The hydraulic switch valve is switched between a first switching position allowing the travel speed to be a first speed and a second switching position allowing the travel speed to be a second speed greater than the first speed. The controller controls the proportional valve so as to increase the pressure of the operation fluid immediately from the minimum pressure until a first intermediate pressure greater than the minimum pressure, to increase the pressure of the operation fluid gradually until a second intermediate pressure greater than the first intermediate pressure, and then to increase the pressure of the operation fluid immediately to the maximum pressure.

According to further aspect of the present invention, a hydraulic system for a work machine includes a hydraulic bump, a hydraulic switch valve, a proportional valve, a travel hydraulic device, and a controller. The hydraulic pump outputs an operation fluid. The hydraulic switch valve is switched among switching positions in accordance with a pressure of the operation fluid. The proportional valve changes the pressure of the operation fluid applied to the hydraulic switch valve. The travel hydraulic device changes a travel speed in accordance with the switching positions of the hydraulic switch valve. The hydraulic switch valve is switched between a first switching position allowing the travel speed to be a first speed and a second switching position allowing the travel speed to be a second speed greater than the first speed. The controller controls the proportional valve so as to decrease the pressure of the operation fluid immediately from the maximum pressure until a third intermediate pressure less than the maximum pressure, to decrease the pressure of the operation fluid gradually until a fourth intermediate pressure less than the third intermediate pressure, and then to decrease the pressure of the operation fluid immediately to the minimum pressure.

DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 4B is a view illustrating a relation between the pilot pressure and the position of the hydraulic switch according to the first embodiment, the relation being present in a case where the operation valve is controlled based on a traveling speed;

FIG. 29A is a view illustrating a relation between a pilot pressure and a position of a hydraulic switch valve according to the seventh embodiment, the relation being obtained in a case where a detection pressure is lowered from a set pressure to a predetermined pressure or less;

DESCRIPTION OF THE EMBODIMENTS

Figure 1:
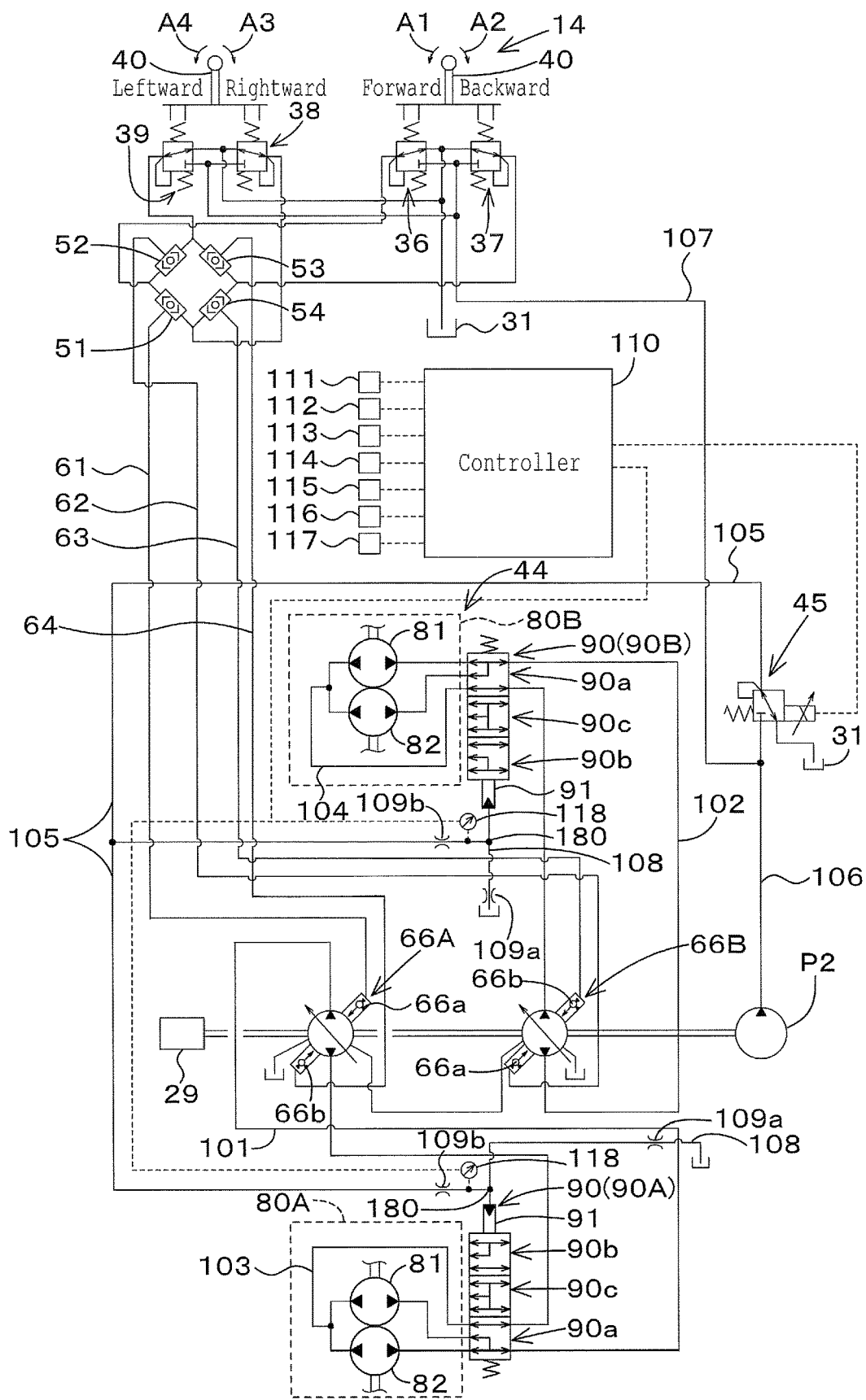
FIG. 1 is a view illustrating a hydraulic system for traveling according to a first embodiment of the present invention.

The embodiments will now be described with reference to the accompanying drawings, wherein like reference numerals designate corresponding or identical elements throughout the various drawings. The drawings are to be viewed in an orientation in which the reference numerals are viewed correctly.

Referring to drawings, embodiments of the present invention, a hydraulic system for a work machine, will be described below.

First Embodiment

Figure 45:
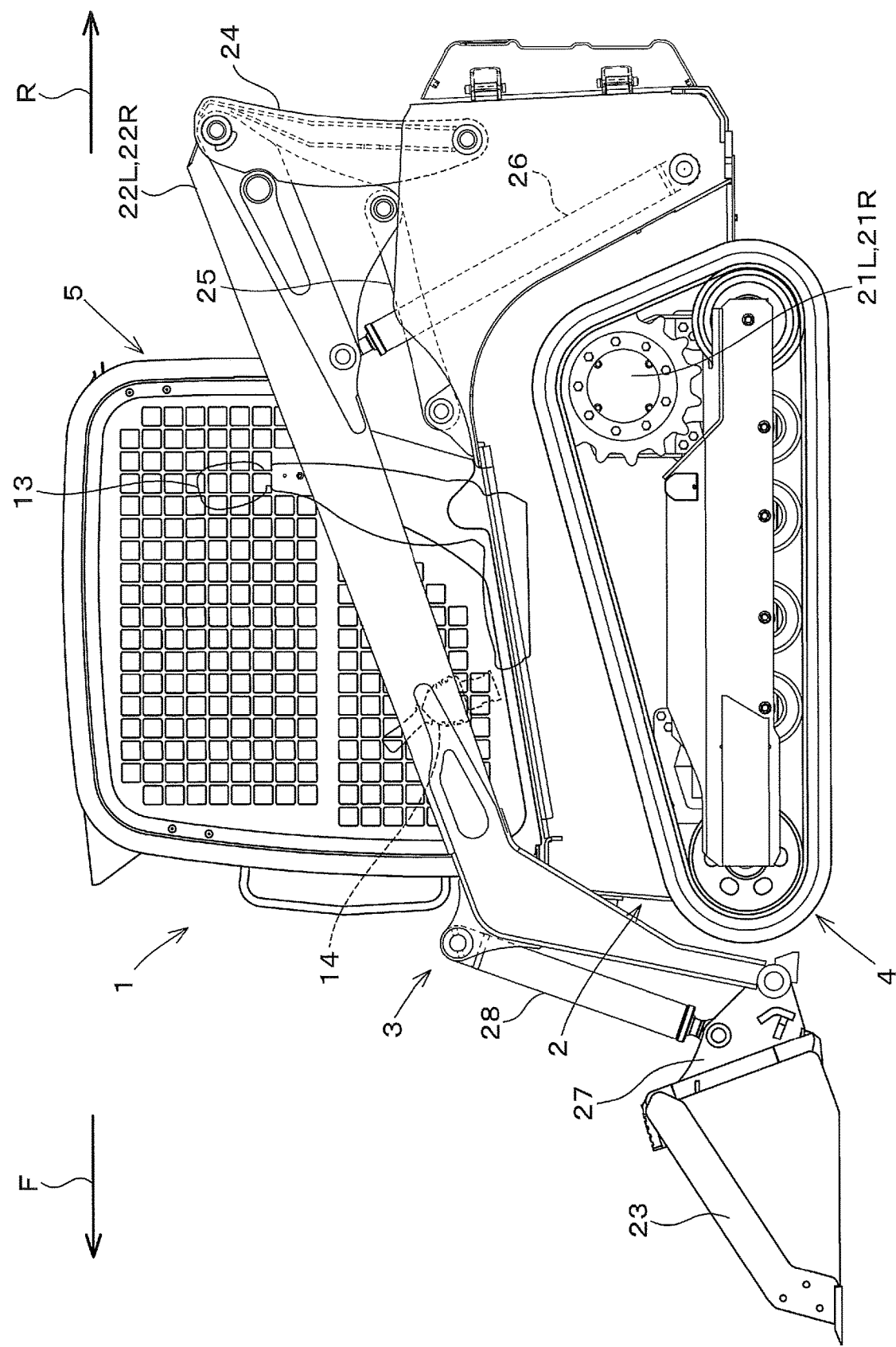
FIG. 45 is a side view illustrating a track loader that is an example of a work machine according to the embodiments of the present invention.
Figure 46:
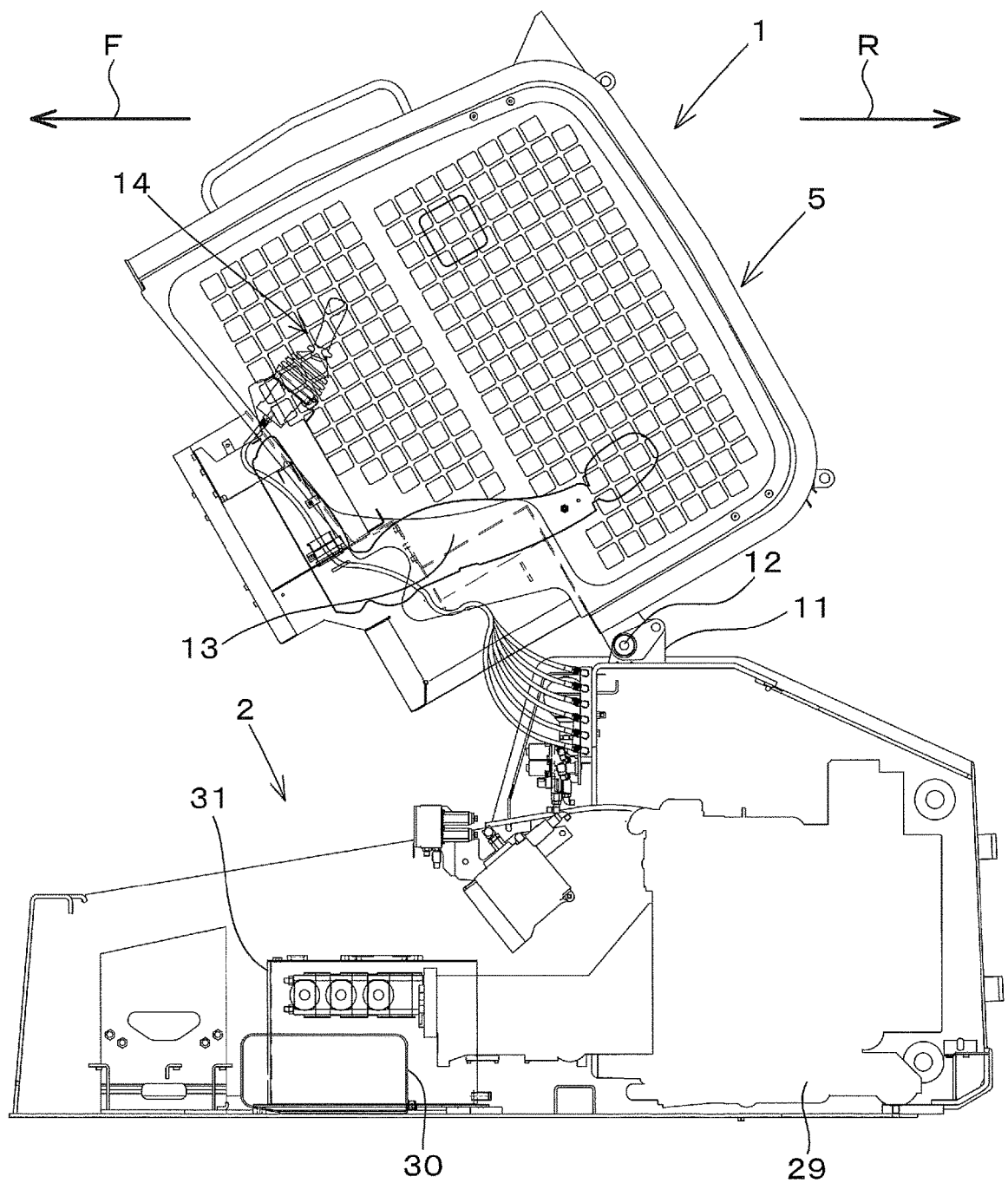
FIG. 46 is a side view illustrating a part of the track loader lifting up a cabin according to the embodiments of the present invention.

An overall configuration of a work machine 1 will be explained. FIG. 45 and FIG. 46 show a track loader as an example of the work machine 1. The work machine 1 is not limited to the track loader, and may be a tractor, a skid steer loader, a compact track loader, a backhoe, and the like.

In explanations of the embodiment of the present invention, a forward direction (a direction shown by an arrowed line F in FIG. 45) corresponds to a front side of an operator seating on an operator seat of the work machine 1, a backward direction (a direction shown by an arrowed line R in FIG. 45) corresponds to a back side of the operator, a leftward direction (a direction vertically extending from a back surface to a front surface of FIG. 45) corresponds to a left side of the operator, and a rightward direction (a direction vertically extending from the front surface to the back surface of FIG. 45) corresponds to a right side of the operator.

As shown in FIG. 45, the work machine 1 includes a machine body 2, an operation device 3, and a travel device 4. The operation device 3 is attached to the machine body 2. The travel device 4 supports the machine body 2. A cabin 5 is mounted on the machine body 2 at a front portion of an upper portion of the machine body 2. A rear portion of the cabin 5 is supported by a support bracket 11 attached on the machine body 2. The cabin 5 is swingable about a support shaft 12 included in the support bracket 12. A front portion of the cabin 5 is capable of being supported by the front portion of the cabin 5.

An operator seat 13 is installed inside the cabin 5. A travel operation device 14 is arranged on one side (for example, a left side) of the operator seat 13. The travel operation device 14 is used for operating the travel device 4.

The travel device 4 is constituted of a travel hydraulic device having a crawler configuration. The travel device 4 is disposed under the left side of the machine body 2 and under the right side of the machine body 2. The travel device 4 is capable of traveling with use of a driving power of a travel hydraulic device 44 having a configuration to be driven by a hydraulic pressure. The travel hydraulic device 44 will be explained below.

The operation device 3 includes a boom 22L, a boom 22R, and a bucket 23 (an operation tool). The bucket 23 is attached to tip portions of the boom 22L and the boom 22R. The boom 22L is arranged on the left of the machine body 2. The boom 22R is arranged on the right of the machine body 2.

A connection member (not shown in the drawings) are arranged between the boom 22L and the boom 22R. The boom 22L is connected to the boom 22R by the connection member. The boom 22L is supported by a first lift link 24. The boom 22R is supported by a second lift link 25.

A lift cylinder 26 is arranged between a rear lower portion of the machine body 2 and a base portion of the boom 22L, and corresponds to the boom 22L. Another lift cylinder 26 is arranged between a rear lower portion of the machine body 2 and a base portion of the boom 22R, and corresponds to the boom 22R. Each of the lift cylinders 26 is constituted of a double action hydraulic cylinder.

The lift cylinders 26 are stretched and shortened simultaneously, and in this manner the boom 22L and the boom 22R are swung upward and downward simultaneously. An attachment bracket 27 is pivotally coupled to a tip end of the left boom 22L, and thus is capable of being turned about a lateral axis extending from the left to the right. Another attachment bracket 27 is pivotally coupled to a tip end of the left boom 22R, and thus is capable of being turned about a lateral axis extending from the left to the right. A back surface of the bucket 23 is attached to the attachment bracket 27 disposed on the left and to the attachment bracket 27 disposed on the right.

In addition, a tilt cylinder 28 is disposed between the attachment bracket 27 and an intermediate portion of the tip end of the boom 22L, and corresponds to the boom 22L. Another tilt cylinder 28 is disposed between the attachment bracket 27 and an intermediate portion of the tip end of the boom 22R, and corresponds to the boom 22R. Each of the tilt cylinders 28 is constituted of a double action hydraulic cylinder. The tilt cylinders 28 are stretched and shortened, and thus the bucket 23 is swung (in a shoveling operation and a dumping operation).

The bucket 23 is configured to be attached to and detached from the attachment bracket 27. Various types of attachments (a hydraulically-driven operation tool described later having a hydraulic actuator) can be attached to the attachment brackets 27 after detachment of the bucket 23, and thus configurations for various types of operations other than the excavation (or another types of excavation) can be provided.

An engine 29 (a prime mover 29) is disposed on a rear portion of a bottom wall 6 in the machine body (vehicle body) 2. The engine 29 (the prime mover 29) is a diesel engine, a motor generator, or the like. A fuel tank 30 and an operation fluid tank 31 are disposed on a front portion of the bottom wall in the machine body 2.

The hydraulic system for the work machine according to the embodiment will be explained below.

Figure 2:
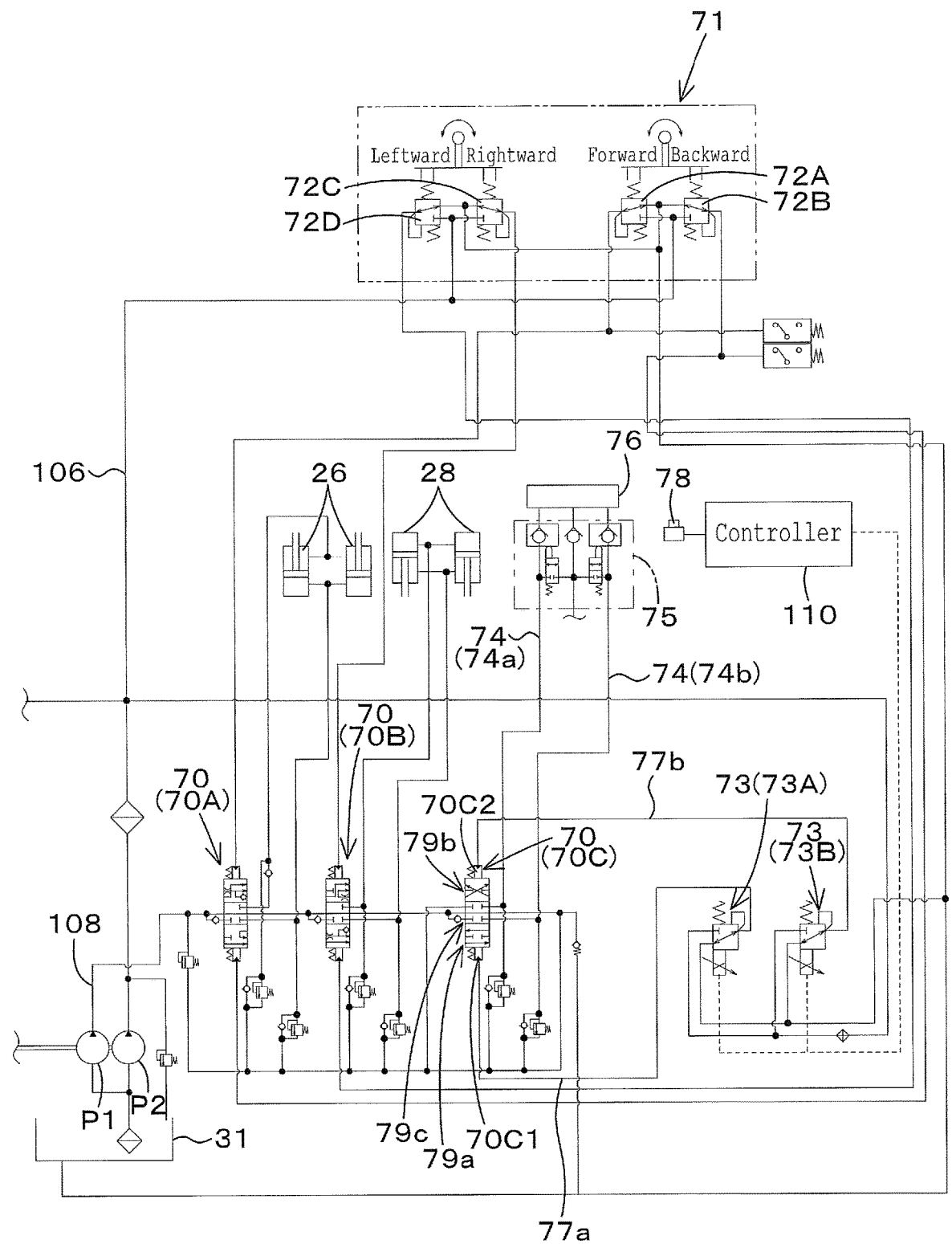
FIG. 2 is a view illustrating a hydraulic system for operating according to the first embodiment.

FIG. 1 is a view illustrating a hydraulic system for traveling, the hydraulic system being employed for the work machine. FIG. 2 is a view illustrating a hydraulic system for operating, the hydraulic system being employed for the work machine.

As shown in FIG. 1 and FIG. 2, the hydraulic systems (the hydraulic systems for traveling and the hydraulic system for operating) includes a first hydraulic pump P1 and the second hydraulic pump P2. Each of the first hydraulic pump P1 and the second hydraulic pump P2 that are hydraulic pumps is constituted of a constant displacement gear pump. Each of the first hydraulic pump P1 and the second hydraulic pump P2 may be a variable displacement pump having a swash plate, the variable displacement pump being configured to be driven by a motive power of the engine 29.

The first hydraulic pump P1 (a main pump) is used for driving a hydraulic actuator of the attachment attached to a tip portion of the lift cylinder 26, the tilt cylinder 28, or the boom 22.

The second hydraulic pump P2 (a pilot pump or a charge pump) is used for supplying a pressure of an operation fluid, the pressure serving mainly as a control pressure or a signal pressure. For convenience of the explanation, the operation fluid serving as the control pressure or the signal pressure is hereinafter referred to as "a pilot fluid", and a pressure of the pilot fluid is hereinafter referred to as "a pilot pressure".

The hydraulic system includes a travel hydraulic device 44, an operation valve 45, and a hydraulic switch valve 90. The travel hydraulic system 44 is operated by the operation fluid and thus is capable of changing a speed. That is, the travel hydraulic device 44 is capable of changing a revolution speed of a travel motor, the revolution speed being a number of rotations of the travel motor. The travel motor will be explained later. In other words, the travel hydraulic device 44 is capable of change a thrust power of the travel device 4 in traveling.

The travel hydraulic device 44 includes a first travel hydraulic pump 66A, a second travel hydraulic pump 66B, a first travel motor 80A, and a second travel motor 80B. The hydraulic switch valve 90 includes a hydraulic switch valve 90A and a second hydraulic switch valve 90B.

The first travel hydraulic pump 66A is connected to the first travel motor 80A by a first circulation fluid tube (a first circulation fluid path) 101. The first circulation fluid tube 101 is configured to circulate the operation fluid. The second travel hydraulic pump 66B is connected to the second travel motor 80B by a second circulation fluid tube (a second circulation fluid path) 102. The second circulation fluid tube 102 is configured to circulate the operation fluid.

The first hydraulic switch valve 90A is connected to the first travel motor 80A by a fluid tube (a fluid path) 103. The second hydraulic switch valve 90B is connected to the second travel motor 80B by a fluid tube (a fluid path) 104. In addition, the first hydraulic switch valve 90A, the second hydraulic switch valve 90B, and the operation valve 45 are connected to each other by a fluid tube (a first fluid tube) 105. A discharge fluid tube (a discharge fluid path) 108 is connected to a pressure-receiving portion 91 of the hydraulic switch valve (each of the first hydraulic switch valve 90A and the second hydraulic switch valve 90B).

The discharge fluid tube 108 discharges the operation fluid included in the first fluid tube 105 (the operation fluid applied to the pressure-receiving portion 91) to the outside. For example, the discharge fluid tube 108 is connected to the first fluid tube 105 at one end of the discharge fluid tube 108, and is connected to an operation fluid tank 31 at the other end of the discharge fluid tube 108. The discharge fluid tube 108 is connected not only to the operation fluid tank 31. The discharge fluid tube 108 may be connected to a suction port of the hydraulic pump or to the other portions. The discharge fluid tube 108 is provided with a first throttle (for example, an orifice) 109a.

In addition, a second throttle (for example, an orifice) 109b is arranged to a portion between the operation valve 45 and a connecting portion 180. The connecting portion 180 connects the first fluid tube 105 to the discharge fluid tube 108. The first throttle 109a has an inner diameter (a throttle diameter) substantially equal to an inner diameter (a throttle diameter) of the second throttle 109b.

The discharge fluid tube 108 is disposed on the first fluid tube 105, and further the second throttle 109b is disposed on the first fluid tube 105. Thus, a pressure of the operation fluid can be easily controlled in a section from the operation valve 45 to the second throttle 109b. In particular, the operation valve 45 is capable of being controlled independently from a temperature of the operation fluid, and thus the pressure of the operation fluid can be stably controlled independently from the temperature of the operation fluid, the pressure of the operation fluid being in the section from the operation valve 45 to the second throttle 109b. The throttle diameters of the first throttle 109a and the second throttle 109b are not limited to the diameters mentioned above.

The operation valve 45 is connected to the second hydraulic pump P2 by a fluid tube (a fluid path) 106. The first travel hydraulic pump 66A and the second travel dynamic pump 66B are connected to the second hydraulic pump P2 by a fluid tube (a fluid path) not shown in the drawings. Thus, the operation fluid discharged from the second hydraulic pump P2 can be supplied to the first travel hydraulic pump 66A and the second travel hydraulic pump 66B.

The first travel hydraulic pump 66A is constituted of a variable displacement axial pump employing a swash plate, the variable displacement axial pump being configured to be driven by a motive power of the engine 29. In addition, the first travel hydraulic pump 66A includes a pressure-receiving portion 66a and a pressure-receiving portion 66b. The pilot pressures are applied to the pressure-receiving portion 66a and to the pressure-receiving portion 66b. The pilot pressures applied to the pressure-receiving portions 66a and 66b are capable of changing an angle of the swash plate. When the first travel hydraulic pump 66A changes the angle of the swash plate, the first travel hydraulic pump 66A changes a discharging angle and a discharge amount of the operation fluid, thereby changing a revolution output of the first travel motor 80A.

The second travel hydraulic pump 66B has a configuration similar to the configuration of the first travel hydraulic pump 66A. When the second travel hydraulic pump 66B changes the angle of the swash plate, the second travel hydraulic pump 66B changes a discharging angle and a discharge amount of the operation fluid, thereby changing a revolution output of the second travel motor 80B.

The first travel motor 80A is constituted of a cam motor (a radial piston motor). The first travel motor 80A is a variable displacement type that is capable of changing a size of capacity (a motor capacity) in operation. In this manner, the first travel motor 80A is capable of changing the motor capacity to change a torque and a revolution speed of an output shaft. In particular, the first travel motor 80A includes a first motor 81 and a second motor 82.

The operation fluid is supplied to both of the first motor 81 and the second motor 82, and thus the motor capacity is increased. In this manner, the first travel motor 80A is set to a first speed. The operation fluid is supplied to any one of the first motor 81 and the second motor 82, and thus the motor capacity is decreased. In this manner, the first travel motor 80A is set to a second speed. The second travel motor 80B has a configuration similar to the configuration of the first travel motor 80A, and thus is capable of being switched to the first speed and to the second speed.

The first hydraulic switch valve 90A is a hydraulic switch valve having a plurality of positions, and is capable of switching the plurality of positions in accordance with the pilot pressure that is a pressure of the pilot fluid, and thus the first hydraulic switch valve 90A is a valve capable of switching the first travel motor 80A to the first speed and to the second speed. The first hydraulic switch valve 90A is a three-position switch valve capable of switching three positions, a first position 90a, a second position 90b, and a neutral position (a third position) 90c, for example.

In particular, when the pressure of the pilot fluid applied to the pressure-receiving portion 91 of the first hydraulic switch valve 90A is less than a switching pressure that is a predetermined pressure (a threshold pressure), the hydraulic switch valve 90 is held at the first position 90a. When the first hydraulic switch valve 90A is at the first position 90a, the operation fluid is supplied to both of the first motor 81 and the second motor 82, and thus the first travel motor 80A is set to be in the first speed.

When the pressure of the pilot fluid applied to the pressure-receiving portion 91 of the first hydraulic switch valve 90A is equal to or more than the switching pressure, the hydraulic switch valve 90 is switched to the second position 90b through the neutral position 90c. When the first hydraulic switch valve 90A is at the second position 90b, the operation fluid is supplied only to the first motor 81, and thus the first travel motor 80A is set to be in the second speed.

The second hydraulic switch valve 90B has a configuration similar to the configuration of the first hydraulic switch valve 90A. The second hydraulic switch valve 90B is capable of switching the second travel motor 80B to the first speed and to the second speed.

The operation valve 45 is a valve capable of changing the pressure of the operation fluid (a flow rate) applied to the hydraulic switch valves (the first hydraulic switch valve 90A and the second hydraulic switch valve 90B). The operation valve 45 is capable of changing an opening aperture in accordance with a control signal outputted from a control device 110 (a controller 110) described later. In the embodiment, the operation valve 45 is an electromagnetic proportional valve (a proportional valve), and thus changes the opening aperture in accordance with the control signal. The operation valve 45 changes the opening aperture to change the pressure of the operation fluid applied (supplied) to the hydraulic switch valves.

Figure 3:
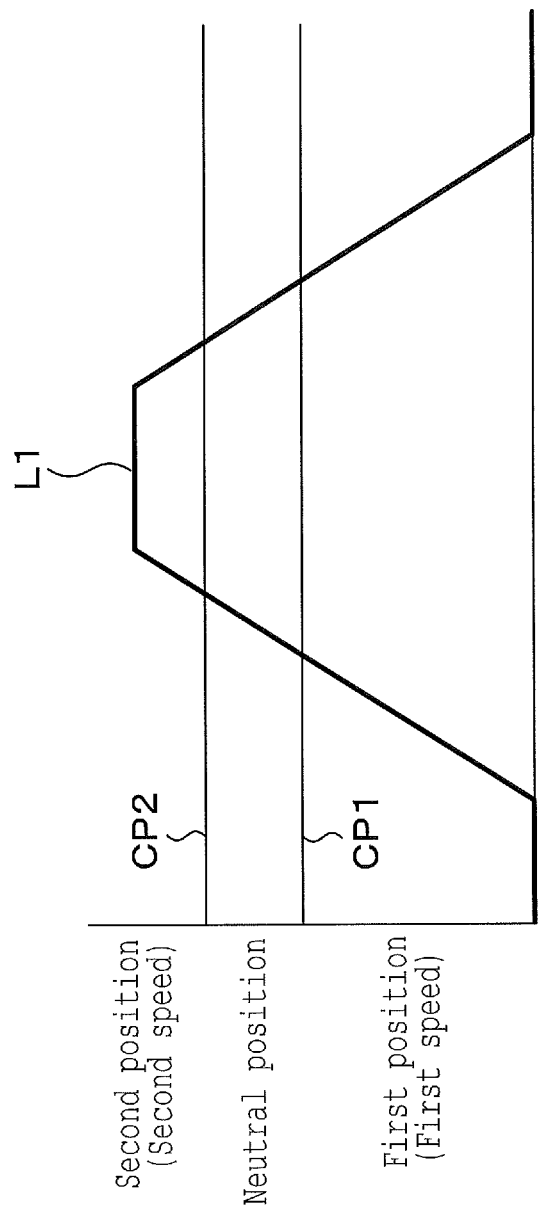
FIG. 3 is a view illustrating a relation between a pilot pressure and a position of a hydraulic switch valve according to the first embodiment.

FIG. 3 is a view illustrating a relation between the pressure of the operation fluid (the pilot pressure) and the positions of the hydraulic switch valves (the first hydraulic switch valve 90A and the second hydraulic switch valve 90B), the relation being obtained in operating the operation valve. A speed-changing pressure L1 shown in FIG. 3 is the pilot pressure applied to the pressure-receiving portion of the hydraulic switch valve. For convenience of the explanation, the operation valve 45 is hereinafter referred to as the proportional valve 45. In addition, the first hydraulic switch valve 90A and the second hydraulic switch valve 90B may be referred to as the hydraulic switch valves, and the first travel motor 80A and the second travel motor 80B may be referred to as the travel motors.

As shown in the speed-changing pressure L1 of FIG. 3, when the proportional valve 45 is closed (fully closed), the pilot pressure applied to the pressure-receiving portions 91 is substantially zero, the pressure-receiving portions 91 being included in the first hydraulic switch valve 90A and the second hydraulic switch valve 90B. As the result, the hydraulic switch valves (the first hydraulic switch valve 90A and the second hydraulic switch valve 90B) are set to be in the first position 90a. When the hydraulic switch valve is at the first position 90a, the travel motors (the first travel motor 80A and the second travel motor 80B) are at the first speed.

Then, when the proportional valve 45 is gradually opened from the fully-closed state to increase the opening aperture of the proportional valve 45, the pilot pressure applied to the pressure-receiving portions 91 is increased based on the opening aperture of the proportional valve 45, the pressure-receiving portions 91 being increased in the first hydraulic switch valve 90A and the second hydraulic switch valve 90B. When the pilot pressure applied to the pressure-receiving portions 91 exceeds a boundary pressure (a switching pressure) CP1 that is a border between the first position 90a and the neutral position 90c, the pressure-receiving portions 91 being included in the first hydraulic switch valve 90A and the second hydraulic switch valve 90B, the first hydraulic switch valve 90A and the second hydraulic switch valve 90B are set to be in the neutral position 90c.

When the pilot pressure applied to the pressure-receiving portions 91 exceeds a boundary pressure (a switching pressure) CP2 that is a border between the neutral position 90c and the second position 90b, the pressure-receiving portions 91 being included in the first hydraulic switch valve 90A and the second hydraulic switch valve 90B, the first hydraulic switch valve 90A and the second hydraulic switch valve 90B are set to be in the second position 90b. When the hydraulic switch valves are at the second position 90b, the travel motors are at the second speed.

That is, the pilot pressure applied to the hydraulic switch valve is proportional to the opening aperture of the proportional valve 45, and thus the travel motor is switched to the first speed and to the second speed in accordance with the opening aperture of the proportional valve 45.

Then, as shown in FIG. 1, the fluid tube 106 is branched at an upper stream portion of the proportional valve 45, and a fluid tube (a fluid path) 107 branched from the fluid tube 106 is connected to the travel operation device 14.

The travel operation device 14 includes a forward remote control valve 36, a backward remote control valve 37, a right-turn remote control valve 38, a left-turn remote control valve 39, and a travel lever 40.

The travel operation device 14 includes a first shuttle valve 51, a second shuttle valve 52, a third shuttle valve 53, and a fourth shuttle valve 54. The remote control valves 36, 37, 38, and 39 are operated by a travel lever 40, that is, the travel lever 40 is shared with the remote control valves 36, 37, 38, and 39.

The remote control valves 36, 37, 38, and 39 change the pressure of the operation fluid in accordance with the operation of the travel lever 40 (an operation member), and supply the operation fluid having the changed pressure to the travel hydraulic device 14.

In the embodiment, the remote control valves 36, 37, 38, and 39 are operated by the singular travel lever 40. However, a plurality of the travel levers 40 may be employed. For example, a first travel lever may be arranged on one side (the left side) of the operator seat 13, a second travel lever may be arranged on the other side (the right side) of the operator seat 13. In this manner, the remote control valves 36, 37, 38, and 39 may be operated by the two travel levers.

The travel lever 40 is capable of being tilted forward, backward, toward a width direction perpendicular to the forward direction and the backward direction, and toward a diagonal direction from a neutral position. When the travel lever 40 is tilted, the remote control valves 36, 37, 38, and 39 of the travel operation device 14 are operated. In this manner, the pilot pressure is proportional to an operation extent of the travel lever 40 from the neutral position, and is outputted from secondary ports of the remote control valves 36, 37, 38, and 39.

When the travel lever 40 is tilted forward (toward a direction indicated by an arrowed line A1 in FIG. 1), the forward remote control valve 36 is operated. In this manner, the pilot pressure is outputted from the remote control valve 36. The pilot pressure is applied to the pressure-receiving portion 66a of the first travel hydraulic pump 66A through a fluid tube 61 from the first shuttle valve 51, and is applied to the pressure-receiving portion 66a of the second travel hydraulic pump 66B through a fluid tube 62 from the second shuttle valve 52.

In this manner, the output shafts of the first travel motor 80A and the second travel motor 80B revolve normally (revolve forward) at a speed proportional to an extent of the tilting of the travel lever 40, and thus the work machine 1 travels forward and straight.

In addition, when the travel lever 40 is tilted backward (toward a direction indicated by an arrowed line A2 in FIG. 1), the backward remote control valve 37 is operated. In this manner, the pilot pressure is outputted from the remote control valve 37. The pilot pressure is applied to the pressure-receiving portion 66b of the first travel hydraulic pump 66A through a fluid tube 64 from the third shuttle valve 53, and is applied to the pressure-receiving portion 66b of the second travel hydraulic pump 66B through a fluid tube 63 from the fourth shuttle valve 54.

In this manner, the output shafts of the first travel motor 80A and the second travel motor 80B revolve reversely (revolve backward) at a speed proportional to an extent of the tilting of the travel lever 40, and thus the work machine 1 travels backward and straight.

In addition, when the travel lever 40 is tilted rightward (toward a direction indicated by an arrowed line A3 in FIG. 1), the right-turn remote control valve 38 is operated. In this manner, the pilot pressure is outputted from the right-turn remote control valve 38. The pilot pressure is applied to the pressure-receiving portion 66a of the first travel hydraulic pump 66A through the fluid tube 61 from the first shuttle valve 51, and is applied to the pressure-receiving portion 66b of the second travel hydraulic pump 66B through the fluid tube 63 from the fourth shuttle valve 54.

In this manner, the output shaft of the first travel motor 80A revolves normally, the output shaft of the second travel motor 80B revolve reversely, and thus the work machine 1 turns rightward.

In addition, when the travel lever 40 is tilted leftward (toward a direction indicated by an arrowed line A4 in FIG. 1), the left-turn remote control valve 39 is operated. In this manner, the pilot pressure is outputted from the left-turn remote control valve 39. The pilot pressure is applied to the pressure-receiving portion 66a of the second travel hydraulic pump 66B through the fluid tube 62 from the second shuttle valve 52, and is applied to the pressure-receiving portion 66b of the first travel hydraulic pump 66A through the fluid tube 64 from the third shuttle valve 53.

In this manner, the output shaft of the first travel motor 80A revolves inversely, the output shaft of the second travel motor 80B revolve normally, and thus the work machine 1 turns leftward.

In addition, when the travel lever 40 is tilted diagonally (toward a diagonal direction indicated), a differential pressure is generated between the pilot pressures applied to the pressure-receiving portions 66a and 66b of the first travel hydraulic pump 66A and the second travel hydraulic pump 66B. The differential pressure determines the revolution directions and the revolution speeds of the output shafts of the first travel hydraulic pump 66A and the second travel hydraulic pump 66B. In this manner, the work machine 1 turns rightward or leftward traveling forward or backward.

That is, when the travel lever 40 is tilted diagonally forward and leftward, the work machine 1 turns leftward traveling forward at a speed corresponding to a tilting angle of the travel lever 40. When the travel lever 40 is tilted diagonally forward and rightward, the work machine 1 turns rightward traveling forward at a speed corresponding to a tilting angle of the travel lever 40.

When the travel lever 40 is tilted diagonally backward and leftward, the work machine 1 turns leftward traveling backward at a speed corresponding to a tilting angle of the travel lever 40. When the travel lever 40 is tilted diagonally backward and rightward, the work machine 1 turns rightward traveling backward at a speed corresponding to a tilting angle of the travel lever 40.

The hydraulic system for operating according to the embodiment will be explained below.

As shown in FIG. 2, a fluid tube (a fluid path) 108 is connected to the first hydraulic pump P1. A plurality of control valves 70 are connected to the fluid tube 108. The plurality of control valves 70 include a boom control valve 70A, a bucket control valve 70B, and an auxiliary control valve 70C. The boom control valve 70A is a three-position switch valve having a direct-acting spool that is configured to be driven by the pilot pressure, and controls the lift cylinder 26.

The bucket control valve 70B is a three-position switch valve having a direct-acting spool that is configured to be driven by the pilot pressure, and controls the tilt cylinder 28. The auxiliary control valve 70C is a three-position switch valve having a direct-acting spool that is configured to be driven by the pilot pressure, and controls a hydraulic actuator 76 of the auxiliary attachment.

The auxiliary control valve 70C is capable of being switched to a first position 79a, to a second position 79b, and to a third position 79c by the pilot pressure. In the embodiment, the third position 79c is a neutral position.

The boom 22 and the bucket 23 are operated by an operation member 71. The operation member 71 is disposed around the operator seat 13. The operation member 71 is supported to be capable of being tilted forward, backward, toward a width direction perpendicular to the forward direction and the backward direction, and toward a diagonal direction from a neutral position. When the operation member 71 is tilted, a remote control valve 72A, a remote control valve 72B, a remote control valve 72C, and a remote control valve 72D are operated. The remote control valves 72A to 72D are disposed below the operation member 71.

When the operation member 71 is tilted forward, the remote control valve 72A is operated to output the pilot pressure from the remote control valve 72A. The pilot pressure is applied to a pressure-receiving portion of the boom control valve 70A. Then, the operation fluid flowing into the boom control valve 70A is supplied to a rod side of the lift cylinder 26, and thus the booms (the boom 22L and the boom 22R) are moved downward.

When the operation member 71 is tilted backward, the remote control valve 72B is operated to output the pilot pressure from the remote control valve 72B. The pilot pressure is applied to a pressure-receiving portion of the boom control valve 70A. Then, the operation fluid flowing into the boom control valve 70A is supplied to a bottom side of the lift cylinder 26, and thus the booms (the boom 22L and the boom 22R) are moved upward.

That is, the boom control valve 70A is capable of controlling a flow rate of the operation fluid in accordance with a pressure of the operation fluid set by the operation of the operation member 71 (the pilot pressure set by the remote control valve 72A and the pilot pressure set by the remote control valve 72B), the operation fluid flowing into the lift cylinder 26.

When the operation member 71 is tilted rightward, the remote control valve 72C is operated to apply the pilot pressure to the pressure-receiving portion of the bucket control valve 70B. As the result, the bucket control valve 70B is operated to stretch the tilt cylinder 28, and thereby the bucket 23 dumps at a speed proportional to a tilting extent of the operation member 71.

When the operation member 71 is tilted leftward, the remote control valve 72D is operated to apply the pilot pressure to the pressure-receiving portion of the bucket control valve 70B. As the result, the bucket control valve 70B is operated to shorten the tilt cylinder 28, and thereby the bucket 23 shovels at a speed proportional to a tilting extent of the operation member 71.

That is, the bucket control valve 70B is capable of controlling a flow rate of the operation fluid in accordance with a pressure of the operation fluid set by the operation of the operation member 71 (the pilot pressure set by the remote control valve 72C and the pilot pressure set by the remote control valve 72D), the operation fluid flowing into the tilt cylinder 28. In particular, the remote control valves 72A, 72B, 72C, and 72D change a pressure of the operation fluid in accordance with the operation of the operation member 71, and then supply the operation fluid having the changed pressure to the boom control valve 70A and to the bucket control valve 70B.

A shared discharge fluid tube (a shared discharge fluid path) 74 is connected to the auxiliary control valve 70C. The shared discharge fluid tube 74 includes a fluid tube (a fluid path) 74a and a fluid tube (a fluid path) 74b. The fluid tube 74a is connected to one of two ports of the auxiliary control valve 70C. The fluid tube 74b is connected to the other one of the two ports of the auxiliary control valve 70C. The shared discharge fluid tube 74 (the fluid tube 74a and the fluid tube 74b) are connected to a connecting portion 75. The hydraulic actuator 76 of the auxiliary attachment is capable of being connected to the connecting portion 75.

In this manner, the operation fluid can be supplied to the hydraulic actuator 76 of the auxiliary attachment from the auxiliary control valve 70c. The auxiliary control valve 70C is operated by a proportional valve 73. The proportional valve 73 has an opening aperture capable of being changed in accordance with a pressure of the operation fluid. The proportional valve 73 includes a first proportional valve 73A and a second proportional valve 73B. The first proportional valve 73A is connected to a pressure-receiving portion 70C1 of the auxiliary control valve 70C by a fluid tube (a fluid path) 77a. The second proportional valve 73B is connected to a pressure-receiving portion 70C2 of the auxiliary control valve 70C by a fluid tube (a fluid path) 77b. When the first proportional valve 73A is opened, the pilot fluid is applied to the pressure-receiving portion 70C1 through the fluid tube 77a.

In addition, when the second proportional valve 73B is opened, the pilot fluid is applied to the pressure-receiving portion 70C2 through the fluid tube 77b. In this manner, when the pilot fluid is applied to the pressure-receiving portion 70C1 or the pressure-receiving portion 70C2 of the auxiliary control valve 70C, the auxiliary control valve 70C is switched. Thus, the hydraulic actuator 76 of the auxiliary attachment is operated by the operation fluid supplied from the auxiliary control valve 70C.

The first proportional valve 73A and the second proportional valve 73B are operated by the control device 110.

Meanwhile, the control device 110 shown in FIG. 1 has a configuration similar to a configuration of the control device 110 shown in FIG. 2. An operation member 78 is connected to the control device 110. The operation member 78 is disposed around the operator seat 13. The operation member 78 is constituted of a seesaw switch, a slide switch, or a push switch. The seesaw switch is configured to be swingable. The slide switch is configured to be slidable. The push switch is configured to be pushable. An operation extent of the operation member 78 is inputted to the control device 110.

The control device 110 outputs a control signal (for example, an electric current) based on the operation extent of the operation member 78 to the first proportional valve 73A or to the second proportional valve 73B. The control valve 73 (the first proportional valve 73A and the second proportional valve 73B) are opened and closed in accordance with a control signal outputted from the control device 110. In this manner, when a pressure of the operation fluid reaches a predetermined pressure (a threshold pressure) or more, the operation fluid being outputted to the control valves 73 (the first proportional valve 73A and the second proportional valve 73B, the auxiliary control valve 70C is switched to the first position 79a, the second position 79b, and the third position 79c, and thus the hydraulic actuator 76 is operated.

The control device 110 is constituted of a CPU and the like. The control device 110 is connected to the proportional valve 45. The control valve 110 outputs a control signal such as an electric current to a solenoid of the proportional valve 45, and thus controls the proportional valve 45.

For example, the control device 110 controls the proportional valve 45 in accordance with an operation of an operation member 115 connected to the control device 110. The operation member 115 is a member for setting the travel motors (the first travel motor 80A and the second travel motor 80B) to be in the first speed and in the second speed. The operation member 115 is constituted of a seesaw switch, a slide switch, or a push switch. The seesaw switch is configured to be swingable. The slide switch is configured to be slidable. The push switch is configured to be pushable.

When the seesaw switch is swung to one side, the travel motor is set to be in the first speed. When the seesaw switch is swung to the other side, the travel motor is set to be in the second speed. When the slide switch is slid to one side, the travel motor is set to be in the first speed. When the slide switch is slid to the other side, the travel motor is set to be in the second speed. Every time when the push switch is pushed, the travel motor is switched from the second speed to the first speed or from the first speed to the second speed.

Referring to FIG. 3, control of the proportional valve carried out by the control device 110 will be explained. The control device 110 preliminarily stores a relation shown in FIG. 3, the relation between the speed-changing pressure L1 and a control signal (an electric current) to be outputted to the proportional valve 45.

When the operation member 115 is operated to set the first speed, the control device 110 demagnetizes a solenoid of the proportional valve 45, and thus decreases a pressure of the operation fluid applied to the hydraulic switch valve as shown by the speed-changing pressure L1 in FIG. 3, thereby setting the hydraulic switch valve to be in the first position 90a (setting the travel motor to be in the first speed).

In addition, when the operation member 115 is operated to set the second speed, the control device 110 magnetizes the solenoid of the proportional valve 45, and thus increases a pressure of the operation fluid applied to the hydraulic switch valve as shown by the speed-changing pressure L1 in FIG. 3, thereby setting the hydraulic switch valve to be in the second position 90b (setting the travel motor to be in the second speed). In this manner, the control device 110 controls the proportional valve 45, and thus the control device 110 switches the travel motor to be the first speed and to be the second speed in accordance with an operation of the operation member 115.

As described above, the control device 110 controls the proportional valve 45 in accordance with an operation of the operation member 115, and thus the control device 110 sets the travel motor to be in the first speed and to be in the second speed. In addition, the control device 110 controls the proportional valve 45 in accordance with a state of the travel hydraulic device 44. The state of the travel hydraulic device will be explained below, and further the control of the operation valve by the control device 110 will be explained below.

Figure 4A:
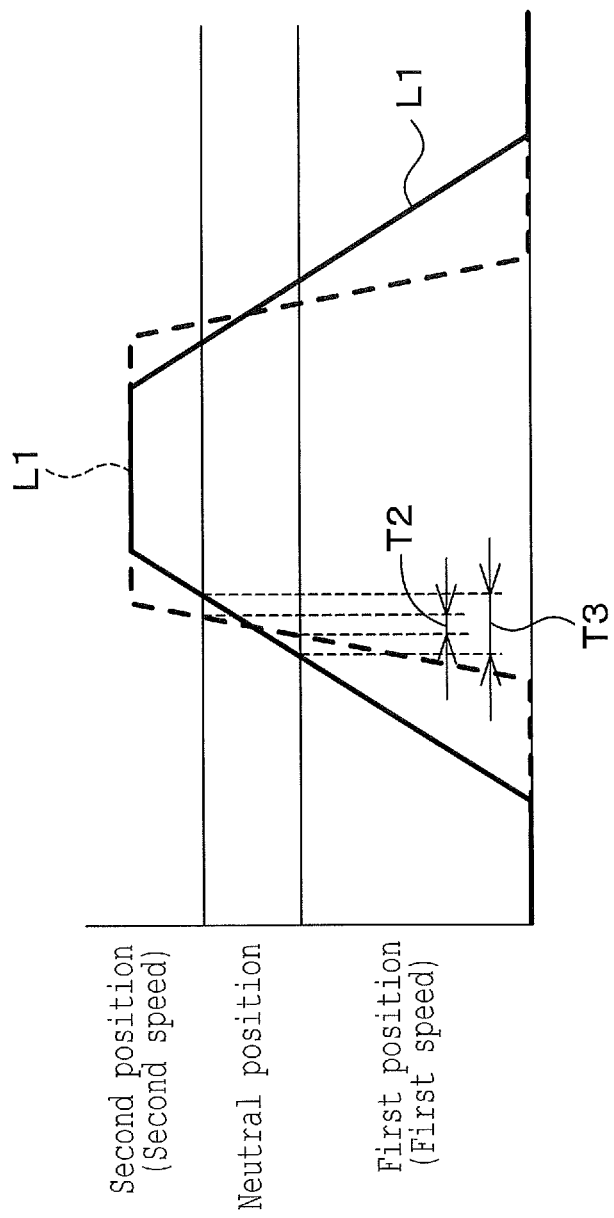
FIG. 4A is a view illustrating a relation between the pilot pressure and the position of the hydraulic switch according to the first embodiment, the relation being present in a case where an operation valve is controlled based on a revolution speed of a travel motor or in accordance with an operation of a travel operation member.

FIG. 4A is a view illustrating a relation between the pilot pressure and the position of the hydraulic switch, the relation being present in a case where the operation valve is controlled based on the state of the travel hydraulic device (a revolution speed of the travel motor). The speed-changing pressure L1 shown in FIG. 4A is an example of the pilot pressure being present in a case where the speed of the travel motor of the travel hydraulic device is changed.

As shown in FIG. 1, a measurement device 111 is connected to the control device 110. The measurement device 111 is configured to detect a revolution speed (a first revolution speed) of the first travel motor 80A. In addition, a measurement device 112 is connected to the control device 110. The measurement device 112 is configured to detect a revolution speed (a second revolution speed) of the second travel motor 80B.

The control device 110 is capable of obtaining a first revolution speed and a second revolution speed. The first revolution speed is detected by the measurement device 111. The second revolution speed is detected by the measurement device 112. The control device 110 controls the proportional valve 45 on the basis of the first revolution speed and the second revolution speed, and thus changes the speed-changing pressure L1 as shown in FIG. 4A.

In a case where the speed of the travel motor is switched from the first speed to the second speed or from the second speed to the first speed (in the changing of speed), the control device 110 control an opening aperture of the proportional valve 45 when a difference between the first revolution speed and the second revolution speed is a predetermined speed (a threshold speed) or more, and thus the control device 110 shortens a neutral time of the switching at the speed-changing pressure L1 (time to pass the neutral) to be less than a predetermined time T3 and changes the neutral time to a predetermined time T2.

When a ratio between the first revolution speed and the second revolution speed is a predetermined speed (a threshold speed) or more, the control device 110 controls the proportional valve 45 to shorten a time in an intermediate position (the neutral position) to be less than a predetermined time (a threshold time). The intermediate position is not limited to the neutral position, and may be between the first position and the second position.

In addition, the control device 110 may judge a state of the travel device 4 (a traveling state) on the basis of an operation of the travel operation device (an operation device) 14 and control the proportional valve 45 on the basis of the traveling state.

A measurement device 113 is connected to the control device 110. The measurement device 113 is configured to detect a swinging state of the travel lever 40 of the travel operation device 14. The measurement device 113 is a potentiometer that is configured to detect a position of the travel lever 40. For example, the measurement device 113 is capable of detecting that the travel lever 40 is moved forward (referred to as a forward operation), that the travel lever 40 is moved backward (referred to as a backward operation), that the travel lever 40 is moved rightward (referred to as a right-turn operation), and that the travel lever 40 is moved leftward (referred to as a left-turn operation).

In this manner, when the measurement device 113 detects the forward operation, the control device 110 determines as the traveling state that the travel device 4 (the travel motor) travels forward. When the measurement device 113 detects the backward operation, the control device 110 determines as the traveling state that the travel device 4 (the travel motor) travels backward. When the measurement device 113 detects the right-turn operation, the control device 110 determines as the traveling state that the travel device 4 (the travel motor) turns rightward. When the measurement device 113 detects the left-turn operation, the control device 110 determines as the traveling state that the travel device 4 (the travel motor) turns leftward.

The measurement device 113 may be a device for detecting the pressures (the pilot pressures) of the operation fluids in the fluid tubes 61, 62, 63, and 64 connected to the travel operation device 14. That is, the control device 110 may determine the state of the travel device 4 (the traveling state) on the basis of the pilot pressures in the fluid tubes 61, 62, 63, and 64.

And, the control device 110 may control the proportional valve 45 (change the speed-changing pressure L1) on the basis of the state of the travel device 4, the state being obtained from the operation of the travel operation device 14. When the travel device 4 turns in changing the speed, the control device 110 controls the opening aperture of the proportional valve 45, and thus shortens the neutral time T2 for the switching in the speed-changing pressure L1 to be less than the neutral time for a straight traveling (a forward traveling and the backward traveling) as shown in FIG. 4A.

In addition, the control device 110 may control the proportional valve 45 (change the speed-changing pressure L1) on the basis of the traveling speed of the travel device 4. A measurement device 114 is connected to the control device 110. The measurement device 114 is configured to detect a traveling speed (a ground speed) of the travel device 4 (the work machine 1). The measurement device 114 is constituted of a vehicle speed sensor and the like. The vehicle speed sensor is configured to detect a vehicle speed of the work machine 1. The measurement device 114 may be any one of devices capable of detecting the vehicle speed of the work machine 1.

FIG. 4B is a view illustrating a relation between a speed-changing pressure L11 and a speed-changing pressure L12. The speed-changing pressure L11 is employed in a case where a traveling speed is a predetermined speed (a threshold speed) or more at a high speed. The speed-changing pressure L12 is employed in a case where a traveling speed is less than the predetermined speed (the threshold speed) at a low speed.

As shown in FIG. 4B, when the traveling speed detected by the measurement device 114 is at the high speed, the control device 110 sets a slope G1 of the speed-changing pressure L11 to a slope for high speed. In addition, when the traveling speed detected by the measurement device 114 is the low speed, the control device 110 sets a slope G2 of the speed-changing pressure L11 to a slope for low speed.

For example, when the traveling speed is at the high speed for example, the control device 110 controls a speed of the opening and closing of the proportional valve 45 in the speed changing, and thereby the slope G1 of the speed-changing pressure L11 is set to be milder than the slope G2 of the speed-changing pressure L11.

When the traveling speed is at the low speed for example, the control device 110 controls a speed of the opening and closing of the proportional valve 45 in the speed changing, and thereby the slope G2 of the speed-changing pressure L11 is set to be steeper than the slope G1 of the speed-changing pressure L11.

In addition, the control device 110 may control the proportional valve 45 (change the speed-changing pressure L11) on the basis of the state of the engine 29. The measurement device 116 is connected to the control device 110. The measurement device 116 is configured to detect a load applied to the engine 29 as the state of the engine 29. The measurement device 116 is a device configured to detect the traveling pressures applied to the travel motors (the first travel motor 80A and the second travel motor 80B). The travel pressure applied to the travel motor is equivalent to the load applied to the engine 29.

When the travel pressure of the travel motor, that is, the load applied to the engine 29 is equal to or higher than a predetermined value (a threshold value) to be high, the control device 110 increases the slope of the speed-changing pressure L1 in the speed changing, for example. When the travel pressure of the travel motor (the load applied to the engine 29) is less than the predetermined value (the threshold value) to be low, the control device 110 decreases the slope of the speed-changing pressure L1 in the speed changing, for example.

The measurement device 116 may be a device configured to detect the fuel injection amount injected into a cylinder of the engine 29. When the fuel injection amount is large, the load applied to the engine 29 is high. When the fuel injection amount is small, the load applied to the engine 29 is low.

In addition, a measurement device 117 is connected to the control device 110. The measurement device 117 is configured to detect the revolution speed of the engine 29 as the state of the engine 29. The measurement device 117 is a device configured to detect the revolution speed of engine 29.

The control device 110 may control the proportional valve 45 (change the speed-changing pressure L1) on the basis of the revolution speed (an actual engine speed) of engine, the revolution speed being detected by the measurement device 117. In addition, the control device 110 may control the proportional valve 45 on the basis of the stalling state of the engine 29.

That is, the control device 110 judges based on the actual revolution speed of engine whether the engine stall is caused. When the actual revolution speed of engine is equal to or less than 400 rpm for 0.5 seconds or more (that is, a continuous elapsed time is 0.5 seconds or more), it is determined that the engine stall has caused.

Then, in a case where the travel motor is in the second speed at the time when the engine stall has been caused, the control device 110 fully closes the proportional valve 45 to quickly decrease the speed-changing pressure L1. The control device 110 controls the proportional valve 45 in accordance with the operation member 115 when it is determined that the engine stall is not caused.

In the embodiment described above, the pressure of the pilot applied to the pressure-receiving portion 91 of the hydraulic switch valve is gradually increased or decreased in the speed changing (in the speeding up from the first speed to the second speed, and the speeding down from the second speed to the first speed). That is, the slope is inclined during a portion corresponding to the speed changing in the speed-changing pressure L1. However, as shown in FIG. 5, the speed-changing pressure may be increased or decreased at once to an intermediate pressure in the speed changing.

In particular, in a case where the speed is changed from the first speed to the second speed, the control device 110 opens the proportional valve 45 from the fully closed state and thereby increases the speed-changing pressure at once to a first setup pressure Q1. The first setup pressure Q1 is determined corresponding to the neutral position as shown in the speed-changing pressure L1a of FIG. 5.

When the pressure applied to the pressure-receiving portion 91 of the hydraulic switch valve reaches the first setup pressure Q1, the speed-changing pressure is gradually increased starting from the time reaching the first setup pressure Q1 to be a second setup pressure Q2 as shown in the speed-changing pressure L1b. The second setup pressure Q2 is determined corresponding to the second speed. And, when the pressure applied to the pressure-receiving portion 91 of the hydraulic switch valve reaches the second setup pressure Q2, the speed-changing pressure is increased at once to a third setup pressure Q3 as shown in the speed-changing pressure L1c. The third setup pressure Q3 is determined corresponding to the second speed.

Figure 5:
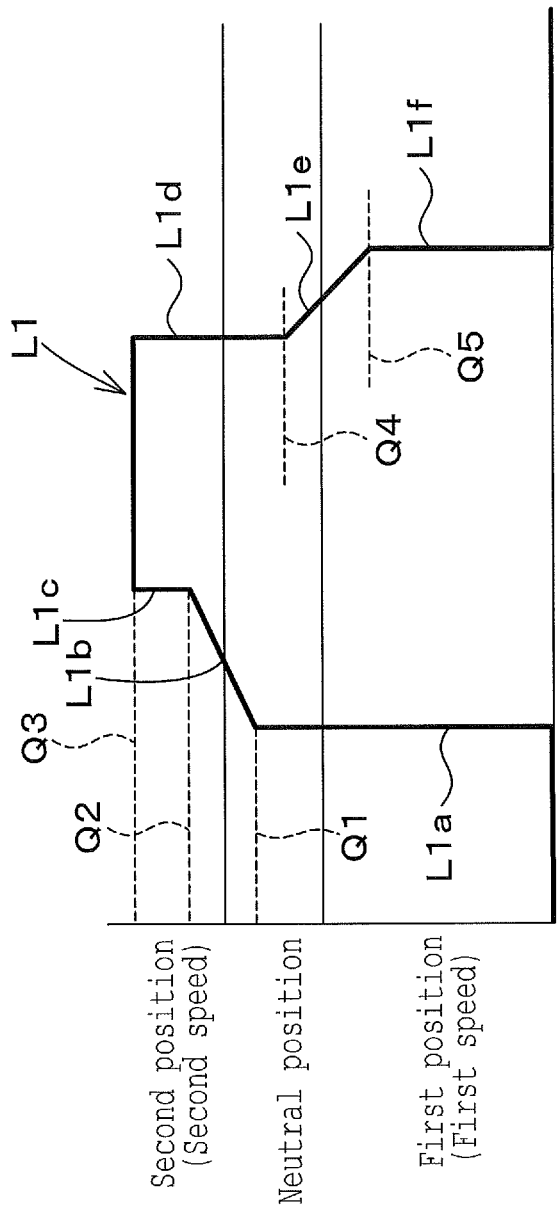
FIG. 5 is a view illustrating a modified example that shows the relation between the pilot pressure and the position of the hydraulic switch valve according to the first embodiment.

In particular, the speed-changing pressure is increased in the three steps as shown in FIG. 5 in the case where the speed is changed from the first speed to the second speed.

On the other hand, the proportional valve 45 is closed from a state where the proportional valve 45 is maintained at a predetermined position and thereby decreases the speed-changing pressure at once to a fourth setup pressure Q4 as shown in the speed-changing pressure L1d of FIG. 5 in the case where the speed is changed from the second speed to the first speed. The fourth setup pressure Q4 is determined corresponding to the neutral position. When the pressure applied to the pressure-receiving portion 91 of the hydraulic switch valve reaches the fourth setup pressure Q4, the speed-changing pressure is gradually decreased starting from the time reaching the fourth setup pressure Q4 to be a fifth setup pressure Q5 as shown in the speed-changing pressure L1e. The fifth setup pressure Q5 is determined corresponding to the first position.

Then, when the pressure applied to the pressure-receiving portion 91 of the hydraulic switch valve reaches the fifth setup pressure Q5, the speed-changing pressure is decreased at once to a sixth setup pressure Q6. The sixth setup pressure Q6 is determined corresponding to the first position. That is, in the case where the speed is changed from the second speed to the first speed, the speed-changing pressure is decreased in the three steps as shown in FIG. 5.

As described above, the characteristics of the pressure switching the hydraulic switch valve 90 can be varied on the basis of the state of the travel hydraulic device 44 or the state of the engine 29 even in the case where the speed-changing pressure is increased and decreased in the three steps at the speed changing. For example, the slope of the speed-changing pressure L1a, the slope or a length of the speed-changing pressure L1b, the slope of the speed-changing pressure L1d, the slope or a length of the speed-changing pressure L1e, and the slope of the speed-changing pressure L1f can be changed.

As shown in FIG. 5, the control device 110 preliminarily stores the relation between the first setup pressure Q1, the second setup pressure Q2, the third setup pressure Q3, the fourth setup pressure Q4, the fifth setup pressure Q5, and the control signal (for example, an electric current) outputted to the proportional valve 45. The control device 110 may output a predetermined electric current to the proportional valve 45 in the above-mentioned procedure, and thus controls the speed-changing pressure L1.

In addition, as shown in FIG. 1, a measurement device 118 may be disposed on the pressure-receiving portion 91 of the hydraulic switch valve or between the second throttle 109b and the pressure-receiving portion 91 in the fluid tube 105. The measurement device 118 is configured to detect the pressure of the operation fluid (the pilot pressure). Then, regarding the control of the operational valve 45 by the control device 110, the pilot pressure detected by the measurement device 118 may be fed back to the control device 110, and then the control device 110 may control the proportional valve 45 such that a value fed back can be identical to the speed-changing pressures L1, L11, and L12.

In particular, the pilot pressure detected by the measurement device 118 may be employed as the pilot pressure actually applied to the pressure-receiving portion 91 of the hydraulic switch valve. In this manner, the control device 110 may adjust the opening aperture of the proportional valve 45 such that the pilot pressure detected by the measurement device 118 is to be equal to any one of the speed-changing pressures shown in FIG. 3 to FIG. 5.

Figure 6:
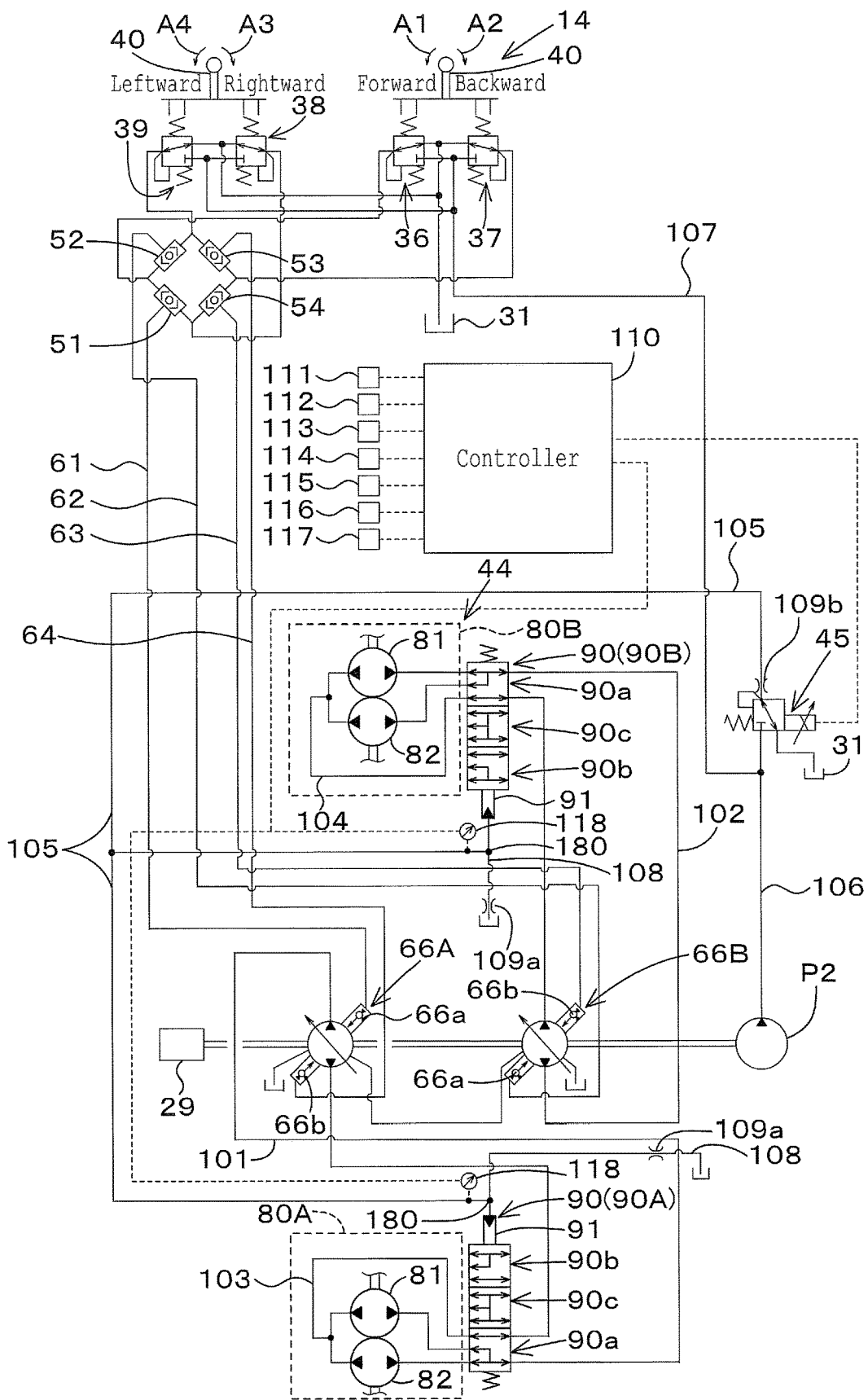
FIG. 6 is a view illustrating a modified example of the hydraulic system for traveling according to the first embodiment.

FIG. 6 shows a modified example of the second throttle. As shown in FIG. 6, the hydraulic system for traveling may include the second throttle 109b in the vicinity of the proportional valve 45. For example, in the proportional valve 45, the second throttle 109b such as an orifice may be attached to a port (an output port) for outputting the operation fluid. And, the second throttle 109b may be attached to a port for outputting the operation fluid to the proportional valve 45 by an attachment bracket and the like.

The second throttle 109b is disposed in the vicinity of an output port of the proportional valve 45, and thereby generating a pressure loss in the portion from the second throttle 109b to the pressure-receiving portion 91 of the hydraulic switch valve when a temperature of the operation fluid is low. In this manner, a differential pressure can be increased between the pressure-receiving portion 91 and a downstream portion of the second throttle 109b.

Thus, in a case where the spool of the hydraulic switch valve takes a long time to return to the neutral position because the temperature of the operation fluid is low, the pressure of the pressure-receiving portion 91 is lower than the output of the proportional valve 45, and thereby the hydraulic switch valve is operated stably even in the case where the temperature is low.

In the embodiment mentioned above, the hydraulic switch valves (the first hydraulic switch valve 90A and the second hydraulic switch valve 90B) are valves capable of being switched to the plurality of switching positions including the neutral position. However, the hydraulic switch valves may be valves capable of being switched to the switching positions without the neutral position. In addition, the travel motors (the first travel motor 80A and the second travel motor 80B) are the radial piston motors each having two motors. However, the travel motors may be other motors.

Figure 7:
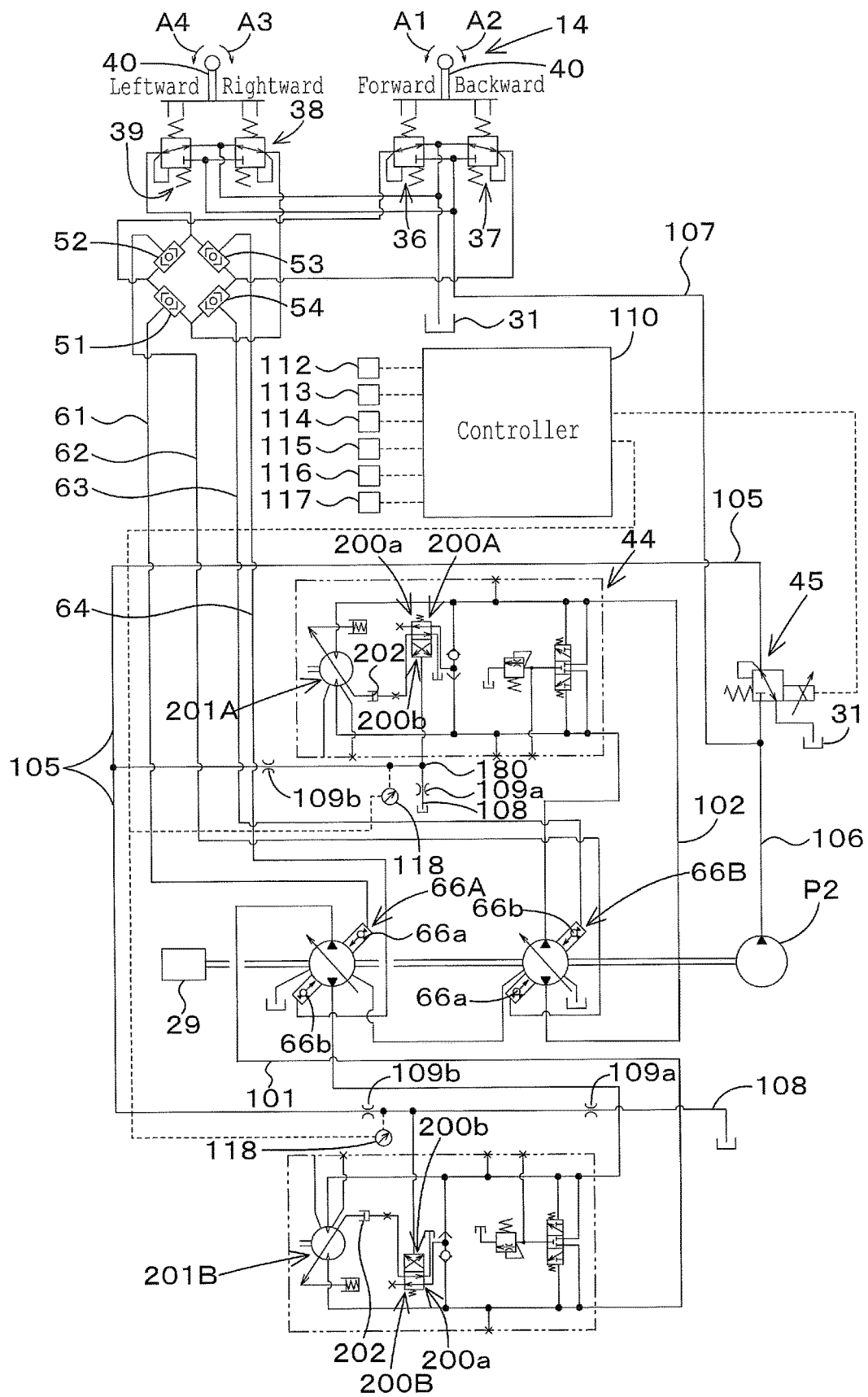
FIG. 7 is a view illustrating modified examples of a travel hydraulic device and a hydraulic switch valve according to the first embodiment.

FIG. 7 shows modified examples of the hydraulic switch valve and the travel motor. As shown in FIG. 7, the hydraulic switch valve includes a first hydraulic switch valve 200A and a second hydraulic switch valve 200B. Each of the first hydraulic switch valve 200A and the second hydraulic switch valve 200B is constituted of a two-position switch valve. The two-position switch valve is configured to be switched between a first position 200a and a second position 200b by the pilot pressure.

Figure 8:
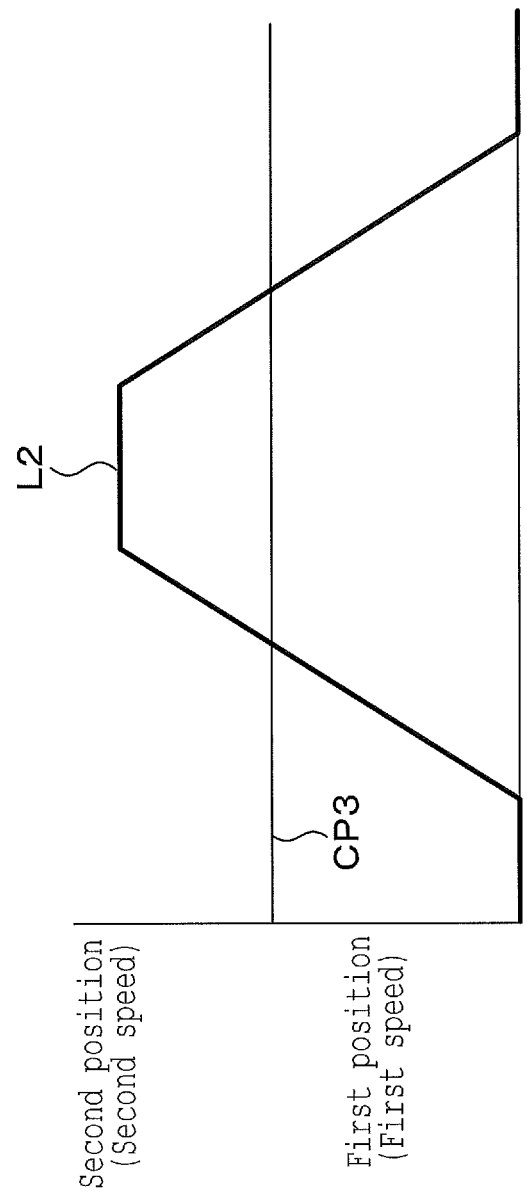
FIG. 8 is a view illustrating a relation between the pilot pressure and the position of the hydraulic switch valve according to the modified example of the first embodiment.

As shown in a speed-changing pressure L2 of FIG. 8, the first hydraulic switch valve 200A and the second hydraulic switch valve 200B are switched to the first position 200a when the pilot pressure applied to the pressure-receiving portion is less than a switching pressure. And, the first hydraulic switch valve 200A and the second hydraulic switch valve 200B are switched to the second position 200b when the pilot pressure applied to the pressure-receiving portion is equal to or more than the switching pressure.

The travel motor includes a first travel motor 201A and a second travel motor 201B. Each of the first travel motor 201A and the second travel motor 201B is constituted of a variable displacement axial motor having a swash plate, the variable displacement axial motor being configured to be switched to two speeds, that is, to a high speed and to a low speed. Each of the first travel motor 201A and the second travel motor 201B includes a swash plate switching cylinder 202. The swash plate switching cylinder 202 is configured to switch an angle of the swash plate.

The swash plate switching cylinder 202 of the first travel motor 201A is connected to the first hydraulic switch valve 200A, and is stretched and shortened by the operation fluid supplied from the first hydraulic switch valve 200A. The swash plate switching cylinder 202 of the first travel motor 201B is connected to the second hydraulic switch valve 200B, and is stretched and shortened by the operation fluid supplied from the second hydraulic switch valve 200B.

In this manner, when the first travel motor 201A and the second travel motor 201B are set to the first position 200a, the swash plate switch cylinder 202 is shortened to change the angle of the swash plates of the first travel motor 201A and the second travel motor 201B. Thus, the first travel motor 201A and the second travel motor 201B are set to the first speed.

When the first travel motor 201A and the second travel motor 201B are set to the second position 200b, the swash plate switch cylinder 202 is stretched to change the angle of the swash plates of the first travel motor 201A and the second travel motor 201B. Thus, the first travel motor 201A and the second travel motor 201B are set to the second speed. Meanwhile, the proportional valve 45 is a hydraulic switch valve not including the neutral position, but is capable of changing the speed-changing pressure L2 in accordance with the travel state, the travel load, the load of the motor, and the state of the motor.

Figure 9:
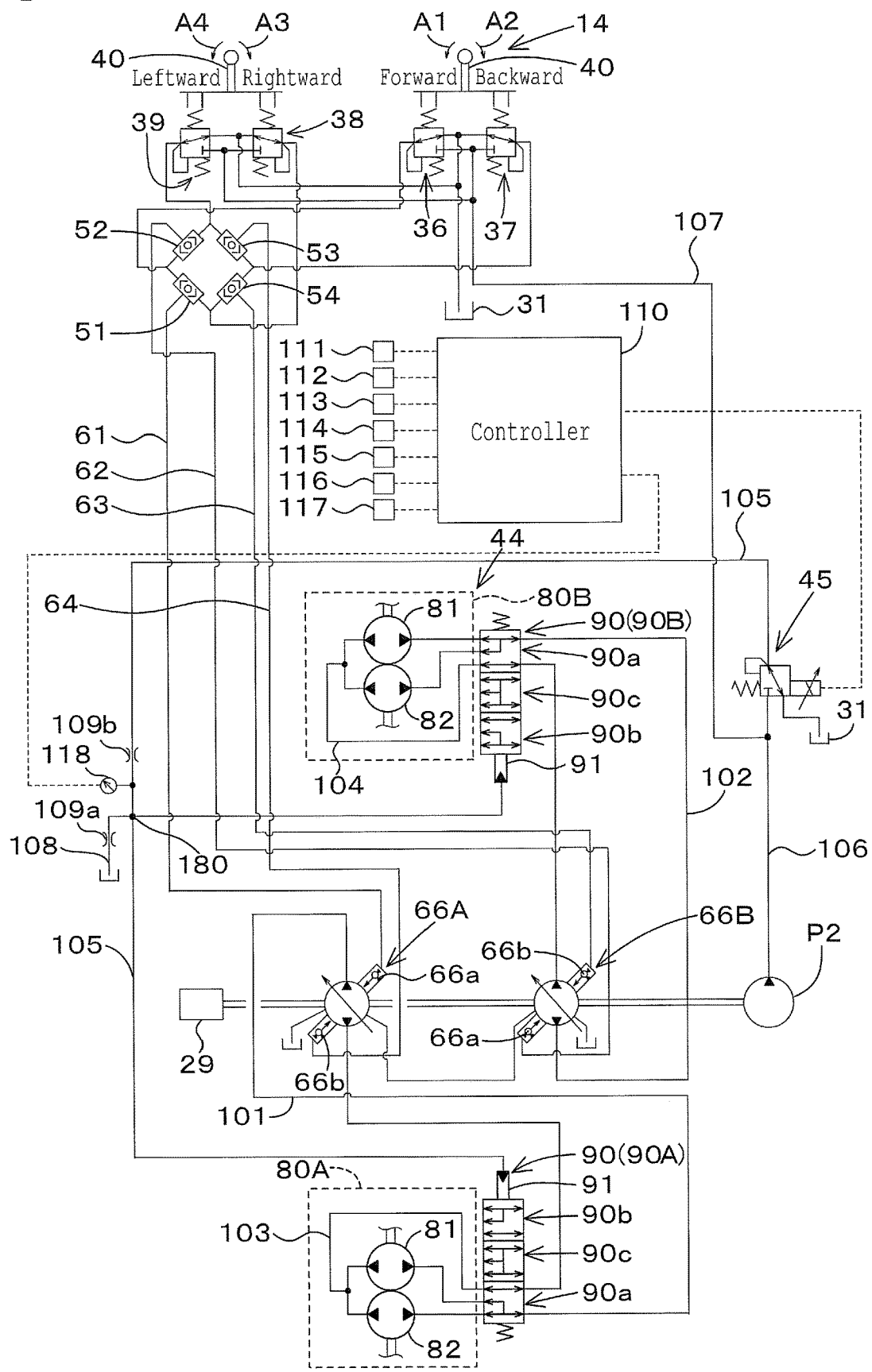
FIG. 9 is a view illustrating a hydraulic system of a case where a discharging fluid tube, a throttle, and a measurement device shared with the hydraulic switch valves according to the first embodiment.

In the embodiment described above, the discharge fluid tube 108, the first throttle 109a, the second throttle 109b, and the measurement device 118 are disposed on each of the first hydraulic switch valve 90A and the second hydraulic switch valve 90B. However, as shown in FIG. 9, the discharge fluid tube 108, the first throttle 109a, the second throttle 109b, and the measurement device 118 may be shared with the first hydraulic switch valve 90A and the second hydraulic switch valve 90B.

Figure 10A:
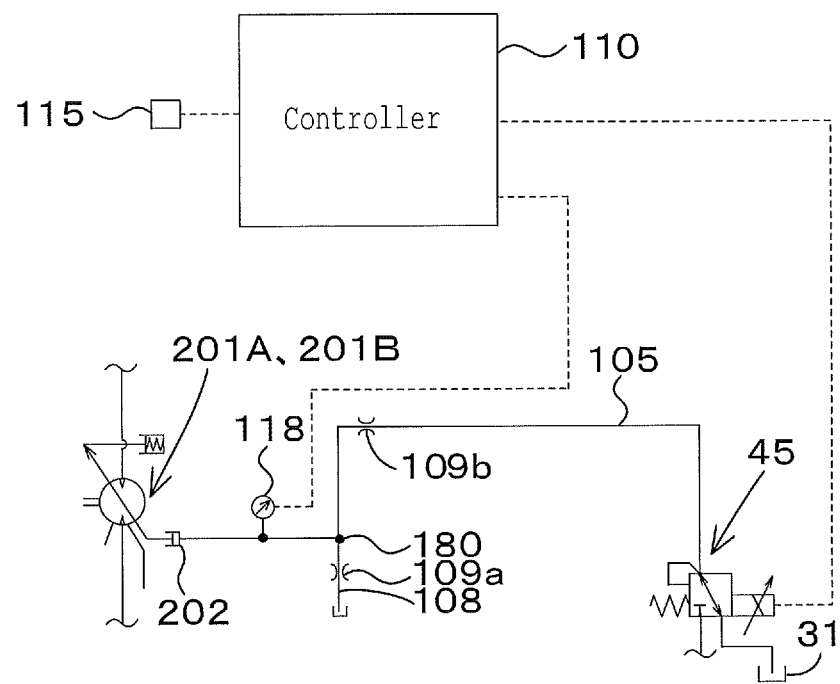
FIG. 10A is a view illustrating a case where an operation valve is connected to a servo cylinder of the travel motor according to the first embodiment.
Figure 10B:
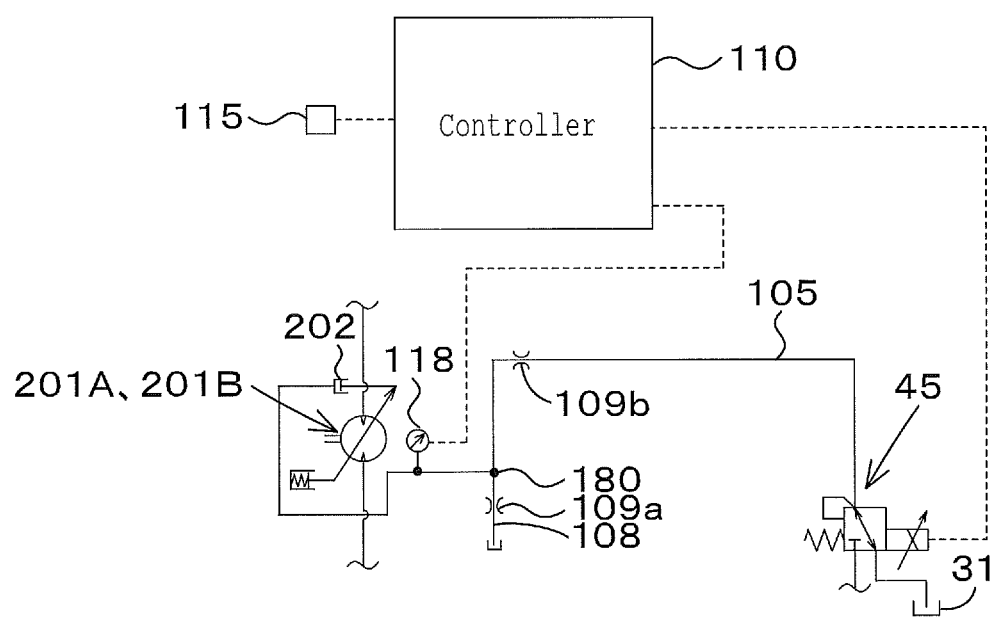
FIG. 10B is a view illustrating another case where an operation valve is connected to a servo cylinder of the travel motor according to the first embodiment.

In addition, as shown in FIG. 10A and FIG. 10B, the proportional valve 45 may be connected to the swash plate switch cylinder (the servo cylinder) 202 by the fluid tube 105. In this manner, the proportional valve 45 may switch the travel motors (the first travel motor 201A and the second travel motor 201B) to the first speed and the second speed.

The control device 110 controls the swash plate switch cylinder 202 that is a control object different from the control object of the above-mentioned embodiment. However, the control device 110 operates in the manner similar to the manner of the above-mentioned embodiment. That is, the swash plate switch cylinder takes the place of the hydraulic switch valve. For example, when being set to the first speed, the control device 110 sets the pressure applied to the swash plate switch cylinder 202 to be less than a predetermined pressure CP3. When being set to the second speed, the control device 110 sets the pressure applied to the swash plate switch cylinder 202 to be the predetermined pressure CP3 or more.

Meanwhile, in the case shown in FIG. 10B, the travel motor is in the second speed when the pressure applied to the swash plate switch cylinder 202 is less than the predetermined pressure CP3, and the travel motor is in the first speed when the pressure is the predetermined pressure CP3 or more.

The hydraulic system according to the above-mentioned embodiment is capable of changing the characteristics of the pressure in accordance with the state of the travel hydraulic device or the state of the motor, the pressure switching the hydraulic switch valve.

Second Embodiment

Figure 11:
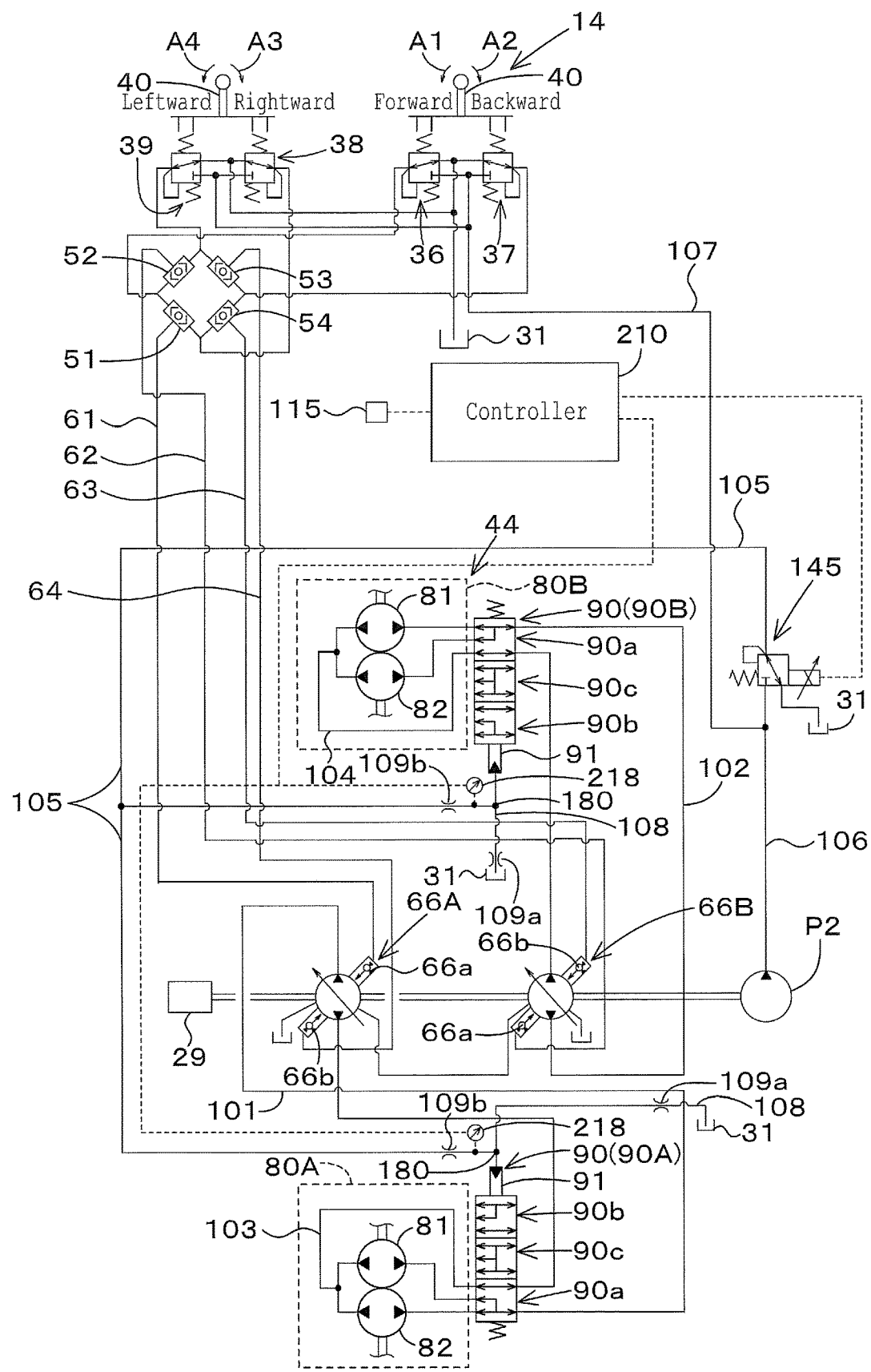
FIG. 11 is a view illustrating a hydraulic system for traveling according to a second embodiment of the present invention.
Figure 12:
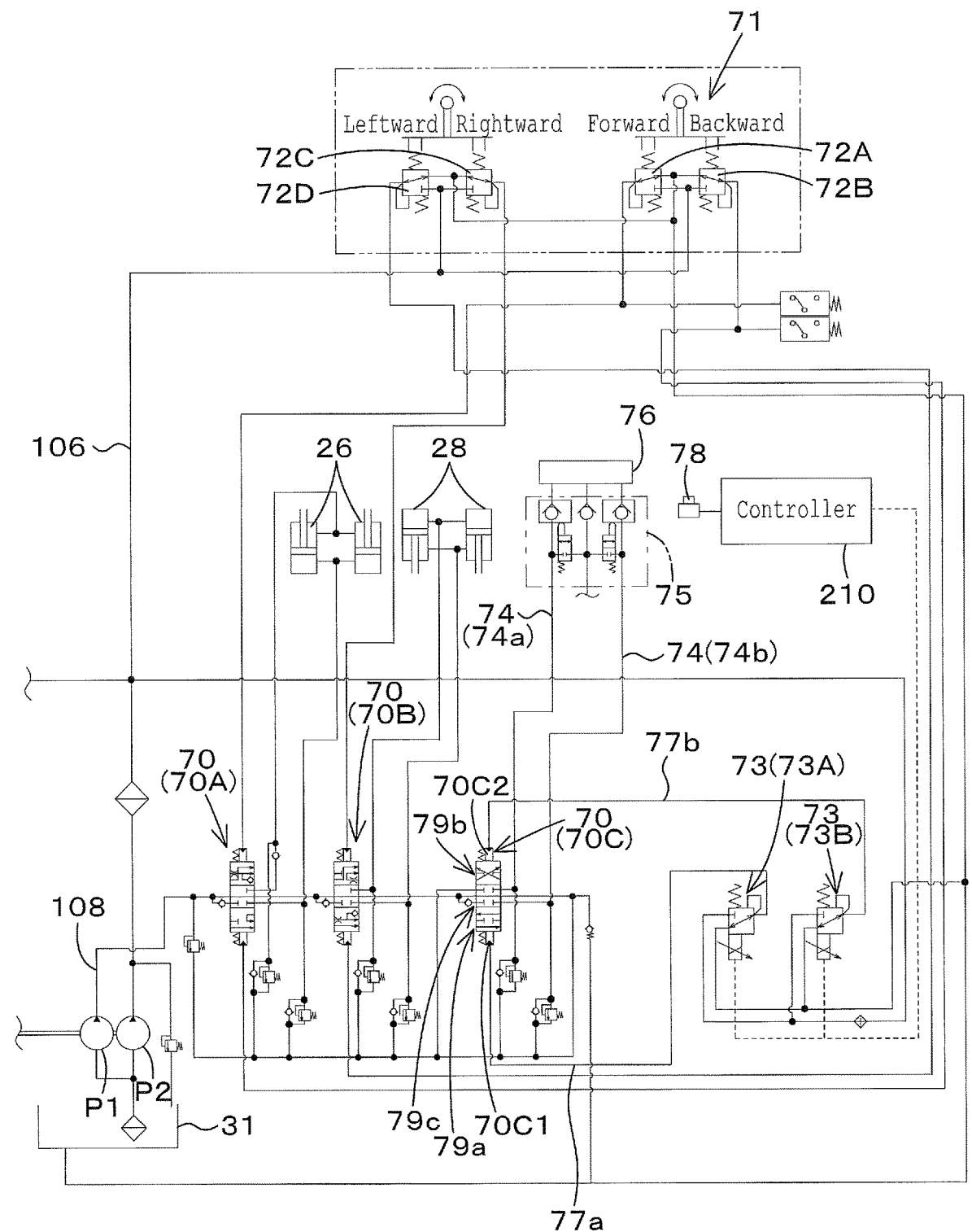
FIG. 12 is a view illustrating a hydraulic system for operating according to the second embodiment.

FIG. 11 and FIG. 12 show a hydraulic system for a work machine according to a second embodiment of the present invention. The second embodiment describes configurations different from the configurations described in the first embodiment, and thus omits the explanations of the configurations similar to the configurations described in the first embodiment.

An operation valve 145 shown in FIG. 11 is a valve capable of changing a pressure (a flow rate) of the operation fluid applied to the hydraulic switch valve (the first hydraulic switch valve 90A and the second hydraulic switch valve 90B), and capable of applying a pressure of the operation fluid being smaller than a pressure to switch the hydraulic switch valve to a predetermined switching position. The operation valve 145 is capable of changing an opening aperture of the operation valve 145 in accordance with a control signal outputted by the control device 210 to be described below.

In the embodiment, the operation valve 145 is an electromagnetic proportional valve (a proportional valve) and changes the opening aperture of the operation valve 145 in accordance with the control signal. When the opening aperture of the operation 145 is changed, the changing of the opening aperture changes the pressure of the operation fluid applied (supplied) to the hydraulic switch valve.

Figure 13:
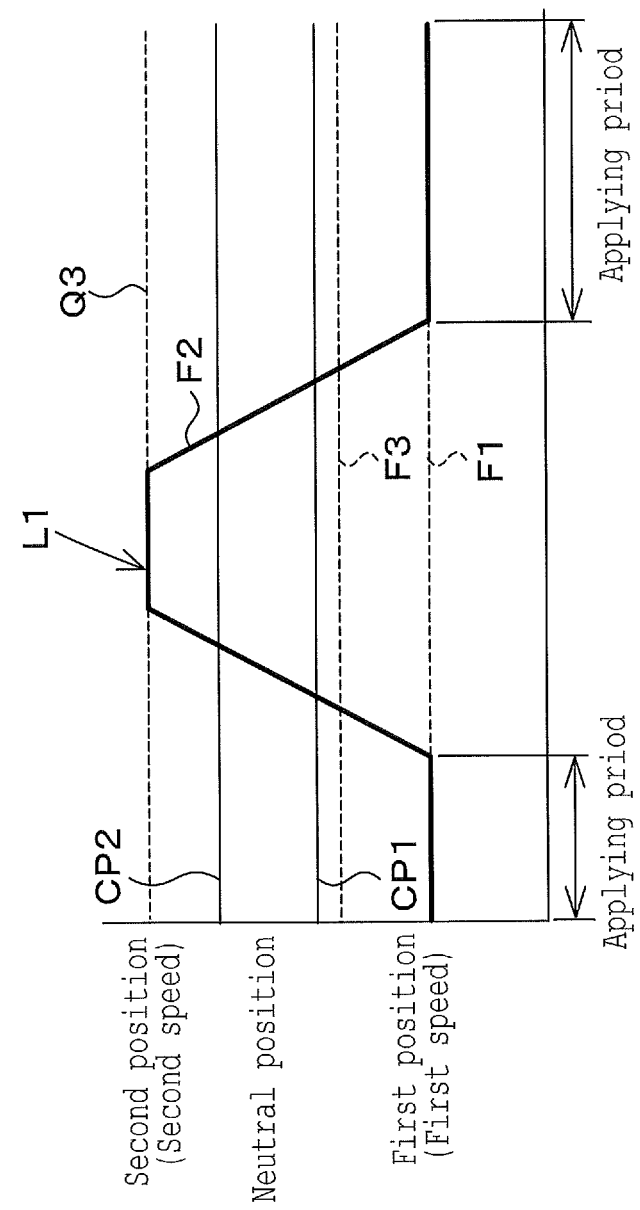
FIG. 13 is a view illustrating a relation between a pilot pressure and a position of a hydraulic switch valve according to the second embodiment.

As shown in the speed-changing pressure L1 of FIG. 13, when the pilot pressures applied to the pressure-receiving portions 91 of the first hydraulic switch valve 90A and the second hydraulic switch valve 90B are less than a boundary pressure (the switching pressure) CP1 between the first position 90a and the neutral position 90c, the hydraulic switch valves (the first hydraulic switch valve 90A and the second hydraulic switch valve 90B) are at the first position 90a. When the hydraulic switch valves are at the first position 90a, the travel motors (the first travel motor 80A and the second travel motor 80B) are in the first speed.

The proportional valve 145 applies a preliminary pressure to the hydraulic switch valves under a state where the hydraulic switch valves maintain the first position 90a. That is, the proportional 145 is capable of applying an applied pressure F1 to the pressure-receiving portions 91 of the hydraulic switch valves. In other words, the operation valve 145 applies the applied pressure F1 preliminarily set to the pressure-receiving portions 91 of the hydraulic switch valves in a case where the travel motor is in the first speed.

When the pilot pressure applied to the pressure-receiving portions 91 of the first hydraulic switch valve 90A and the second hydraulic switch valve 90B exceeds the switching pressure CP1 by gradually increasing the opening aperture of the proportional valve 145, the first hydraulic switch valve 90A and the second hydraulic switch valve 90B are set to the neutral position 90c.

In addition, the pilot pressure applied to the pressure-receiving portions 91 of the first hydraulic switch valve 90A and the second hydraulic switch valve 90B exceed a boundary pressure (a switching pressure) CP2 between the neutral position 90c and the second position 90b, the first hydraulic switch valve 90A and the second hydraulic switch valve 90B are set to the second position 90b. When the hydraulic switch valves are at the second position 90b, the travel motors are in the second speed.

That is, the opening aperture of the proportional valve 145 is proportional to the pilot pressures applied to the hydraulic switch valves, and thus the travel motors are switched to the first speed and to the second speed in accordance with the opening aperture of the proportional valve 145.

As described above, the proportional valve 145 has the configuration capable of applying the preliminary pressure to the hydraulic switch valves. However, the first fluid tube 105 is provided with the discharge fluid tube 108 and further with the second throttle 109b, and thus the preliminary pressure can be precisely applied to the hydraulic switch valves.

The provision of the first throttle 109a and the second throttle 109b enlarges a range of the pressure in operation of the proportional valve 145. That is, a range of the control to the preliminary pressure can be sufficiently large to the proportional valve 145.

As shown in FIG. 1, the hydraulic system includes the control device 210 and a measurement device 218. The measurement device 218 is a device configured to detect the pressure of the operation fluid applied to the hydraulic switch valves (the first hydraulic switch valve 90A and the second hydraulic switch valve 90B), and is disposed on the fluid tube 105 or on the pressure-receiving portions 91 of the first hydraulic switch valve 90A and the second hydraulic switch valve 90B.

In the embodiment, the measurement device 218 is disposed on the fluid tube 105 between the second throttle 109b and the pressure-receiving portions 91. The pressure of the operation fluid detected by the measurement device 218 (the pilot pressure) is inputted to the control device 210.

The control device 210 operates the first proportional valve 73A and the second proportional valve 73B. An operation member 78 is connected to the control device 210. The operation member 78 is disposed around the operator seat 13. The operation member 78 is constituted of a seesaw switch, a slide switch, or a push switch. The seesaw switch is configured to be swingable. The slide switch is configured to be slidable. The push switch is configured to be pushable. An operation extent of the operation member 78 is inputted to the control device 120. The control device 210 outputs a control signal (for example, an electric current) based on the operation extent of the operation member 78 to the first proportional valve 73A or to the second proportional valve 73B.

The control valve 73 (the first proportional valve 73A and the second proportional valve 73B) are opened and closed in accordance with a control signal outputted from the control device 210. In this manner, when a pressure of the operation fluid reaches a predetermined pressure (a threshold pressure) or more, the operation fluid being outputted to the control valves 73 (the first proportional valve 73A and the second proportional valve 73B), the auxiliary control valve 70C is switched to the first position 79a, the second position 79b, and the third position 79c, and thus the hydraulic actuator 76 is operated.

The control device 210 is constituted of a CPU and the like. The control device 210 is connected to the proportional valve 145. The control valve 110 controls the proportional valve 145 in accordance with an operation member 115 connected to the control device 210. The operation member 115 is a member used for switching the travel motors (the first travel motor 80A and the second travel motor 80B) to the first speed and to the second speed. The operation member 115 is constituted of a seesaw switch, a slide switch, or a push switch. The seesaw switch is configured to be swingable. The slide switch is configured to be slidable. The push switch is configured to be pushable.

When the seesaw switch is swung to one side, the travel motor is set to be in the first speed. When the seesaw switch is swung to the other side, the travel motor is set to be in the second speed. When the slide switch is slid to one side, the travel motor is set to be in the first speed. When the slide switch is slid to the other side, the travel motor is set to be in the second speed. Every time when the push switch is pushed, the travel motor is switched from the second speed to the first speed or from the first speed to the second speed.

The control device 210 stores any one of the applied pressure F1 lower than the switching pressure CP1, the opening aperture of the proportional valve 145 corresponding to the applied pressure F1 (the applied opening aperture), and the electric current value corresponding to the applied opening aperture (the applied electric current). In the explanation of the embodiment, the control device 210 stores the applied electric current value corresponding to the applied pressure F1. Meanwhile, in the case where the control device 210 stores the applied pressure F1 or the applied opening aperture, the control device 210 converts the applied pressure F1 or the applied opening aperture into the control signal (the applied electric current), and thereby controls the proportional valve 45.

The control device 210 outputs for example the applied electric current to the proportional valve 145 in the case where the travel motor is in the first speed. The proportional valve 145 opens in accordance with the applied electric current. As the manner, the applied pressure F1 is applied to the pressure-receiving portions of the hydraulic switch valves as shown in a speed-changing pressure L20 of FIG. 13.

Then, the control device 210 monitors a detected pressure F2 of the operation fluid detected by the measurement device 218, that is, an actual applied pressure F2 after applying the applied electric current to the proportional valve 145, that is, in an applying period. In particular, as shown in FIG. 13, the control device 210 judges whether the actual applied pressure F2 is equal to or more than a warning pressure F3 preliminarily determined under a state where the control device 210 applies the applied pressure F1 to the hydraulic switch vales(that is, in the first speed). The warning pressure F3 is a pressure set between the switching pressure CP1 and the applied pressure F1 preliminarily set in the control device 210.

When the actual applied pressure F2 is equal to or more than the warning pressure F3, that is, when the actual applied pressure F2 increases over the applied pressure F1 due to a certain reason (for example, a load fluctuation and the like in operation), thereby being equal to or more than the warning pressure F3, the control device 210 stops controlling the applied pressure to the proportional valve 145. That is, when the actual applied pressure F2 is equal to or more than the warning pressure F3, the control device 210 stops outputting the applied electric current to the proportional valve 145 (demagnetizes a solenoid of the proportional valve 145).

That is, when the actual applied pressure F2 is equal to or more than the warning pressure F3, the proportional valve 145 is fully closed to stop applying the operation fluid to the hydraulic switch valve.

In this manner, the hydraulic switch valve can be prevented from being switched to the neutral position 90c and the second position 90b even in a case where the actual applied pressure F2 applied to the hydraulic switch valves increases due to a certain reason under the state where the operation fluid is applied to the hydraulic switch valves. That is, the hydraulic switch valves switchable to the plurality of switching positions are prevented from being switched unwillingly by the applied pressure F1, and thus the preliminary pressure can be applied certainly.

In addition, in a case where the operation member 115 sets the second speed under the state where the hydraulic switch valve is at the first position 90a, that is, the first speed, the control device 210 outputs the control signal to the proportional valve 145 regardless during the operation fluid is applied to the hydraulic switch valve or is stopped to be applied to the hydraulic switch, and thus the control device 210 increases the pressure of the operation fluid applied to the hydraulic switch valves to the switching pressure CP2 or more.

When the pressure of the operation fluid applied to the hydraulic switch valve (the actual applied pressure F2) is equal to or more than the switching pressure CP2 and reaches the setup pressure Q3 preliminarily determined, the control device 210 controls the opening aperture of the proportional valve 145 such that the actual applied pressure F2 is equal to the setup pressure Q3.

In addition, in a case where the operation member 115 sets the first speed under the state where the hydraulic switch valve is at the second position 90*b*, that is, the second speed, the control device 210 outputs the control signal (the applied electric current) to the proportional valve 145. Thus, the speed-changing pressure L20 is gradually decreased, and then the hydraulic switch valves are switched from the second position 90*b* to the first position 90*a*. The applied pressure F1 is applied to the hydraulic switch valve after the speed-decreasing from the second speed to the first speed.

Figure 14:
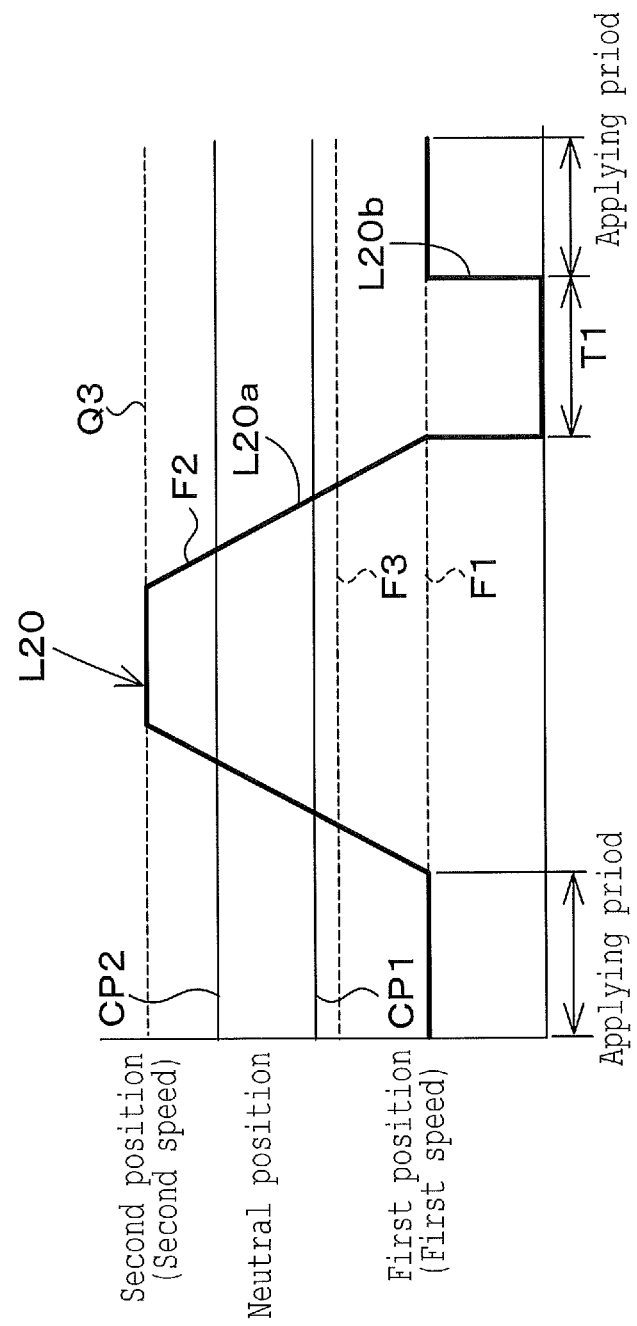
FIG. 14 is a view illustrating an example for applying a pressure to a hydraulic switch valve in deceleration according to the second embodiment.

In the embodiment described above, the proportional valve 145 applies the applied pressure F1 to the hydraulic switch valve in the speed decreasing from the second speed to the first speed. However, the proportional valve 145 may stop applying the applied pressure F1 to the hydraulic switch valve. As shown in FIG. 14, the control device 210 demagnetizes the solenoid of the proportional valve 145 in a case where the operation member 115 sets the speed-decreasing from the second aped to the first speed.

In this manner, the proportional valve 145 is fully closed, the pressure applied to the hydraulic switch valve is substantially zero as shown in a speed-changing pressure L20*a* of FIG. 14. That is, the proportional valve 145 does not apply the applied pressure F1 to the hydraulic switch valve in a case where the first speed has been set in the speed-decreasing from the second aped to the first speed.

In addition, when a predetermined time T1 preliminarily determined under the state where the first speed is set after the speed-decreasing from the second speed to the first speed (after the control device 210 demagnetizes the solenoid of the proportional valve 145), the control device 210 outputs the applied electric current to the proportional valve 145 again, As the result, the pressure applied (supplied) to the hydraulic switch current is increased to the applied pressure F1 as shown in the speed-changing pressure L20*b* of FIG. 14. That is, the proportional valve 145 sets the pressure of the operation fluid to be substantially zero for a predetermined time T1 after the speed-decreasing, the pressure being applied (supplied) to the hydraulic switch valve.

As described above, the proportional valve 145 stops to apply the applied pressure F1 in the speed-decreasing from the second speed to the first speed, and thereby the operation fluid is supplied stably to the hydraulic switch valves. In other words, the operation of the proportional valve 145 is returned at once to an initial position such as the fully closed position, and thus the pressure of the operation fluid (the applied pressure) applied to the hydraulic switch valve can be constant easily.

For example, in a case where the proportional valve 145 is a valve having a relatively-large hysteresis, the applied pressure in the first speed is different from the applied pressure in the speed-decreasing from the second speed to the first speed due to the hysteresis. In the embodiment mentioned above, the proportional valve 145 is fully closed at once in the speed decreasing, and thus the difference between the two applied pressures can be reduced.

Figure 15:
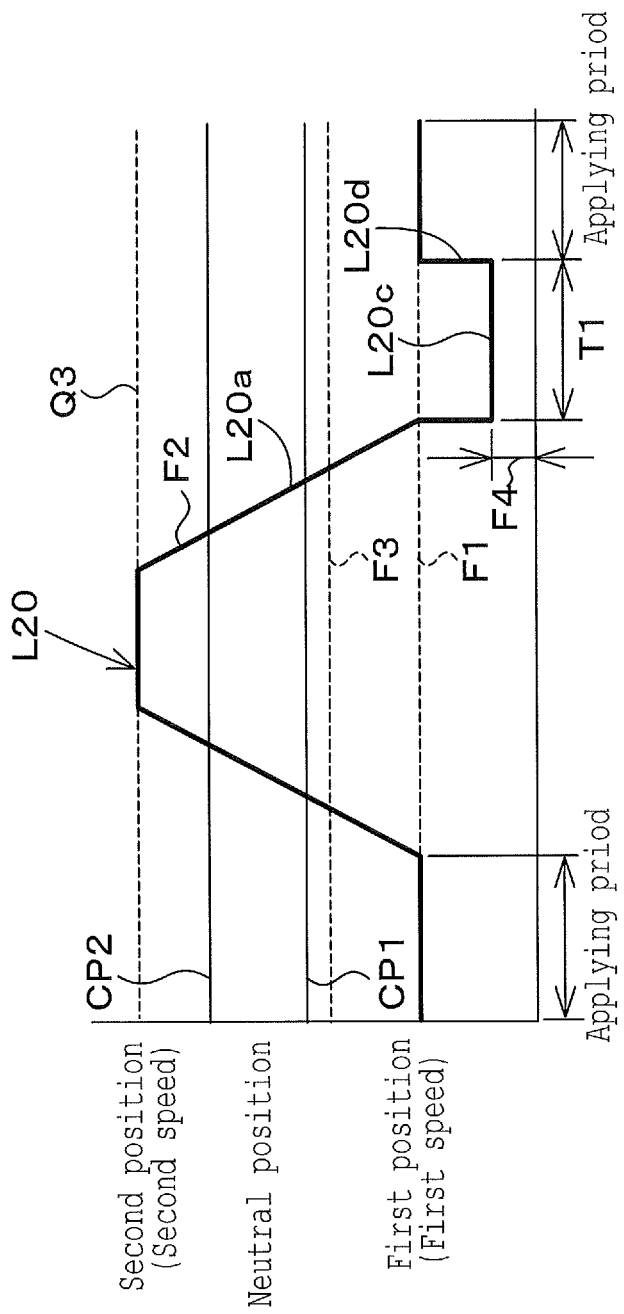
FIG. 15 is a view illustrating an example for applying a deceleration setup pressure in deceleration, the deceleration setup pressure being different from an applied pressure according to the second embodiment.

In addition, the pressure of the operation fluid is substantially zero in the speed-decreasing from the second speed to the first speed in FIG. 14, the pressure being applied (supplied) to the hydraulic switch valves. Instead of that, the proportional valve 145 may apply a speed-decreasing setup pressure F4 to the hydraulic switch valve as shown in FIG. 15, the speed-decreasing setup pressure F4 being a pressure less than the applied pressure.

The control device 210 stores the speed-decreasing setup pressure F4 lower than the applied pressure F1, the opening aperture of the proportional valve 145 (a speed-decreasing opening aperture) corresponding to the speed-decreasing setup pressure F4, and an electric current value (a speed-decreasing electric current) corresponding to the speed-decreasing opening aperture. In a case of the speed-decreasing from the second speed to the first speed, the control device 210 outputs the speed-decreasing electric current corresponding to the speed-decreasing opening aperture to the proportional valve 145.

Then, the proportional valve 145 opens in accordance with the speed-decreasing opening aperture. As the result, the pressure applied to the hydraulic switch vales (the fluid tube 105) is to be the speed-decreasing setup pressure F4 immediately after the speed-decreasing as shown in a speed-changing pressure L20*c* of FIG. 15.

In addition, when the predetermined time T1 has passed under a state where the first speed is set after the speed-decreasing from the second speed to the first speed, the control device 210 outputs the applied electric current to the proportional valve 145. Then, the pressure applied (supplied) to the hydraulic switch valve is increased to the applied pressure F1 as shown in a speed-changing pressure L20*d* of FIG. 15. That is, the proportional valve 145 sets the pressure of the operation fluid applied to the hydraulic switch valve to the speed-decreasing setup pressure F4 after the speed-decreasing for the predetermined time T1.

Meanwhile, in the embodiment mentioned above, when the second speed is set from the first speed within the predetermined time T1, the control device 210 outputs a predetermined control signal to the proportional valve 145 to change the speed from the first speed to the second speed.

As described above, instead of the applying of the applied pressure F1 by the proportional valve 145, the speed-decreasing setup pressure F4 lower than the applied pressure F1 is applied to the hydraulic switch valve in the speed-decreasing from the second speed to the first speed. In this manner, the proportional valve 145 is returned to an initial position possibly, and further the pressure can be applied to the hydraulic switch valve a bit.

The hydraulic system according to the embodiment mentioned above is capable of applying the preliminary pressure (the applied pressure), and is capable of changing the preliminary pressure in accordance with various situations.

Third Embodiment

Figure 16:
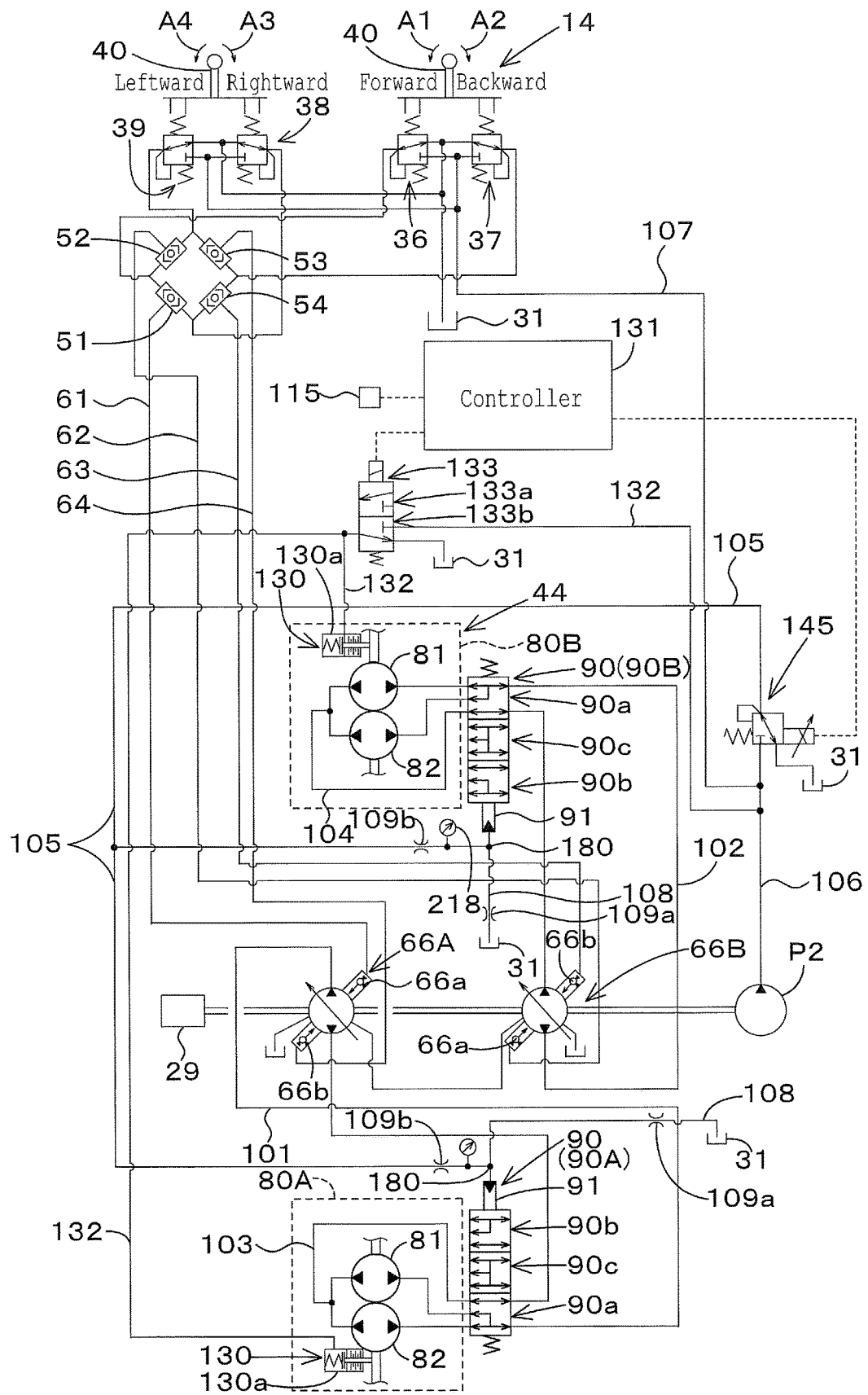
FIG. 16 is a view illustrating a hydraulic system for traveling according to a third embodiment of the present invention.

FIG. 16 shows a hydraulic system according to a third embodiment of the present invention. The hydraulic system for traveling according to the third embodiment is capable of being applied to the hydraulic system according to the second embodiment mentioned above. The third embodiment omits the explanations of configurations similar to the configurations of the first embodiment and the second embodiment.

As shown in FIG. 16, the hydraulic system includes a brake device 130 and a control device 131. The brake device 130 is a device configured to be switched between a braking state to brake the travel device 4, that is, the travel hydraulic device 44 and a releasing state to release the braking state.

The braking device 130 brakes the travel motors (the first travel motor 80A and the second travel motor 80B). The brake device 130 includes a first disc, a second disc, and a spring. The first disc is disposed on an output shaft of the first travel motor 80A. The second disc is movable. The spring is configured to press the second disc to the first disc.

In addition, the braking device 130 includes a housing (a housing case) 130a configured to house the first disc, the second disc, and the spring. In the housing 130a, a fluid tube 321 is connected to a storage that stores the second disc.

A fluid tube 106 is connected to the fluid tube 132, and thereby the operation fluid is supplied to the storage of the housing 130a. The operation valve 133 is connected to the fluid tube 161, the operation valve 133 being openable and closable. The operation valve 133 is constituted of a switch valve (the hydraulic switch valve) having a brake position where the brake device 130 is set to the braking state and a release position where the brake device 130 is set to the release position.

When the operation valve 133 is switched to the release position (the first position 133a), the operation fluid is supplied to the storage of the housing 130a. When the pressure of the operation fluid is a predetermined pressure (a threshold value) or more in the storage, the second disc moves to a side opposite to a side for the braking (a side opposite to a pressing direction of the spring), and thus the brake device 560 releases the braking.

On the other hand, when the operation valve 133 is switched to the brake position (the second position 133b), the pressure of the pilot fluid is decreased in the storage of the housing 130a. When the pressure of the operation fluid is the predetermined pressure (the threshold value) or less in the storage, the second disc moves to a side for pressing the second disc to the first disc, and thus the brake device 130 provides the braking.

The control device 131 is capable of switching the operation valve 133. In a case where the operation valve 133 is constituted of a two-position switch valve having an electromagnetic valve, the control device 131 magnetizes the operation valve 133, and thereby switches the operation valve 133 to the first position 133a. In addition, the control device 133 demagnetizes the operation valve 133, and thereby switches the operation valve 133 to the second position 133b.

In addition, the control device 133 includes the functions included in the control device described in the first embodiment. That is, the control device 131 is capable of controlling the proportional valve 145, and the proportional valve 145 is capable of applying the preliminary pressure to the hydraulic switch valve.

When the braking is released by the brake device 130, the control device 131 controls the proportional valve 145 in accordance with the setup by the operation member 115. In particular, the control device 131 controls the proportional valve 145 as shown in FIG. 13 to FIG. 15 according to the first embodiment, and thereby switches the speed between the first speed and the second speed, applies the preliminary pressure of the operation fluid to the hydraulic switch valve, and the like.

In a case where the first speed is set and the brake device 130 provides the braking, the control device 131 sets the applied pressure F1 to be higher in applying the preliminary pressure to the hydraulic switch valve. For convenience of the explanation, the applied pressure set in releasing the braking is referred to as "a first applied pressure F1", and an applied pressure F6 different from the applied pressure F1 is referred to as "a second applied pressure F6 (not shown in the drawings)".

The control device 131 stores the opening aperture (the applied opening aperture) of the proportional valve 145, the opening aperture corresponding to the second applied pressure F6, or the electric current value (the applied electric current value) corresponding to the applied opening aperture. The second applied pressure F6 is at least larger than the first applied pressure F1, and is substantially equal to the warning pressure F3. In addition, the second applied pressure F6 may be larger than the switching pressure CP1.

The control device 131 sets the pressure of the operation fluid applied to the hydraulic switch valve to the second applied pressure F6 under a condition that the first speed is set and the control device 131 controls the brake device 130 to provide the braking. In particular, the control device 131 outputs the applied electric current value corresponding to the second applied pressure F6 in a case where the control device 131 demagnetizes the operation valve 133 under a state where the operation member 115 inputs the setting of the first speed to the control device 131.

Meanwhile, the control device 131 stops applying the operation fluid of the second applied pressure F6 under a condition other than the condition described above, for example, a condition that the second speed is set, a condition that the braking by the brake device 130 is released, and the like.

Thus, in a case where the operation valve 133 is at the brake position 133b, the proportional valve 145 sets the applied pressure to the predetermined pressure (a threshold value) or more, that is, to the second applied pressure F6, the applied pressure supplying the operation fluid to the hydraulic switch valve. In this manner, the operation fluid applied to the pressure-receiving portion 91 of the hydraulic switch valve is increased, and thus the operation fluid between the proportional valve 145 and the pressure-receiving portion 91 of the hydraulic switch valve is circulated efficiently through the discharge fluid tube 108.

In the above-mentioned embodiment, the pressure of the pilot fluid applied to the pressure-receiving portion 91 of the hydraulic switch valve is gradually increased and decreased in the speed-changing (the speed-increasing from the first speed to the second speed and the speed-decreasing from the second speed to the first speed), that is, the slope is inclined during a portion corresponding to the speed changing in the speed-changing pressure L20. However, as shown in FIG. 17, the speed-changing pressure L2 may be increased and decreased at once to an intermediate pressure in the speed changing.

Figure 17:
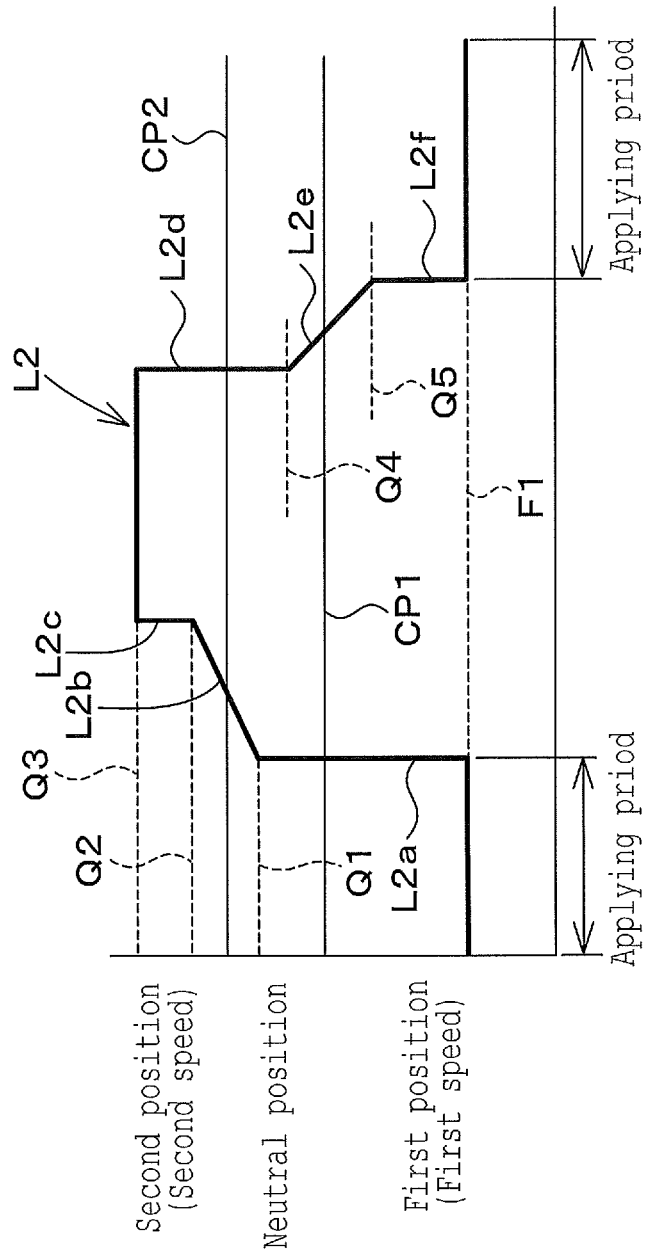
FIG. 17 is a view illustrating a modified example that shows the relation between the pilot pressure and the position of the hydraulic switch valve according to the third embodiment.

In the speed-changing from the first speed to the second speed, the speed-changing pressure is increased once to the first setup pressure Q1 from a state where the proportional valve 145 applies the applied pressure F1 to the hydraulic pressure as shown in the speed-changing pressure L2a of FIG. 17, the first setup pressure Q1 being determined corresponding to the neutral position 8 (a first step).

When the pressure applied to the pressure-receiving portion 91 of the hydraulic switch valve reaches the first setup pressure Q1, the speed-changing pressure is gradually increased to the second setup pressure Q2 upon reaching the first setup pressure Q1, the second setup pressure Q2 being determined corresponding to the second position, as shown in the speed-changing pressure L2b (a second step).

Then, when the pressure applied to the pressure-receiving portion 91 of the hydraulic switch valve reaches the second setup pressure Q2, the speed-changing pressure is increased once to the third setup pressure Q3, the third setup pressure Q3 being determined corresponding to the second position, as shown in the speed-changing pressure L2c (a third step).

That is, as shown in FIG. 17, the increasing of the speed-changing pressure is divided into three steps in the speed-changing from the first speed to the second speed.

On the other hand, the proportional valve 145 is closed from the state where the proportional valve 145 is maintained to a predetermined position in the speed-changing from the second speed to the first speed as shown in the speed-changing pressure L2d of FIG. 17, and the speed-changing pressure is decreased once to the fourth setup pressure Q4 determined corresponding to the neutral position (a first step).

When the pressure applied to the pressure-receiving portion 91 of the hydraulic switch valve reaches the fourth setup pressure Q4, the speed-changing pressure is gradually decreased to the fifth setup pressure Q5 upon reaching the fourth setup pressure Q4, the fifth setup pressure Q5 being determined corresponding to the first position, as shown in the speed-changing pressure L2e (a second step).

Then, when the pressure applied to the pressure-receiving portion 91 of the hydraulic switch valve reaches the fifth setup pressure Q5, the speed-changing pressure is decreased once to the applied pressure F1 (a third step).

That is, as shown in FIG. 17, the decreasing of the speed-changing pressure is divided into the three steps in the speed-changing from the second speed to the first speed.

In the hydraulic system, the second throttle 109b is disposed on the first fluid tube 105, and the measurement device 218 is disposed between the second throttle 109b and the pressure-receiving portion 91 of the hydraulic switch valve. In this manner, the proportional valve 145 is operated, and thereby the pressure of the operation fluid applied to the pressure-receiving portion 91 of the hydraulic switch valve is easily set (controlled) as described above. Thus, the hydraulic switch valve can be switched precisely.

In other words, the second throttle 109b is disposed on the first fluid tube 105, and thereby the relation between the opening aperture of the proportional valve 45 and the pressure of the operation fluid applied to the pressure-receiving portion 91 of the hydraulic switch valve is easily stabilized. In addition to that, the proportional valve 145 is controlled by the measurement device 218 disposed between the second throttle 109b and the pressure-receiving portion 91, and thereby improving an accuracy of setting the pressure of the operation fluid applied to the pressure-receiving portion 91 of the hydraulic switch valve.

The hydraulic system according to the embodiment mentioned above is capable of applying the preliminary pressure (the applied pressure), and is capable of changing the preliminary pressure in accordance with various situations.

Fourth Embodiment

Figure 18:
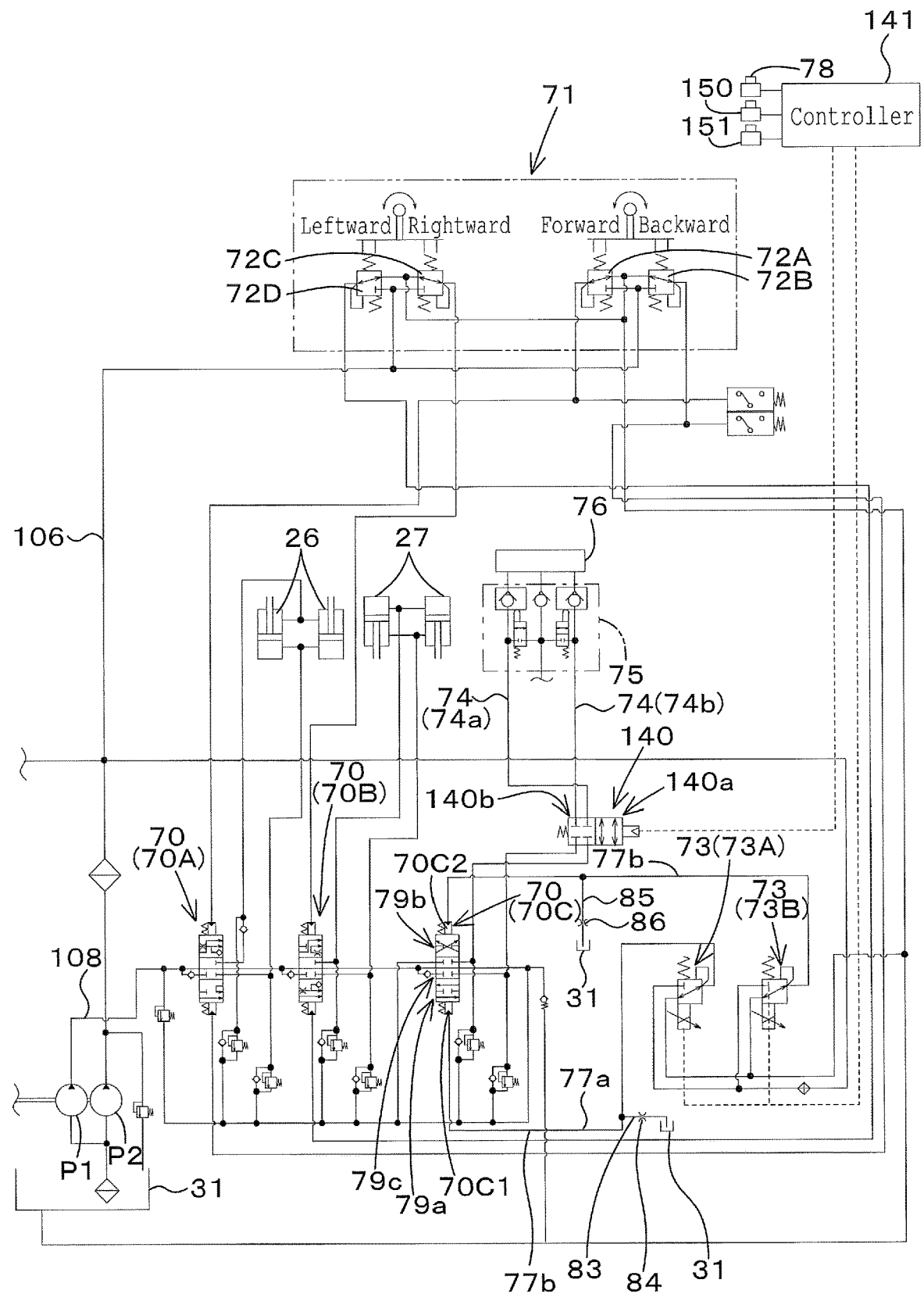
FIG. 18 is a view illustrating a hydraulic system for operating according to a fourth embodiment of the present invention.

FIG. 18 shows a hydraulic system according to a fourth embodiment. The hydraulic system for operating according to the fourth embodiment can be applied to the hydraulic systems according to the above-mentioned second embodiment and to the above-mentioned third embodiment. The fourth embodiment omits the explanation of the configurations similar to the configurations according to the first embodiment to the third embodiment.

As shown in FIG. 18, the hydraulic system includes a shut-off valve (a switch valve) 140 and a control device 141. The shut-off valve (a shut valve) 140 is a valve configured to open and close (shut off) a fluid tube (a fluid path) between the control valve 70 and the hydraulic actuator.

In particular, the shut-off valve 140 is disposed on an intermediate portion of the shared discharge fluid tube 74, that is, on the intermediate portions of the fluid tube 74a and the fluid tube 74b. The shut-off valve 140 is a switch valve configured to be switched to a first position 140a to open the shared discharge fluid tube 74 and to a second position 140b to close (shut off) the shared discharge fluid tube 74.

Thus, when the shut-off valve 140 is set to the first position 140a, the intermediate portion of the fluid tube 74a is connected to the intermediate portion of the fluid tube 74b. When the shut-off valve 140 is set to the second position 140b, both of the fluid tube 74a and the fluid tube 74b are closed (shut off).

A discharge fluid tube (a discharge fluid path) 83 is connected to a fluid tube (a fluid path) 77a. The discharge fluid tube 83 is connected to the operation fluid tank 31. A throttle 84 is disposed on the discharge fluid tube 83. The throttle 84 is configured to decrease the flow rate of the operation fluid flowing in the discharge fluid tube 83.

A discharge fluid tube (a discharge fluid path) 85 is connected to a fluid tube (a fluid path) 77b. The discharge fluid tube 85 is connected to the operation fluid tank 31. A throttle 86 is disposed on the discharge fluid tube 85. The throttle 86 is configured to decrease the flow rate of the operation fluid flowing in the discharge fluid tube 85.

The control device 141 controls the proportional valve 73. an operation member 78 is connected to the control device 141. An operation extent (an operation amount) of the operation member 78 is inputted to the control device 141. The control device 141 outputs a control signal (for example, an electric current) to a first proportional valve 73A or the second proportional valve 73B, the control signal corresponding to the operation extent of the operation member 78.

The proportional valve 73 (the first proportional valve 73A and the second proportional valve 73B) are opened and closed in accordance with the control signal outputted by the control device 141. Thus, the control device 141 is capable of controlling an operation of an auxiliary attachment.

Figure 19:
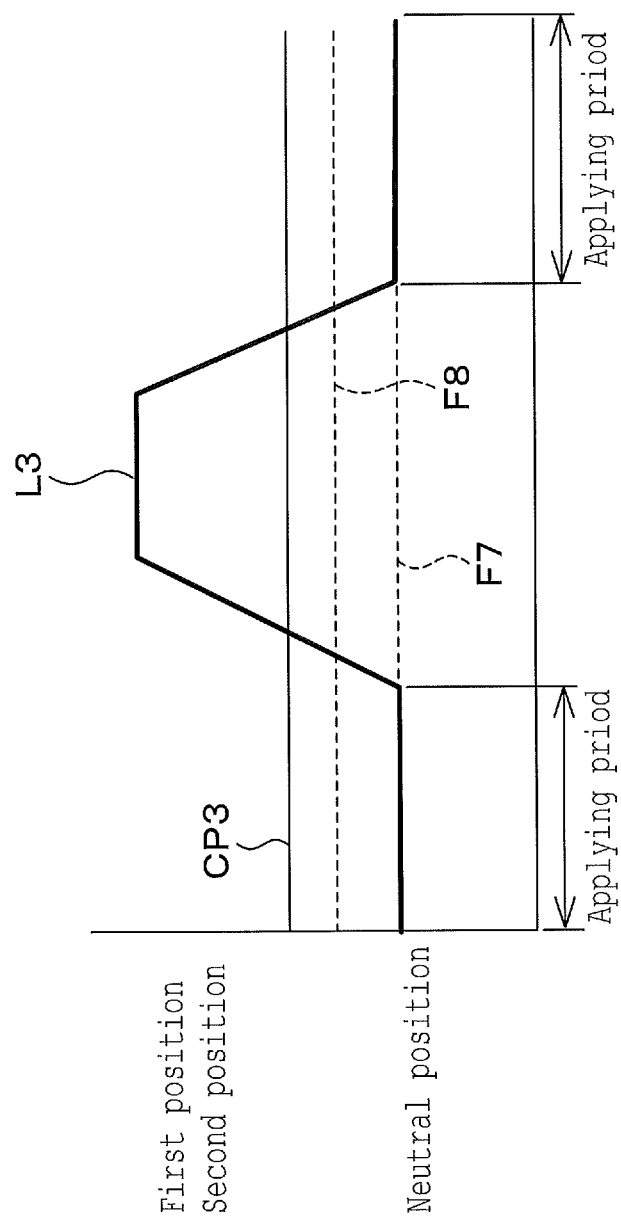
FIG. 19 is a view illustrating a relation between a position of a hydraulic switch valve and a pilot pressure applied to a pressure-receiving portion of an auxiliary control valve according to the fourth embodiment.

In addition, the control device 141 controls the proportional valve 73 on the basis of a state of the shut-off valve 140. FIG. 19 is a view showing a relation between the pilot pressure and the switching of the auxiliary control valve 70C, the pilot pressure being applied to the pressure-receiving portions 70C1 and 70C2 of the auxiliary control valve 70C. The switching pressure CP3 shown in FIG. 19 is a pressure for boundary where the auxiliary control valve 70C is switched from the neutral position 79c to the first position 79a or the second position 79c. The applied pressure F7 shown in FIG. 19 is a pressure less than the switching pressure CP3.

When the shut-off valve 140 is at the first position 140a to be opened without the operation of the operation member 78 (when the auxiliary control valve 70C is at the third position (the neutral position 79c)), the control device 141 outputs the applied electric current to the proportional valves 73 (the first proportional valve 73A and the second proportional valve 73B).

As shown in the speed-changing pressure L3 of FIG. 19, the applied pressure F7 can be applied to the auxiliary control valve 70C when the shut-off valve 140 is opened without the operation of the operation member 78.

In addition, the control device 141 increases the pressure of the operation fluid to be larger than the applied pressure F7 preliminarily set, the pressure of the operation fluid being applied to the auxiliary control valve 70C, under the condition that the shut-off valve 140 is at the second position 140b to be closed (shut off) without the operation of the operation member 78. For example, the pressure of the operation fluid applied to the auxiliary control valve 70C may be substantially equal to the warning pressure F8 set between the applied pressure F7 and the switching pressure CP3 or may be larger than the switching pressure CP3.

In other words, the pressure of the operation fluid (the applied pressure) applied to the auxiliary control valve 70C is set to be the warning pressure F8 or to be the switching pressure CP3 or more when the shut-off valve 140 is closed (shut off). And, the pressure of the operation fluid applied to the auxiliary control valve 70C is equal to the applied pressure F7 when the shut-off valve 140 is opened.

In addition, the control device 141 outputs an electric current to the proportional valve 73, the electric current corresponding to the operation extent of the operation member 78, under the condition that the shut-off valve 140 is at the first position 140a to be opened with the operation of the operation member 78. Thus, when the operation member 78 is operated with the shut-off valve 140 opened, the auxiliary control valve 70C can be switched in accordance with the operation of the operation member 78.

The pressure of the operation fluid (the applied pressure) applied to the auxiliary control valve 70C may be set on the basis of a temperature of the operation fluid.

As shown in FIG. 18, a measurement device (a first measurement device) 150 is connected to the control device 141. The measurement device 150 is configured to detect the temperature of the operation fluid. When the shut-off valve 140 is closed (shut off) without the operation of the operation member 78 and a temperature of the operation fluid detected by the measurement device 150 is a predetermined value or less (a threshold value or less), the control device 141 sets the pressure of the operation fluid (the applied pressure) to be equal to or more than the warning pressure F8 or the switching pressure CP3, the pressure of the operation fluid (the applied pressure) being applied to the auxiliary control valve 70C.

For example, when the temperature of the operation fluid is low to have high viscosity, the control device 141 sets the pressure of the operation fluid (the applied pressure) to be equal to or larger than the warning pressure F8 or the switching pressure CP3, the pressure of the operation fluid (the applied pressure) being applied to the auxiliary control valve 70C.

In addition, the pressure of the operation fluid (the applied pressure) being applied to the auxiliary control valve 70C may be set on the basis of the outdoor temperature. As shown in FIG. 18, a measurement device (a second measurement device) 151 is connected to the control device 141. The measurement device 151 is configured to detect the outdoor temperature.

When the shut-off valve is closed (shut off) without the operation of the operation member 78 and the outdoor temperature detected by the measurement device 151 is a predetermined value or less (a threshold value or less), the control device 141 sets the pressure of the operation fluid (the applied pressure) to be the warning pressure F8 or to be the switching pressure CP3 or more, the pressure of the operation fluid (the applied pressure) being applied to the auxiliary control valve 70C.

The hydraulic system according to the embodiment mentioned above is capable of applying the preliminary pressure (the applied pressure), and is capable of changing the preliminary pressure in accordance with various situations.

Fifth Embodiment

Figure 20:
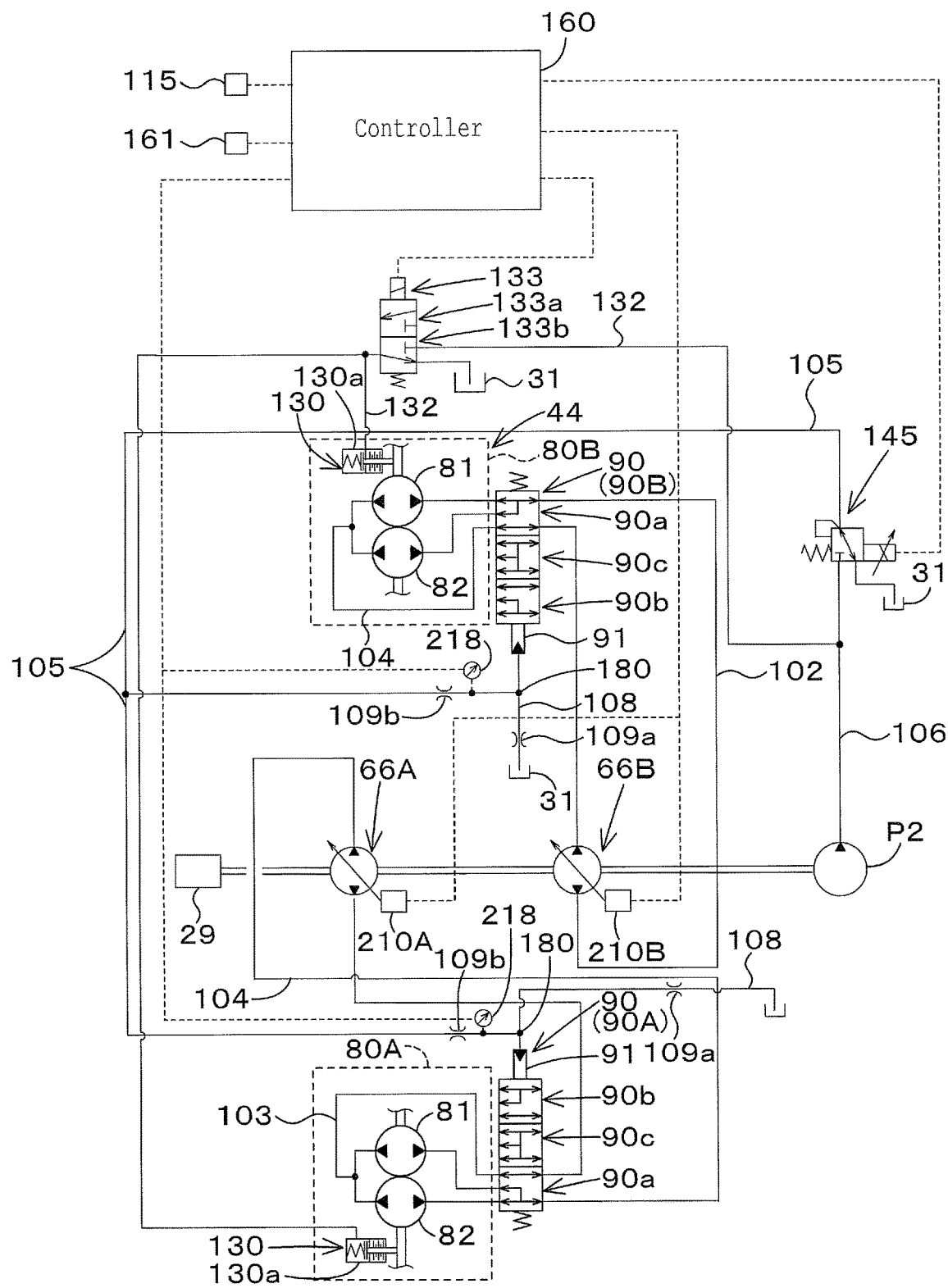
FIG. 20 is a view illustrating a hydraulic system for traveling according to a fifth embodiment of the present invention.

FIG. 20 shows a hydraulic system according to a fifth embodiment of the present invention. The hydraulic system for traveling according to the fifth embodiment can be applied to the hydraulic systems according to the above-mentioned second embodiment and to the above-mentioned fourth embodiment. The fifth embodiment omits the explanation of the configurations similar to the configurations according to the first embodiment to the fourth embodiment.

In the embodiments mentioned above, the first travel hydraulic pump 66A and the second travel hydraulic pump 66B are operated by the remote control valves 36, 37, 38, and 39. In the fifth embodiment, the first travel hydraulic pump 66A and the second travel hydraulic pump 66B are operated by an operation valve 210A and an operation valve 210B.

Each of the operation valve 210A and the operation valve 210B is constituted of an electromagnetic proportional valve (a proportional valve). The electromagnetic proportional valve is configured to change an opening aperture in accordance with a control signal. The second hydraulic pump P2 is capable of supplying the operation fluid to the operation valve 210A and the operation valve 210B through a fluid tube (a fluid path) not shown in the drawings.

The opening apertures of the operation valve 210A and the operation valve 210B are changed to change the pressure of the operation fluid (the pilot pressure) applied to the travel hydraulic pumps (the first travel hydraulic pump 66A and the second travel hydraulic pump 66B).

An angle of the swash plate can be changed by the pressure applied to the travel hydraulic pump. For convenience of the explanation, the operation valve 210A will be referred to as the proportional valve 210A below, and the operation valve 210B will be referred to as the proportional valve 210B below.

The hydraulic system includes the brake device 130 and the control device 160. The brake device 130 has the configuration similar to the configuration described in the fourth embodiment. The control device 160 magnetizes the operation valve 133 to switch the operation valve 133 to the first position 133a. In addition, the control device 160 demagnetizes the operation valve 133 to switch the operation valve 133 to the second position 133b.

In addition, the control device 160 controls the proportional valve 210A and the proportional valve 210B in accordance with the operation member 161 connected to the control device 160. That is, the control device 160 controls the travel hydraulic pumps (the first travel hydraulic pump 66A and the second travel hydraulic pump 66B).

When the brake device 130 releases the braking, the control device 160 controls the proportional valve 210A and the proportional valve 210B in accordance with the setting by the operation member 161. When the operation member 161 is swung from the neutral position to one direction or to the other direction with the braking released, the control device 160 outputs the control signal (for example, the electric current) to the proportional valve 210A and the proportional valve 210B in accordance with a swinging extent (the operation extent).

The opening apertures of the proportional valve 210 and the proportional valve 210B are increased in accordance with the control signal, and the angles of the swash plates of the travel hydraulic pumps (the first travel pump 66A and the second travel pump 66B) are increased in accordance with the opening apertures. An output rate of the operation fluid is increased in accordance with the increasing of the angle of the swash plates included in the travel hydraulic pumps (the first travel hydraulic pump 66A and the second travel hydraulic pump 66B).

When the operation member 161 is swung from a position in one direction or in the other direction to the neutral position with the braking released, the control device 160 outputs the control signal (for example, the electric current) to the proportional valve 210A and the proportional valve 210B in accordance with the swinging extent (the operation extent).

The opening apertures of the proportional valve 210 and the proportional valve 210B are decreased in accordance with the control signal, and the angles of the swash plates of the travel hydraulic pumps (the first travel pump 66A and the second travel pump 66B) are decreased in accordance with the opening apertures. An output rate of the operation fluid is decreased in accordance with the decreasing of the angle of the swash plates included in the travel hydraulic pumps (the first travel hydraulic pump 66A and the second travel hydraulic pump 66B).

In the case where the operation member 161 is not operated with the braking released, the control device 160 controls the opening apertures of the proportional valve 210A and the proportional valve 210B, and thereby applies the applied pressure (the first applied pressure) F8 to the travel hydraulic pump, preventing the travel motor from revolving due to the operation fluid outputted by the travel hydraulic pump.

In the case where the brake device 130 provides the braking, the control device 160 sets the applied pressure to be higher in applying the preliminary pressure to the travel hydraulic pump. That is, the control device 160 stores any one of the second applied pressure F9 not shown in the drawings, the opening apertures (the applied opening apertures) of the proportional valve 210A and the proportional valve 210B, the opening apertures corresponding to the second applied pressure F9, and the electric current value (the applied electric current value) corresponding to the applied opening aperture.

The second applied pressure F9 is at least larger than the first applied pressure F8, and is smaller than the minimum pressure of the travel hydraulic pump. At the minimum pressure, the travel motor starts to be revolved by the travel hydraulic pump.

The control device 160 sets the pressure of the operation fluid to the applied pressure F9, the pressure of the operation fluid being applied to the travel hydraulic pump, under a condition that the control device 160 controls the brake device 130 to provide the braking without the operation of the operation member 161. On the other hand, the control device 160 stops applying the operation fluid of the second applied pressure F9 under a condition other than the condition described above, for example, a condition that the operation member 161 is operated, a condition that the braking by the brake device 130 is released, a condition that the braking by the brake device 130 is released without the operation of the operation member 161, and the like.

The hydraulic system according to the embodiment mentioned above is capable of applying the preliminary pressure (the applied pressure), and is capable of changing the preliminary pressure in accordance with various situations.

Sixth Embodiment

Figure 21:
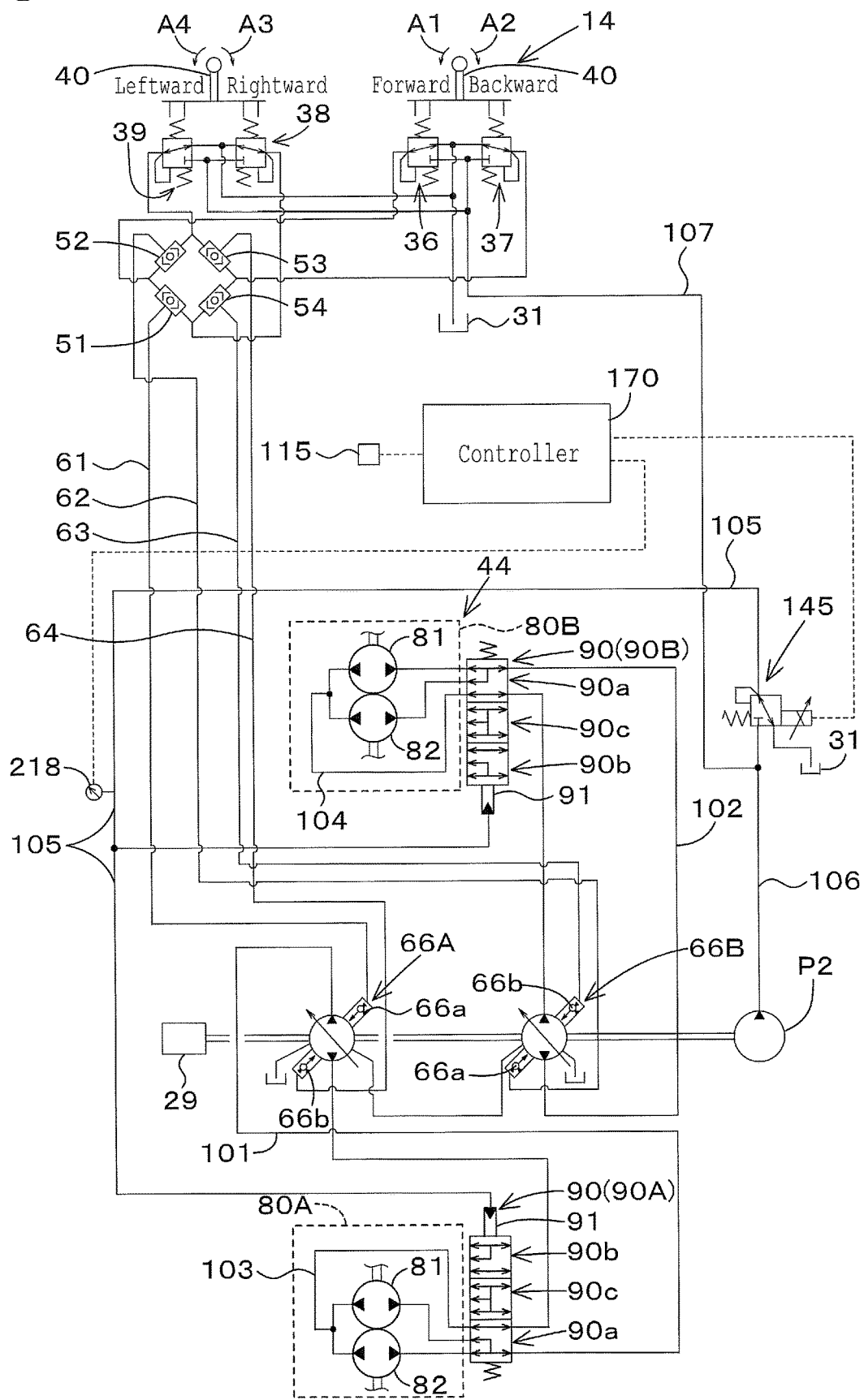
FIG. 21 is a view illustrating a hydraulic system for traveling according to a sixth embodiment of the present invention.

FIG. 21 shows a hydraulic system according to a sixth embodiment of the present invention. The hydraulic system for traveling according to the sixth embodiment can be applied to the hydraulic systems according to the above-mentioned first embodiment and to the above-mentioned fifth embodiment. The sixth embodiment omits the explanation of the configurations similar to the configurations according to the first embodiment to the fifth embodiment. The hydraulic system shown in FIG. 21 does not include the discharge fluid tube 108, the first throttle 109a, and the second throttle 109b.

In the hydraulic system for traveling, the control device 170 is constituted of a CPU and the like. The control device 170 controls the proportional valve 145 in accordance with the pressure of the operation fluid (the detected pressure) set by the operation member 115 and detected by the measurement device 218.

The control device 170 stores the applied pressure F1, the opening apertures (the applied opening apertures) of the proportional valve 145, or the electric current values (the applied electric current values), the opening apertures corresponding to the applied pressure F1, the electric current values corresponding to the opening apertures. In the explanation of the embodiment, the control device 170 stores the applied electric current values corresponding to the applied pressure F1.

When the first speed is set by the operation member 115, the control device 170 for example outputs the applied electric current to the proportional valve 145. In addition, the control device 170 monitors the detected pressure F2 in the applying period.

Figure 22:
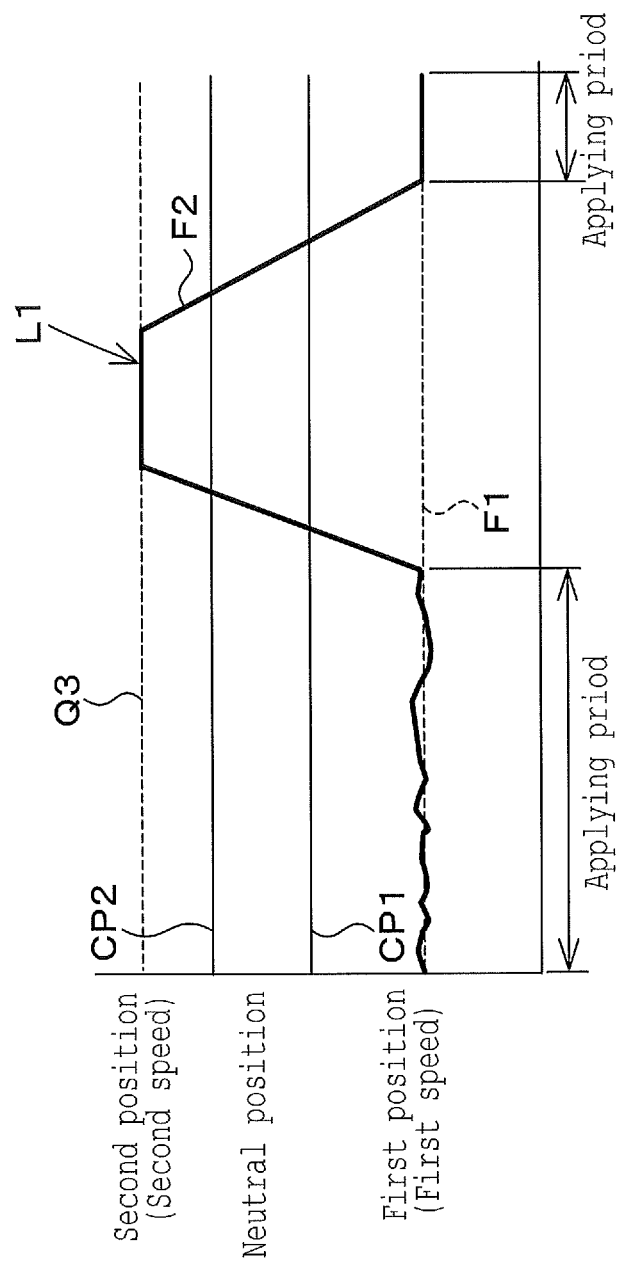
FIG. 22 is a view illustrating a relation between a pilot pressure and a position of a hydraulic switch valve according to the sixth embodiment.

As shown in FIG. 22, when the detected pressure F2 is larger than the applied pressure in the applying period, the control device 170 controls the proportional valve 145 to decrease the pressure of the operation fluid applied to the pressure-receiving portion 91 of the hydraulic switch valve, and thereby provides a feedback control to set the applied pressure F1 to be equal to the detected pressure F2.

In addition, when the detected pressure F2 is smaller than the applied pressure F1, the control device 170 controls the proportional valve 145 to increase the pressure of the operation fluid applied to the pressure-receiving portion 91 of the hydraulic switch valve, and thereby provides the feedback control to set the applied pressure F1 to be equal to the detected pressure F2.

As described above, the control device 170 monitors the detected pressure F2 and provides the feedback control, thereby setting the pressure of the operation fluid to be equal to the applied pressure F1, the pressure of the operation fluid being applied to the pressure-receiving portion 91 of the hydraulic switch valve.

In addition, in a case where the second speed is set by the operation member 115 under a state where the hydraulic switch valve is at the first position (the first speed), the control device 170 outputs the control signal to the proportional valve 145 to increase the pressure of the operation fluid to be the switching pressure CP2 or more, the pressure of the operation fluid being applied to the hydraulic switch valve.

When the pressure of the operation fluid (the applied pressure F1) applied to the hydraulic switch valve is the switching pressure CP2 or more and reaches the setup pressure Q3 preliminarily determined, the control device 170 controls the opening aperture of the proportional valve 145 such that the applied pressure F1 is to be equal to the setup pressure Q3.

In addition, when the first speed is set by the operation member 115 under a state where the hydraulic switch valve is at the second position 90b (the second speed), the control device 170 outputs the applied electric current value (the control signal) to the proportional valve 145.

Then, the switching pressure L1 is gradually decreased, the hydraulic switch valve is switched from the second position 90b to the first position 90a, and thus the applied pressure F1 is applied to the hydraulic switch valve after the speed-decreasing from the second speed to the first speed.

As described above, the control device 170 controls the proportional valve 145 to set the applied pressure F1 to be equal to the detected pressure F2 detected by the measurement device 218.

Figure 23:
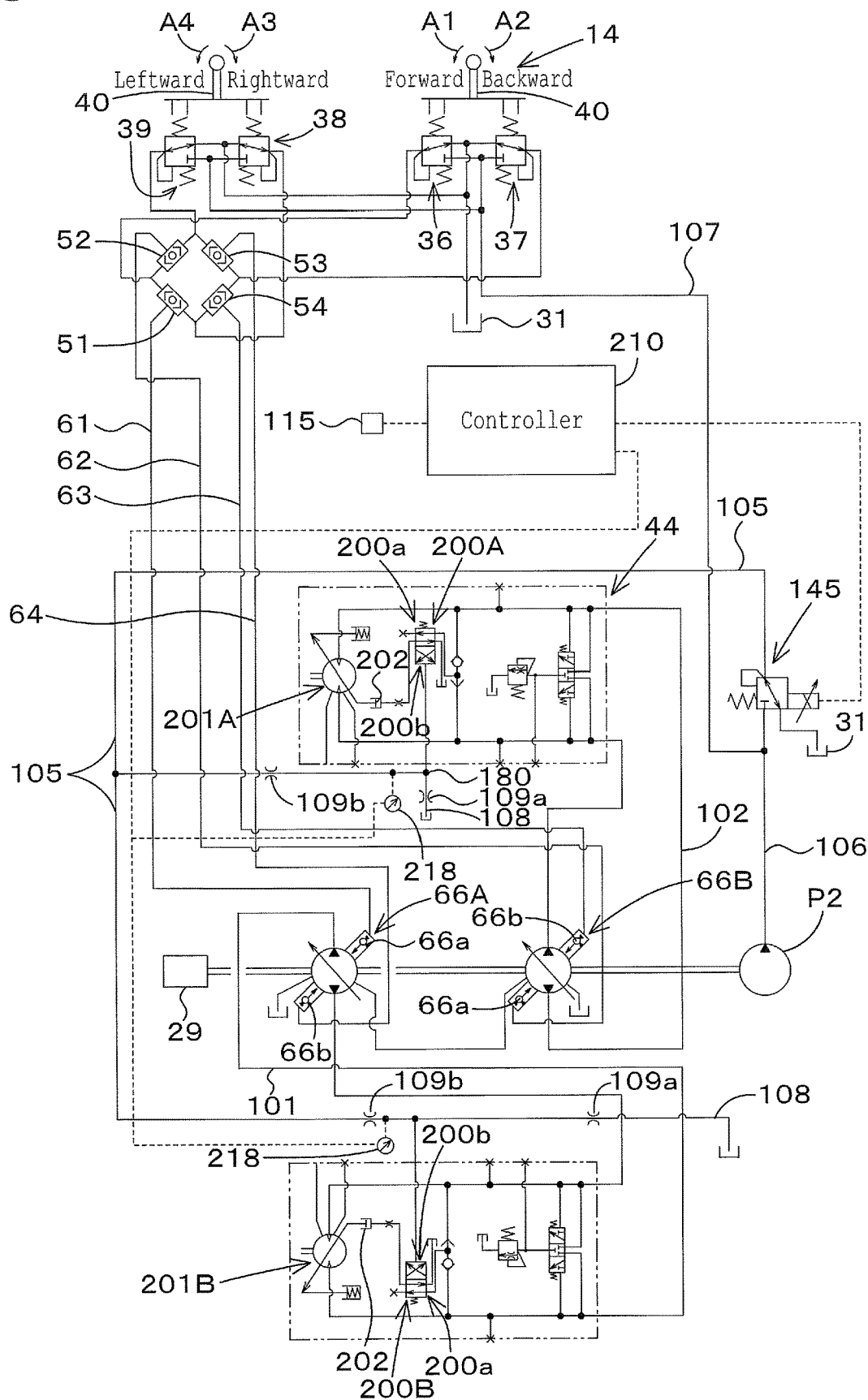
FIG. 23 is a view illustrating a modified example of a travel hydraulic device and a hydraulic switch valve according to the six embodiment.

FIG. 23 shows modified examples of the hydraulic switch valve and the travel motor. As shown in FIG. 23, the hydraulic switch valve includes the first hydraulic switch valve 200A and the second hydraulic switch valve 200B. Each of the first hydraulic switch valve 200A and the second hydraulic switch valve 200B is constituted of a two-position switch valve. The two-position switch valve is configured to be switched between the first position 200a and the second position 200b by the pilot pressure.

Figure 24:
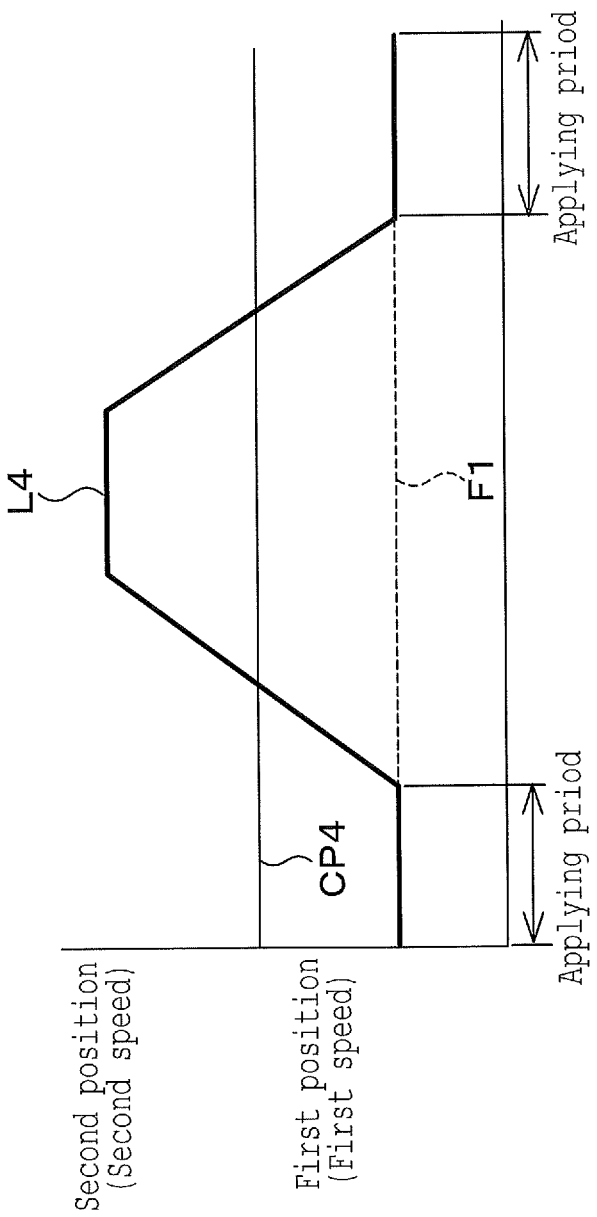
FIG. 24 is a view illustrating a relation between the pilot pressure and the position of the hydraulic switch valve according to the modified example of the six embodiment.

As shown in the speed-changing pressure L4 of FIG. 24, in a case where the pilot pressure applied to the pressure-receiving portion is less than the switching pressure CP4, the first hydraulic switch valve 200A and the second hydraulic switch valve 200B are at the first position 200a and are switched to the second position 200b when the pilot pressure is increased to the switching pressure CP4 or more.

The travel motor includes the first travel motor 201A and the second travel motor 201B. Each of the travel motor includes the first travel motor 201A and the second travel motor 201B is constituted of a variable displacement axial motor having a swash plate, the variable displacement axial motor being configured to be switched to two speeds, that is, to a high speed and to a low speed. Each of the first travel motor 201A and the second travel motor 201B includes a swash plate switching cylinder 202. The swash plate switching cylinder 202 is configured to switch an angle of the swash plate.

The swash plate switching cylinder 202 of the first travel motor 201A is connected to the first hydraulic switch valve 200A, and is stretched and shortened by the operation fluid supplied from the first hydraulic switch valve 200A. The swash plate switching cylinder 202 of the first travel motor 201B is connected to the second hydraulic switch valve 200B, and is stretched and shortened by the operation fluid supplied from the second hydraulic switch valve 200B.

In this manner, when the first travel motor 201A and the second travel motor 201B are set to the first position 200a, the swash plate switch cylinder 202 is shortened to change the angle of the swash plates of the first travel motor 201A and the second travel motor 201B. Thus, the first travel motor 201A and the second travel motor 201B are set to the first speed.

When the first travel motor 201A and the second travel motor 201B are set to the second position 200b, the swash plate switch cylinder 202 is stretched to change the angle of the swash plates of the first travel motor 201A and the second travel motor 201B. Thus, the first travel motor 201A and the second travel motor 201B are set to the second speed.

Meanwhile, the proportional valve 145 is a hydraulic switch valve not including the neutral position, but is capable of changing the speed-changing pressure L4 in accordance with the travel state, the travel load, the load of the motor, and the state of the motor.

Figure 25:
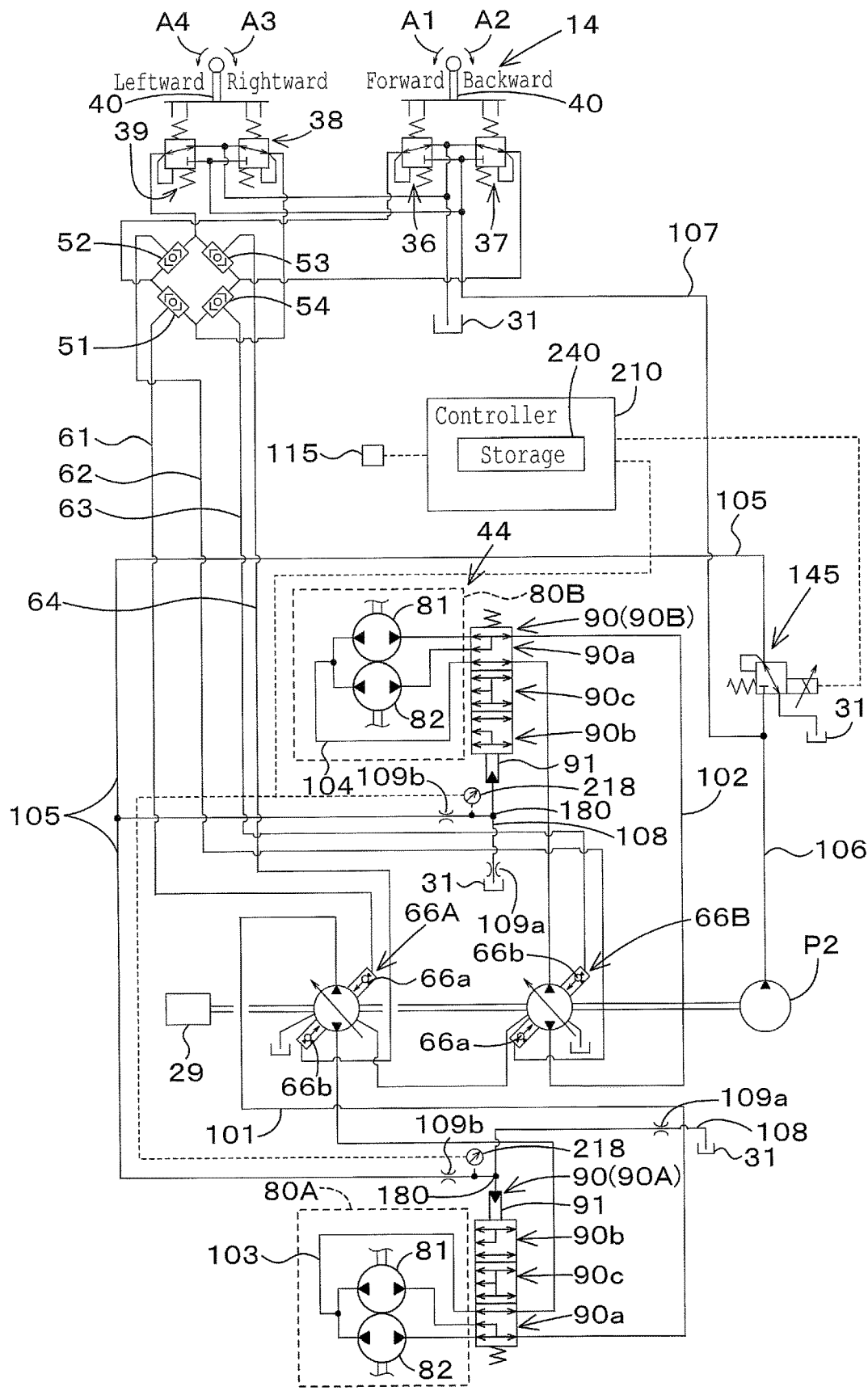
FIG. 25 is a view illustrating a hydraulic system for traveling of a case where a control device includes a storage device according to the six embodiment.

Meanwhile, as shown in FIG. 25, it is preferred that the control device 210 includes a storage 240. The storage 240 is configured to store a relation between the control signal (the electric current value) and the pressure of the operation fluid, the control signal being outputted to the proportional valve 145, the pressure of the operation fluid being detected by the measurement device 218.

The control device 210 is provided with a setup mode. The setup mode is switched to be valid and to be invalid by the operation member such as a switch and the like not shown in the drawings. In a case where the setup mode is valid, the proportional valve 145 is gradually opened from the fully-closed state and thereby gradually increases the pressure of the operation fluid from zero, the pressure of the operation fluid being applied to the pressure-receiving portion 91 of the hydraulic switch valve.

The setup mode ends when the pressure of the operation fluid reaches the applied pressure F1, the pressure of the operation fluid being applied to the pressure-receiving portion 91 of the hydraulic switch valve (the detected pressure detected by the measurement device 218). In the setup mode, the control device 210 sequentially obtains the detected pressure and the control signal (the electric current) outputted to the proportional valve 145 by the control device 210. The detected pressure is the pressure of the operation fluid applied to the pressure-receiving portion 91 of the hydraulic switch valve, and is gradually increased from zero to reach the applied pressure F1. In this manner, the storage 240 stores the relation between the detected pressure and the control signal.

That is, in the setup mode, the control device 210 obtains the relation between the control signal and the pressure of the operation fluid increasing to the applied pressure F1, the control signal being outputted to the proportional valve 145 from the control device 210. Then, the control device 210 controls a normal control when the setup mode is invalid.

In particular, in a case where the applied pressure is applied to the hydraulic switch valve in the normal control, the control device 210 controls the proportional valve 145 with use of the relation obtained in the setup mode (the control signal and the pressure stored in the storage 240). A control device other than the control device 210 may include the storage 240 and the setup mode.

Figure 26:
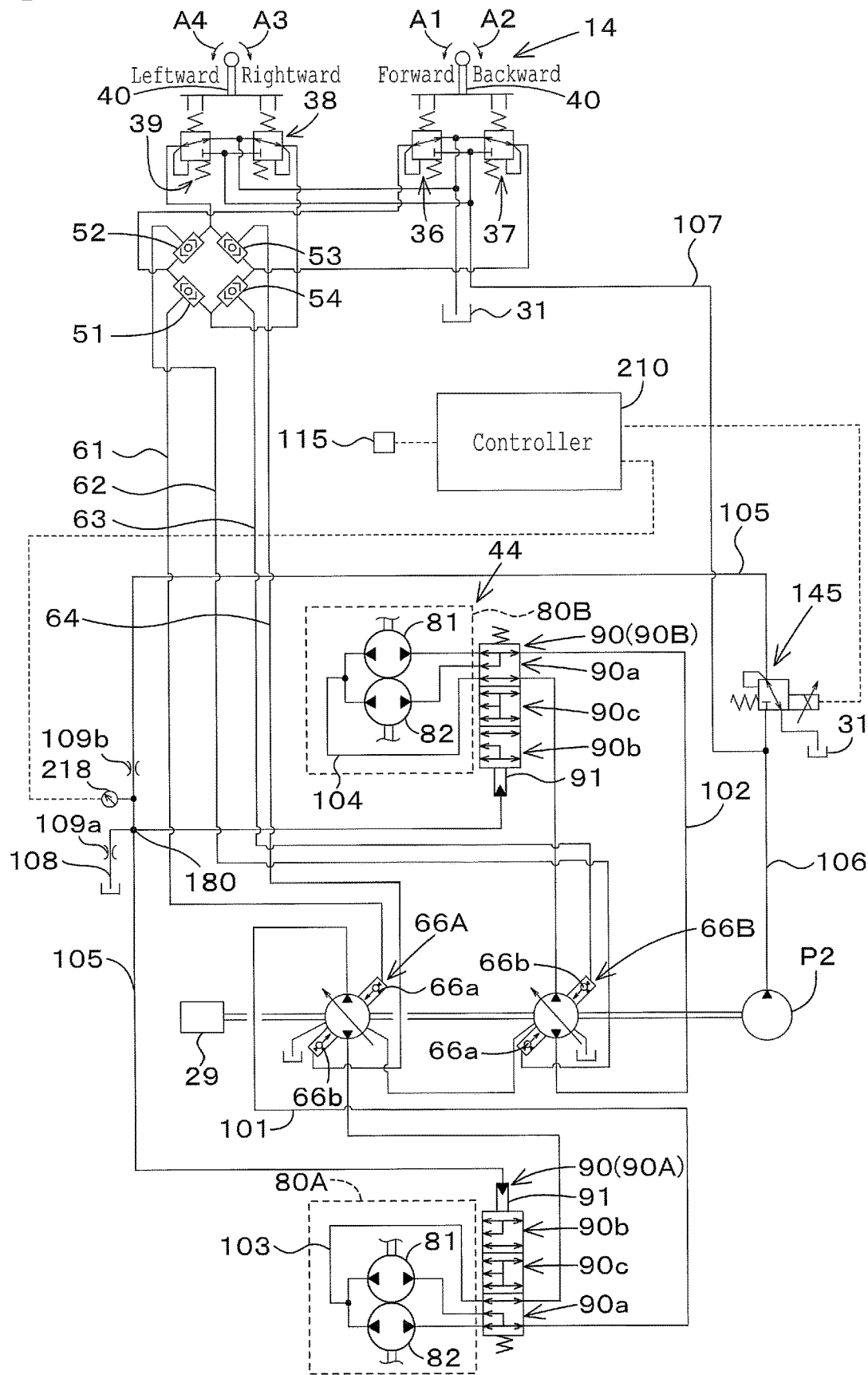
FIG. 26 is a view illustrating a hydraulic system of a case where a discharging fluid tube, a throttle, and a measurement device shared with the hydraulic switch valves according to the six embodiment.

In the embodiment mentioned above, the discharge fluid tube 108, the first throttle 109a, the second throttle 109b, and the measurement device 218 are disposed on each of the first hydraulic switch valve 90A and the second hydraulic switch valve 90B. However, as shown in FIG. 26, the discharge fluid tube 108, the first throttle 109a, the second throttle 109b, and the measurement device 218 may be shared with the first hydraulic switch valve 90A and the second hydraulic switch valve 90B.

In addition, the discharge fluid tube 108, the first throttle 109a, and the second throttle 109b may be disposed on the hydraulic system configured to apply the preliminary pressure to the hydraulic switch valve. For example, the discharge fluid tube 108, the first throttle 109a, and the second throttle 109b may be not disposed on the hydraulic systems shown in FIG. 1, FIG. 20, FIG. 23, FIG. 25, and FIG. 26.

Figure 27A:
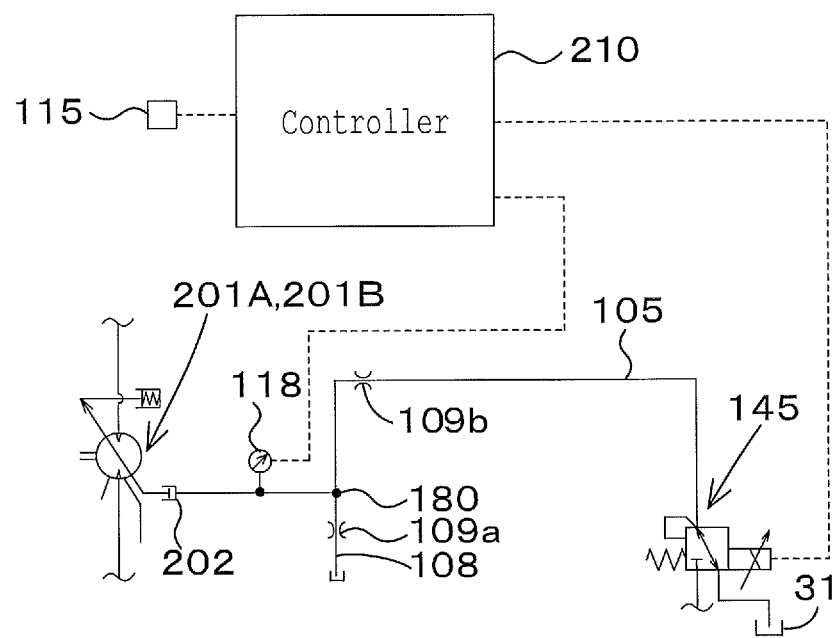
FIG. 27A is a view illustrating a case where an operation valve is connected to a servo cylinder of the travel motor according to the six embodiment.
Figure 27B:
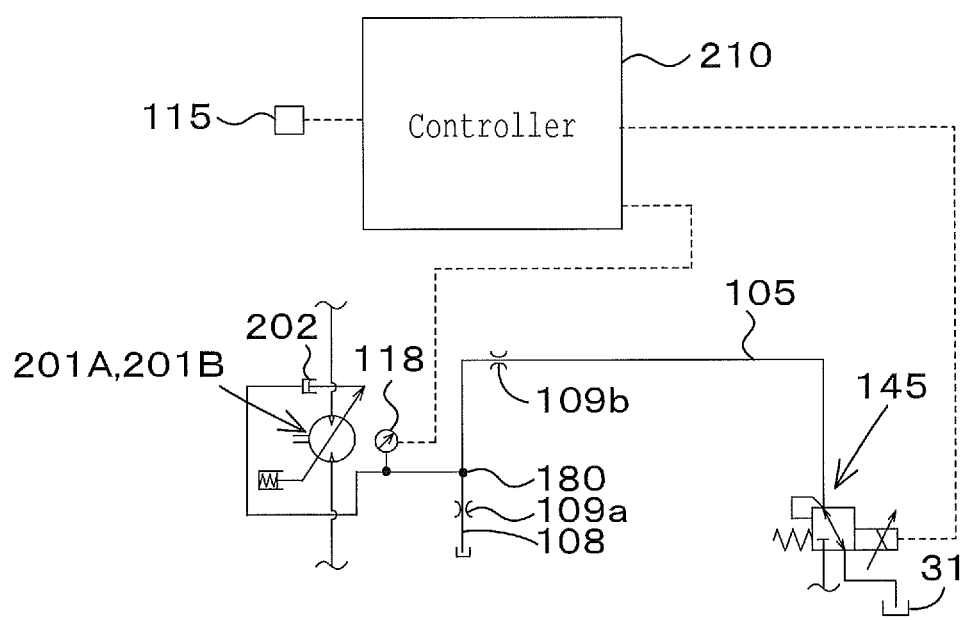
FIG. 27B is a view illustrating another case where an operation valve is connected to a servo cylinder of the travel motor according to the six embodiment.

As shown in FIG. 27A and FIG. 27B, the proportional valve 145 may be connected to the swash plate switch cylinder (the servo cylinder) 202 by the fluid tube 105, and thereby the proportional valve 145 may switch the travel motors (the first travel motor 201A and the second travel motor 201B) to the first speed and to the second speed.

The control device 210 has the configuration different from the configurations described in the above-mentioned embodiments only in that the control target of the control device 210 is the swash plate switch cylinder 202. Other operations are similar to the operations described in the above-mentioned embodiments. That is, the swash plate switch cylinder may be employed as the hydraulic switch valve.

For example, in the case where the first speed is set, the control device 210 sets the pressure applied to the swash plate switch cylinder 202 to be less than the predetermined pressure CP3. In the case where the second speed is set, the control device 210 sets the pressure applied to the swash plate switch cylinder 202 to be the predetermined pressure CP3 or more.

Meanwhile, in the case shown in FIG. 27B, the travel motor is in the second speed under the state where the pressure applied to the swash plate switch cylinder 202 is less than the predetermined pressure CP3, and the travel motor is in the first speed under the state where the pressure applied to the swash plate switch cylinder 202 is equal to or more than the predetermined pressure CP3. The swash plate switch cylinder (the servo cylinder) 202 may be controlled by a control device other than the control device 210.

In the embodiments mentioned above, the pressure of the operation fluid (the detected pressure) detected by the measurement device 218 is fed back to the control device 210 in controlling the proportional valve 145 by the control device 210, and thereby the proportional valve 145 may be controlled in the feedback control. For example, the control device 210 controls the proportional valve 145 in a case where the detected pressure is larger than the applied pressure F1 preliminarily determined, and thereby decreases the pressure of the operation fluid applied to the pressure-receiving portion 91 of the hydraulic switch valve. In this manner, the control device 210 sets the applied pressure to be the detected pressure.

In a case where the detected pressure is smaller than the applied pressure F1 preliminarily determined, the control device 210 controls the proportional valve 145, and thereby increases the pressure of the operation fluid applied to the pressure-receiving portion 91 of the hydraulic switch valve. In this manner, the control device 210 sets the applied pressure to be the detected pressure.

A hydraulic system for a work machine includes a hydraulic pump configured to output an operation fluid, a hydraulic switch valve configured to be switched to a plurality of switching positions on the basis of a pressure of the operation fluid, the proportional valve 145 configured to apply an applied pressure to the hydraulic switch valve, the applied pressure being a predetermined pressure lower than a switching pressure of the operation fluid to switch the switching positions, the travel hydraulic device 44 configured to change a speed in accordance with the switching positions of the hydraulic switch valve, and the measurement device 218 configured to detect a pressure of the operation fluid applied to the hydraulic switch valve. The proportional valve 145 stops applying the preliminary pressure by the proportional valve 145 when the pressure of the operation fluid detected by the measurement device 218 is a predetermined pressure (a threshold value) or more.

A hydraulic system for a work machine includes a hydraulic pump configured to output an operation fluid, a hydraulic switch valve configured to be switched to a plurality of switching positions on the basis of a pressure of the operation fluid, the proportional valve 145 configured to apply an applied pressure to the hydraulic switch valve, the applied pressure being a predetermined pressure lower than a switching pressure of the operation fluid to switch the switching positions, and the travel hydraulic device 44 configured to change a speed in accordance with the switching positions of the hydraulic switch valve. The proportional valve 145 decreases the pressure of the operation fluid to be less than the applied pressure when a speed of the travel hydraulic device 44 is decreased.

The proportional valve 145 maintains the pressure of the operation fluid applied to the hydraulic switch valve to be less than the applied pressure for a certain time.

The proportional valve 145 stops applying the applied pressure after the speed of the travel hydraulic device 44 is changed.

A hydraulic system for a work machine includes a hydraulic pump configured to output an operation fluid, a hydraulic switch valve configured to be switched to a plurality of switching positions on the basis of a pressure of the operation fluid, the proportional valve 145 configured to apply an applied pressure to the hydraulic switch valve, the applied pressure being a predetermined pressure lower than a switching pressure of the operation fluid to switch the switching positions, the travel hydraulic device 44 configured to change a speed in accordance with the switching positions of the hydraulic switch valve, a control device 130 configured to be switched between a braking state to brake the travel hydraulic device 44 in accordance with the pressure of the operation fluid and a releasing state to release the braking state, and to be switched to the braking state in the first mode, and an operation valve 133 configured to be switched between a brake position to set the brake device 130 to be in the braking state and a release position to set the brake device 130 to be in the releasing state. The proportional valve 145 increases the applied pressure to be a predetermined value or more when the operation valve 133 is at the brake position, the applied pressure applying the operation fluid to the hydraulic switch valve.

A hydraulic system for a work machine includes a hydraulic pump configured to output an operation fluid, a travel hydraulic pump configured to change an angle of a swash plate in accordance with a pressure of the operation fluid, the travel hydraulic device 44 having a travel motor configured to change a revolution speed in accordance with the angle of the swash plate of the travel hydraulic pump, the proportional valve 145 configured to apply an applied pressure to the travel hydraulic pump, the applied pressure being a predetermined pressure, the control device 130 configured to be switched between a braking state to brake the travel hydraulic device 44 in accordance with the pressure of the operation fluid and a releasing state to release the braking state, and to be switched to the braking state in the first mode, and the operation valve 133 configured to be switched between a brake position to set the brake device 130 to be in the braking state and a release position to set the brake device 130 to be in the releasing state. The proportional valve 145 increases the applied pressure to be a predetermined value or more when the operation valve 133 is at the brake position, the applied pressure applying the operation fluid to the travel hydraulic pump.

The proportional valve 145 stops applying the operation fluid to the travel hydraulic pump when the operation valve 133 is at the releasing position.

The hydraulic system for the work machine includes the operation member 115. The hydraulic system stops applying the operation fluid to the travel hydraulic pump when the operation valve 133 is at the release position without an operation of the operation member 115.

A hydraulic system for a work machine includes a hydraulic pump configured to output an operation fluid, a hydraulic actuator configured to be operated by the operation fluid, a hydraulic switch valve configured to be switched to a plurality of switching positions on the basis of a pressure of the operation fluid and to change by switching the operation fluid to be outputted to the hydraulic actuator, a shared discharge fluid tube disposed between the hydraulic switch valve and the hydraulic actuator, the proportional valve 145 configured to apply an applied pressure to the hydraulic switch valve, the applied pressure being a predetermined pressure lower than a switching pressure of the operation fluid to switch the switching positions, and a switch valve configured to be switched between an opened state to open the shared discharge fluid tube and a closed state o clos the shared discharge fluid tube. The proportional valve 145 sets the applied pressure to be a predetermined pressure or more when the switch valve is in the closed state.

The hydraulic system for the work machine includes the measurement device 150 configured to detect a temperature of the operation fluid. The proportional valve 145 sets the applied pressure to be a predetermined pressure or more (a threshold value or more) when the temperature of the operation fluid measured by the measurement device 150 is a predetermined value or less (a threshold value or less).

The hydraulic system for the work machine includes the measurement device 151 configured to detect an outdoor temperature. The proportional valve 145 sets the applied pressure to be a predetermined pressure or more (a threshold value or more) when the outdoor temperature measured by the measurement device 151 is a predetermined value or less (a threshold value or less).

A hydraulic system for a work machine includes a hydraulic pump configured to output an operation fluid, a hydraulic switch valve configured to be switched to a plurality of switching positions on the basis of a pressure of the operation fluid, the proportional valve 145 configured to apply an applied pressure to the hydraulic switch valve, the applied pressure being a predetermined pressure lower than a switching pressure of the operation fluid to switch the switching positions, the travel hydraulic device 44 configured to change a speed in accordance with the switching positions of the hydraulic switch valve, the first fluid tube 105 connecting the hydraulic switch valve to the proportional valve 145, the discharge fluid tube 108 connected to a pressure-receiving portion of the hydraulic switch valve or to the first fluid tube 105 and configured to discharge the operation fluid of the first fluid tube 105, the first throttle 109a disposed n the discharge fluid tube 108, and the second throttle 109b disposed on the first fluid tube 105, that is, on a side closer to the proportional valve 145 than a connecting portion connecting the first fluid tube 105 to the discharge fluid tube 108.

The hydraulic system for the work machine includes the measurement device 218 configured to detect a pressure of the operation fluid in the pressure-receiving portion of the hydraulic switch valve or in a the first fluid tube 105 between the second throttle 109b and the pressure-receiving portion, and a control device configured to control the proportional valve 145 in accordance with a pressure of the operation fluid measured by the measurement device 218.

The control device controls the proportional valve 145 to set the pressure of the operation fluid to be identical to the applied pressure, the pressure of the operation fluid being detected by the measurement device 218.

The proportional valve 145 is a valve configured to be operated in accordance with a control signal. The control device includes a storage configured to store a relation between the control signal and the pressure of the operation fluid, the control signal being to be outputted to the proportional valve 145, the pressure of the operation fluid being detected by the measurement device 218.

A hydraulic system for a work machine includes a hydraulic pump configured to output an operation fluid, a hydraulic switch valve configured to be switched to a plurality of switching positions on the basis of a pressure of the operation fluid, the proportional valve 145 configured to apply an applied pressure to the hydraulic switch valve, the applied pressure being a predetermined pressure lower than a switching pressure of the operation fluid to switch the switching positions, the travel hydraulic device 44 configured to change a speed in accordance with the switching positions of the hydraulic switch valve, a measurement device 218 configured to detect the pressure of the operation fluid applied to the hydraulic switch valve, and a control device configured to control the proportional valve 145. The control device controls the proportional valve 145 to set the pressure of the operation fluid to be identical to the applied pressure, the pressure of the operation fluid being detected by the measurement device 218.

The hydraulic system according to the embodiment mentioned above is capable of applying the preliminary pressure (the applied pressure), and is capable of changing the preliminary pressure in accordance with various situations.

Seventh Embodiment

Figure 28:
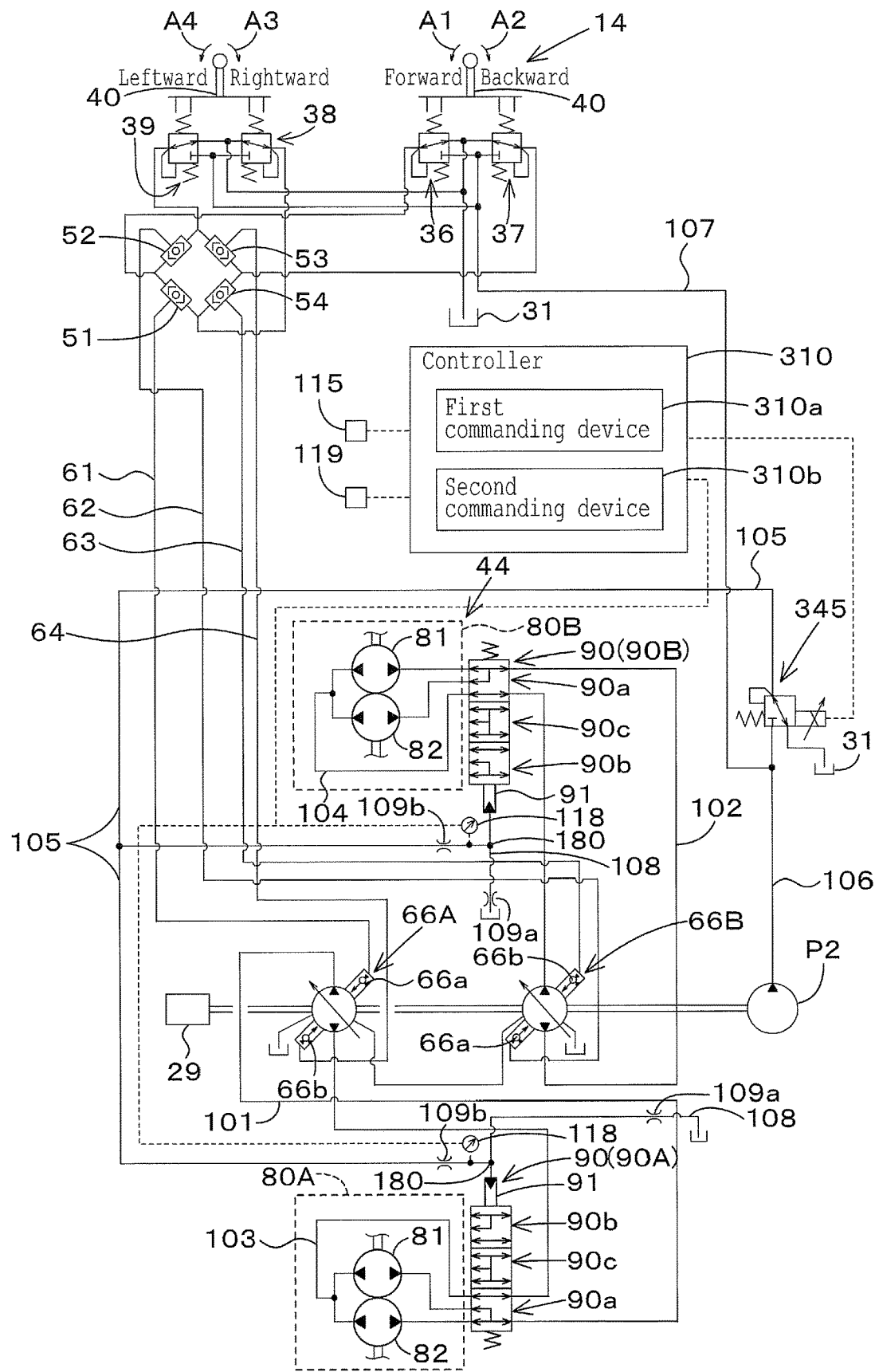
FIG. 28 is a view illustrating a hydraulic system for traveling according to a seventh embodiment of the present invention.

FIG. 28 shows a hydraulic system according to a seventh embodiment of the present invention. The seventh embodiment omits the explanation of the configurations similar to the configurations according to the first embodiment to the sixth embodiment.

As shown in FIG. 28, the first hydraulic switch valve 90A, the second hydraulic switch valve 90B, and the operation valve 345 are connected to each other by the fluid tube (the first fluid tube) 105. The second throttle (for example, an orifice) 109b is disposed on the first fluid tube 105 between the operation valve 345 and the connecting portion 180 connecting the first fluid tube 105 to the discharge fluid tube 108. The fluid tube 106 connects the operation valve 345 to the second hydraulic pump P2.

The operation valve 345 is a valve configured to change the pressure (a flow rate) of the operation fluid applied to the hydraulic switch valves (the first hydraulic switch valve 90A and the second hydraulic switch valve 90B). The operation valve 345 is configured to change the opening aperture in accordance with a control signal outputted from the control device 310 described below.

In the embodiment, the operation valve 345 is an electromagnetic proportional valve (a proportional valve) and changes the opening aperture in accordance with the control signal. The operation valve 345 changes the opening aperture, thereby changing the pressure of the operation fluid applied (supplied) to the hydraulic switch valve.

FIG. 29A is a view showing a relation between the pressure of the operation fluid (the pilot pressure) and the positions of the hydraulic switch valves (the first hydraulic valve and the second hydraulic valve) in a case where the operation valve is operated. The speed-changing pressure (the applied pressure) shown in FIG. 29A is the pilot pressure applied to the pressure-receiving portion of the hydraulic switch valve. For convenience of the explanation, the operation valve 345 will be referred to as the proportional valve 345 below.

As shown in the applied pressure L30 of FIG. 29A, the pilot pressure applied to the pressure-receiving portions 91 of the first hydraulic switch valve 90A and the second hydraulic switch valve 90B are substantially zero under a state where the proportional valve 345 is closes (a state where the proportional valve 345 is fully closed).

As the result, the hydraulic switch valves (the first hydraulic switch valve 90A and the second hydraulic switch valve 90B) are set to the first position 90a. In the case where the hydraulic valve is at the first position 90a, the travel motors (the first travel motor 80A and the second travel motor 80B) are in the first speed.

When the proportional valve 345 is gradually opened from the closed state and thereby increase the opening aperture of the proportional valve 345, the pilot pressures applied to the first hydraulic switch valve 90A and the second hydraulic switch valve 90B increase in accordance with the opening aperture of the operation valve 345.

When the pilot pressure applied to the first hydraulic switch valve 90A and the second hydraulic switch valve 90B exceeds the boundary pressure (the switching pressure) CP1 between the first position 90a and the neutral position 90c, the first hydraulic switch valve 90A and the second hydraulic switch valve 90B are set to the neutral position 90c.

In addition, when the pilot pressure applied to the first hydraulic switch valve 90A and the second hydraulic switch valve 90B exceeds the boundary pressure (the switching pressure) CP2 between the neutral position 90c and the second position 90b, the first hydraulic switch valve 90A and the second hydraulic switch valve 90B are set to the second position 90b.

In the case where the hydraulic switch valves (the first hydraulic switch valve 90A and the second hydraulic switch valve 90B) are at the second position 90b, the travel motors (the first travel motor 80A and the second travel motor 80B) are in the second speed.

That is, the opening aperture of the proportional valve 345 is proportional to the pilot pressure applied to the first hydraulic switch valve 90A and the second hydraulic switch valve 90B, and thus the travel motor can be switched to the first speed and to the second speed in accordance with the opening aperture of the proportional valve 345.

Meanwhile, the first proportional valve 73A and the second proportional valve 73B are operated by the control device 310. The operations of the first proportional valve 73A and the second proportional valve 73B are carried out by the control device 310 in a similar manner carried out by the control device 110 mentioned above.

As shown in FIG. 28, the hydraulic system includes the control device 310 and the measurement device 118. The measurement device 118 is a device configured to detect the pressure of the operation fluid applied to the hydraulic switch valves (the first hydraulic switch valve 90A and the second hydraulic switch valve 90B), and is disposed on the fluid tube 105 or the pressure-receiving portions 91 of the first hydraulic switch valve 90A and the second hydraulic switch valve 90B.

In the embodiment, the measurement device 118 is disposed on the fluid tube 105 between the second throttle 109b and the pressure-receiving portions 91. The pressure of the operation fluid (the pilot pressure) detected by the measurement device 118 is inputted to the control device 310.

The control device 310 is constituted of a CPU and the like. The control device 310 is connected to the proportional valve 345. The control device 310 controls the proportional valve 345 in accordance with the operation member (the setup member) 115 connected to the control device 310.

The control device 310 includes a first command device 310a and a second command device 310b. Each of the first commend device 310a and the second command device 310b is constituted of a computer program and the like stored in the control device 310.

Referring to FIG. 29A, the control by the control device to the proportional valve will be explained. Meanwhile, the control device 310 preliminarily stores the relation between the applied pressure L30 shown in FIG. 29A and the control signal (the electric current) to be outputted to the proportional valve 345. For convenience of the explanation, the pressure of the operation fluid applied to the pressure-receiving portions 91 of the hydraulic switch valve (the travel hydraulic device 44) is referred to as "an applied pressure", and the detected pressure of the operation fluid detected by the measurement device 118 is referred to as "a detected pressure".

In the case where the setup member 115 sets the first speed, the second command device 310b demagnetizes a solenoid of the proportional valve 345. And, as shown in an applied pressure L30a of FIG. 29A, the second command device 310b sets the pressure of the operation fluid (the applied pressure) to be less than the switching pressure CP1, the pressure of the operation fluid being applied to the pressure-receiving portions 91 of the hydraulic switch valve (the travel hydraulic device 44), and thereby setting the hydraulic switch valve to the first position 90a (setting the travel motor to the first speed).

In the case where the setup member 115 sets the second speed, the second command device 310b magnetizes the solenoid of the proportional valve 345. And, as shown in an applied pressure L30b of FIG. 29A, the second command device 310b sets the pressure of the operation fluid (the applied pressure) to be larger than the switching pressure CP2, the pressure of the operation fluid being applied to the pressure-receiving portions 91 of the hydraulic switch valve (the travel hydraulic device 44), and thereby setting the hydraulic switch valve to the second position 90b (setting the travel motor to the second speed). The second command device 310b maintains the applied pressure to the setup pressure Q3 corresponding to the second speed under the state where the travel motor is in the second speed.

In particular, the control device 310 stores at least the setup pressure Q3 that is a pressure corresponding to the second speed. When the setup member 115 sets the second speed, the second command device 310b controls the opening aperture of the proportional valve 345 such that the detected pressure is to be equal to the setup pressure Q3 as shown in an applied pressure L30c of FIG. 29A.

In addition, when the setup member 115 sets the first speed under the state where the travel motor is set to the second speed (under the state where the speed-decreasing is set from the second speed to the first speed), the second command device 310b orders a second operation to the proportional valve 345 as shown in an applied pressure L30d of FIG. 29A, the second operation being provided for decreasing the applied pressure.

In particular, in the case where the setup member 115 sets the first speed changing from the second speed, the second command device 310b demagnetizes the solenoid of the proportional valve 345. When the solenoid of the proportional valve 345 is demagnetized, the operation fluid in the fluid tube 105 is discharged to the operation fluid tank 31 and the like, and thus the applied pressure is decreased. When the applied pressure is decreased to be less the switching pressure CP1, the hydraulic switch valve is set to the first position 90a (sets the travel motor to the first speed).

In this manner, the second command device 310b controls the opening aperture of the proportional valve 345 in accordance with the setting by the setup member 115, and thereby switches the travel motor (the travel hydraulic device 44) to the first speed and to the second speed.

As shown in an applied pressure L30f of FIG. 29A, the first command device 310a orders a first operation in a case where the detected pressure is gradually decreased under the state where the travel motor is set to the second speed and the detected pressure is decreased from the setup pressure Q3 corresponding to the second speed to the predetermined pressure F1 or less.

The first operation is an operation to decrease the pressure of the operation fluid applied to the pressure-receiving portions 91 of the hydraulic switch valve (the travel hydraulic device 44) and thereby to decrease the speed of the hydraulic switch valve (the travel hydraulic device 44) from the second speed to the first speed.

In particular, the control device 310 stores a judgement value (the predetermined pressure) F1. The predetermined pressure F1 is set to be larger than the switching pressure CP2 and less than the setup pressure Q3 (CP2<F1<Q3).

In the case where the setup member 115 sets the second speed, the first command device 310a monitors the applied pressure on the basis of the detected pressure. And, when the detected pressure is decreased to be the predetermined pressure F1 or less, the first command device 310a demagnetizes the solenoid of the proportional valve 345.

When the solenoid of the proportional valve 345 is demagnetized, the applied pressure of the hydraulic switch valve is decreased rapidly as shown in an applied pressure L30e of FIG. 29A. And, when the applied pressure is decreased to the switching pressure CP1 or less, the hydraulic switch valve is set to the first position 90a (set the travel motor to the first speed).

That is, when the detected pressure is decreased to the predetermined pressure F1 or less under the state where the second speed is set, the first command device 310a orders the first operation to the proportional valve 345, the first operation decreasing the speed of the travel motor to the first speed.

As described above, when the detected pressure is decreased to the predetermined pressure F1 or less under state where the second speed is set, the travel motor decreases the speed to the first speed. In this manner, in a case where the revolution speed of engine is decreased to be less than a revolution speed of a normal operation condition (a normal use condition) under the state where the work machine is operated in the second speed, the speed is decreased automatically from the second speed to the first speed, and thus an operation efficiency is improved totally as the operation of the work machine.

For example, when an excessive load is applied to the work machine in an operation, the revolution speed of engine is significantly decreased different from the normal operation condition, and thus an output of the second hydraulic pump P2 sometimes decreases. As the result, there is a possibility that the pressure of the operation fluid applied to the hydraulic switch valve is gradually decreased and thus the speed is unwillingly switched from the second speed state slowly through the neutral state (the neutral position) to the first speed state. The neutral state continuing for a long time during the operation of the work machine will trouble the operation.

In the embodiment, when the detected pressure is decreased to the predetermined pressure F1 or less under state where the second speed is set, the travel motor automatically decreases the speed to the first speed. In this manner, the behavior of the work machine v can be stabilized even when the output of the second hydraulic pump P2 is decreased. That is, the travel hydraulic device 44 is controlled adequately even when the pressure of the operation fluid is decreased under the state where the travel hydraulic device 44 is in the second speed, and thus the operability of the work machine is improved.

Meanwhile, in a case where there is a possibility that the work machine causes the engine stall, the travel motor can automatically decrease the speed from the second speed to the first speed adequately with used of the pressure of the operation fluid applied to the hydraulic switch valve before the engine stall is caused.

For example, In a case where the engine stall is determined on the basis of the actual revolution speed of engine, the pressure of the operation applied to the hydraulic switch valve may be decreased already at the time when the engine stall has been determined.

Meanwhile, the engine stall in the travel hydraulic device 44 can be determined using the pressure of the operation fluid (the predetermined pressure F1) applied to the hydraulic switch valve instead of determining a presage of the engine stall on the basis of the actual revolution speed of engine, and thus the speed-decreasing can be controlled adequately in the engine stall.

In the embodiment described above, the speed is automatically decreased from the second speed to the first speed in the case where the revolution speed of engine is decreased to a predetermined value or less (a threshold value or less). However, the speed of the speed-decreasing from the second speed to the first speed is faster than the normal speed of the speed-decreasing from the second speed to the first speed.

In particular, the control device (the first command device 310a) 310 demagnetizes the solenoid of the proportional valve 345 to rapidly decrease the applied pressure of the hydraulic switch valve in a case where the revolution speed of engine (the actual revolution speed) detected by the measurement device is decreased to a predetermined threshold value or less under a state where the setup member 115 sets the second speed.

The first command device 310a speeds up a decreasing speed of the applied pressure L30e in comparison with a decreasing speed of the applied pressure L30d as shown in FIG. 29A in the case where the first command device 310a orders the first operation to the proportional valve 345 and thus the travel motor decreases the speed from the second speed to the first speed In other words, the angle (the slope) of the applied pressure L30e is increased to be larger than the angle (the slope) of the applied pressure L30d during the operation of the proportional valve 345. In this manner, the travel motor is capable of rapidly decreasing the speed from the second speed to the first speed automatically under a large load, for example.

In addition, the first command device 310a orders the first operation to the proportional valve 345 at a time when the detected pressure is decreased to the predetermined pressure F1. However, instead of that, the first command device 310a may order the first operation to the proportional valve 345 in a case where a time when the detected pressure is decreased to the predetermined pressure F1 or less continues for a predetermined time (T1) or more.

In this manner, the travel motor can be controlled to decrease the speed from the second speed to the first speed stably as needed.

In addition, a measurement device 119 may be connected to the control device 310. The measurement device 119 is configured to detect a temperature of the operation fluid. The predetermined pressure (the threshold pressure) F1 may be changed in accordance with the temperature of the operation fluid measured by the measurement device 119. For example, there is a case where the temperature of the operation fluid detected by the measurement device 119 is low and the operation fluid has a high viscosity or a case where the temperature of the operation fluid is high due to a heavy operation with a high load. In that case, the predetermined pressure F1 is set to be larger than the pressure in a normal temperature.

In this manner, the travel motor can be controlled to decrease the speed from the second speed to the first speed stably as needed in accordance with the temperature of the operation fluid.

The first command device 310a of the control device 310 may change the predetermined time T1 on the basis of the temperature of the operation fluid detected by the measurement device 119. For example, there is a case where the temperature of the operation fluid detected by the measurement device 119 is low and the operation fluid has a high viscosity or a case where the temperature of the operation fluid is high due to a heavy operation with a high load. In that case, the predetermined time T1 is set to be shorter than the time in a normal temperature.

In this manner, the travel motor can be controlled to decrease the speed from the second speed to the first speed stably as needed in accordance with the temperature of the operation fluid.

Figure 29B:
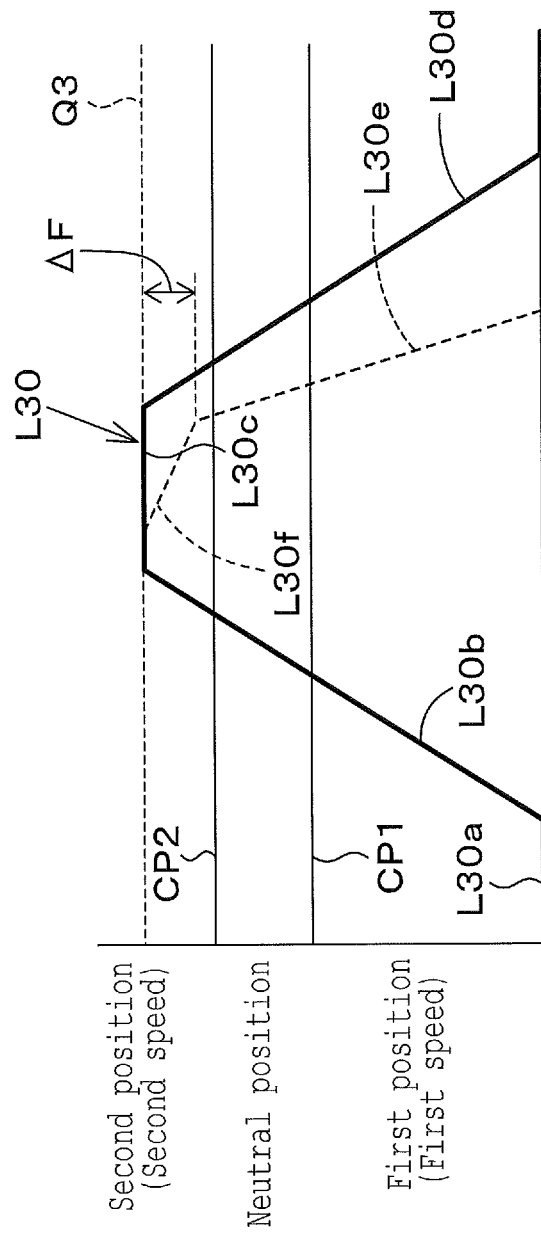
FIG. 29B is a view illustrating a relation between the pilot pressure and the position of the hydraulic switch valve according to the seventh embodiment, the relation being obtained in a case where a differentiation between the set pressure and the detection pressure is equal to or more than a predetermined pressure.
Figure 30:
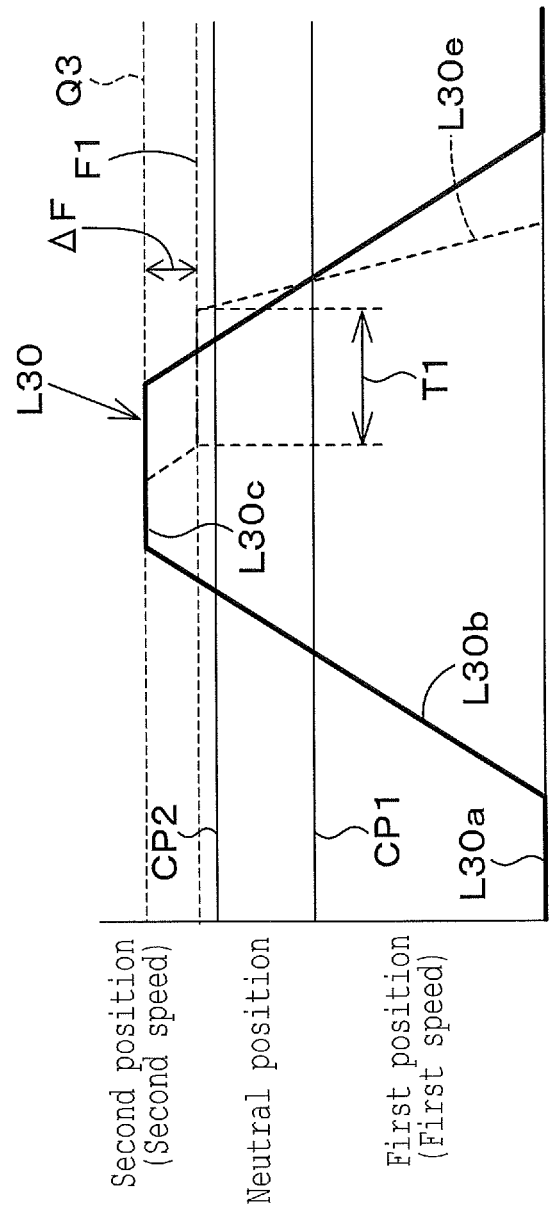
FIG. 30 is a view illustrating the relation between the pilot pressure and the position of the hydraulic switch valve according to the seventh embodiment, the relation being obtained in a case where an applied pressure applied to the hydraulic switch valve is dropped for a predetermined time.

In the embodiment mentioned above, when the detected pressure is decreased from the setup pressure Q3 to the predetermined pressure F1, the pressure of the operation fluid applied to the hydraulic switch valve (the travel hydraulic device 44) is decreased, and the travel hydraulic device 44 decreases the speed to the first speed. However, as shown in FIG. 29B, when a decreased pressure (a decreased differential pressure) is equal to or more than a predetermined pressure ΔF or more, the decreased pressure being a difference between the detected pressure and the setup pressure Q3, the travel hydraulic device 44 may decrease the speed to the first speed.

In particular, the control device 310 stores the judgement value (the predetermined pressure) ΔF. The predetermined pressure ΔF is a value smaller than a difference between the setup pressure Q3 and the switching pressure CP2 (Q3−CP2). When the decreased differential pressure is equal to or more than the predetermined pressure ΔF (the decreased amount of the detected pressure from the setup pressure Q3 is equal to or more than the predetermined pressure ΔF) under the state where the travel motor is set to the second speed, the first command device 310a orders the first operation to the proportional valve 345 (the travel motor decreases the speed from the second speed to the first speed).

In addition, in a case where a time when the decreased differential pressure is equal to or more than the predetermined pressure ΔF is continues for the predetermined time T1 or more, the first command device 310a may order the first operation to the proportional valve 345. The predetermined time T1 may be changed on the basis of the temperature of the operation fluid detected by the measurement device 119 in the similar manner to the embodiments mentioned above.

In addition, the predetermined pressure ΔF may be changed on the basis of the temperature of the operation fluid measured by the measurement device 119 in the similar manner to the embodiments mentioned above. For example, there is a case where the temperature of the operation fluid detected by the measurement device 119 is low and the operation fluid has a high viscosity or a case where the temperature of the operation fluid is high due to a heavy operation with a high load. In that case, the predetermined pressure ΔF is set to be smaller than the pressure in a normal temperature.

Figure 31:
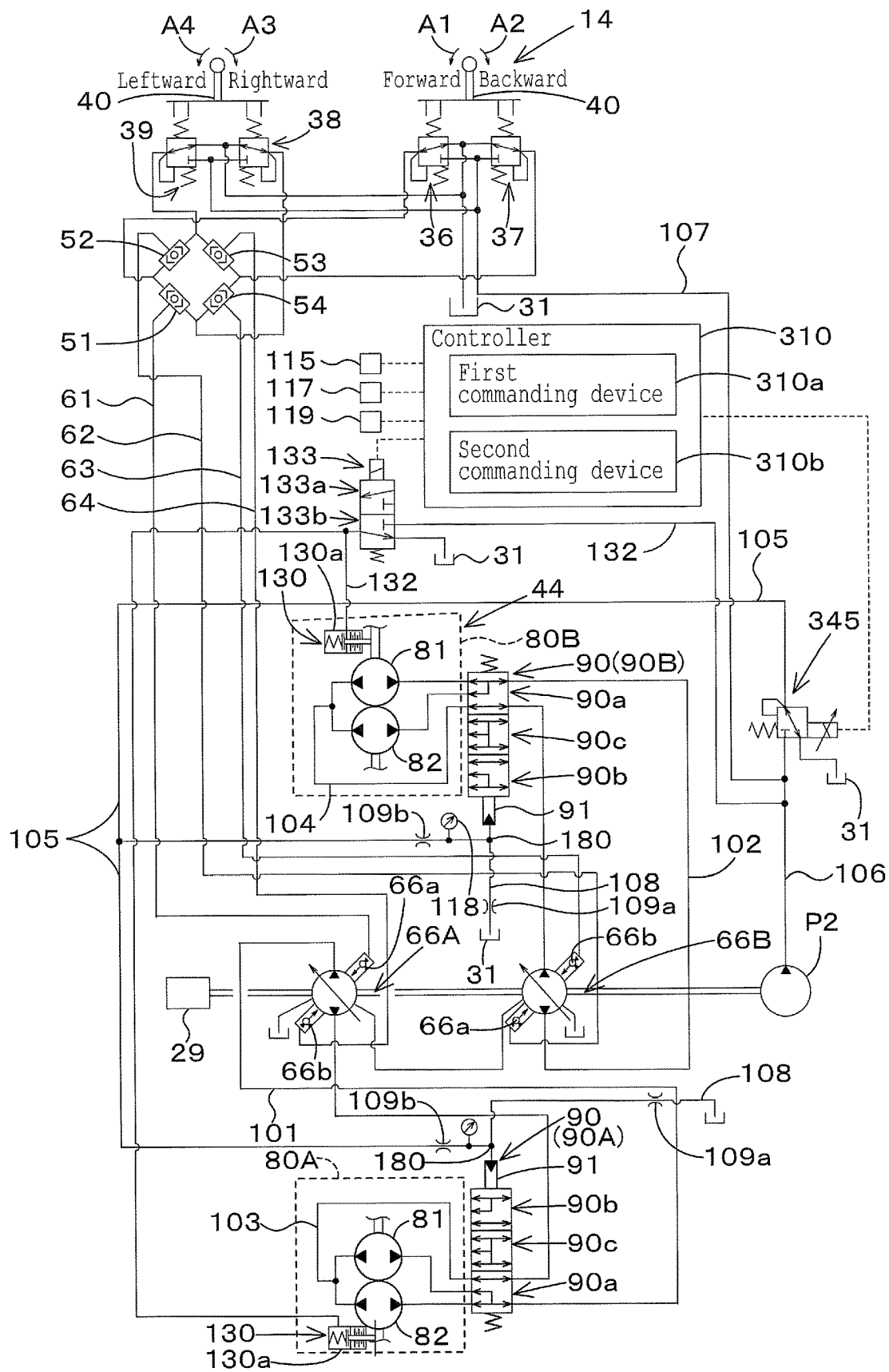
FIG. 31 is a view illustrating a hydraulic system that includes a brake device according to the seventh embodiment.

As shown in FIG. 31, the hydraulic system may include the brake device 130. The control device 310 is capable of switching the operation valve 133. The brake device 130 is switched from the releasing state to the braking state in the engine stall. In particular, the control device 310 judges whether the engine stall is caused on the basis of the revolution speed (the actual revolution speed) of engine, the revolution speed being detected by the measurement device 117.

For example, in a case where an elapsed time (a continuous time) when the actual revolution speed of engine is 400 rpm or less is 0.5 seconds or more, the actual revolution speed being detected by the measurement device 117, the control device 310 determines that the engine stall has been caused. When determining that the engine stall has been caused, the control device 310 demagnetizes the solenoid of the operation valve 133, and thereby switches the operation valve 133 to the second position 133b. On the other hand, when not determining that the engine stall has been caused, the control device 310 maintains the magnetization to the solenoid of the operation valve 133.

In this manner, the automatic speed-decreasing by the travel hydraulic device 44 and the braking by the control device 130 are both carried out under the state where the engine stall has been caused. Thus, the movement of the work machine can be stabilized in the engine stall.

The hydraulic system according to the embodiment mentioned above controls the travel hydraulic device adequately even when the pressure of the operation fluid is decreased under the state where the travel hydraulic device is in the second speed.

In the embodiment mentioned above, the speed is decreased from the second speed to the first speed at a higher speed earlier than a normal timing when the revolution speed of engine is decreased to be lower than the threshold value. However, it is preferable for the threshold value for the revolution speed of engine to be higher than the threshold value for activating the brake device 130.

In addition, the work machine may be provided with a parking switch configured to order the parking to the work machine (the control device 310), and may be provided with a hydraulic lock device configured to be switched between a state to supply the operation fluid to the hydraulic device and a state not to supply the operation fluid to the hydraulic device, the operation fluid being outputted from the hydraulic pump.

In a case where the parking switch is activated to maintain the work machine in a parking state or in a case where the hydraulic lock device is activated not to supply the operation fluid to the hydraulic device, it is preferable that the speed is decreased from the second speed to the first speed at a higher speed earlier than a normal timing.

Eighth Embodiment

Figure 32:
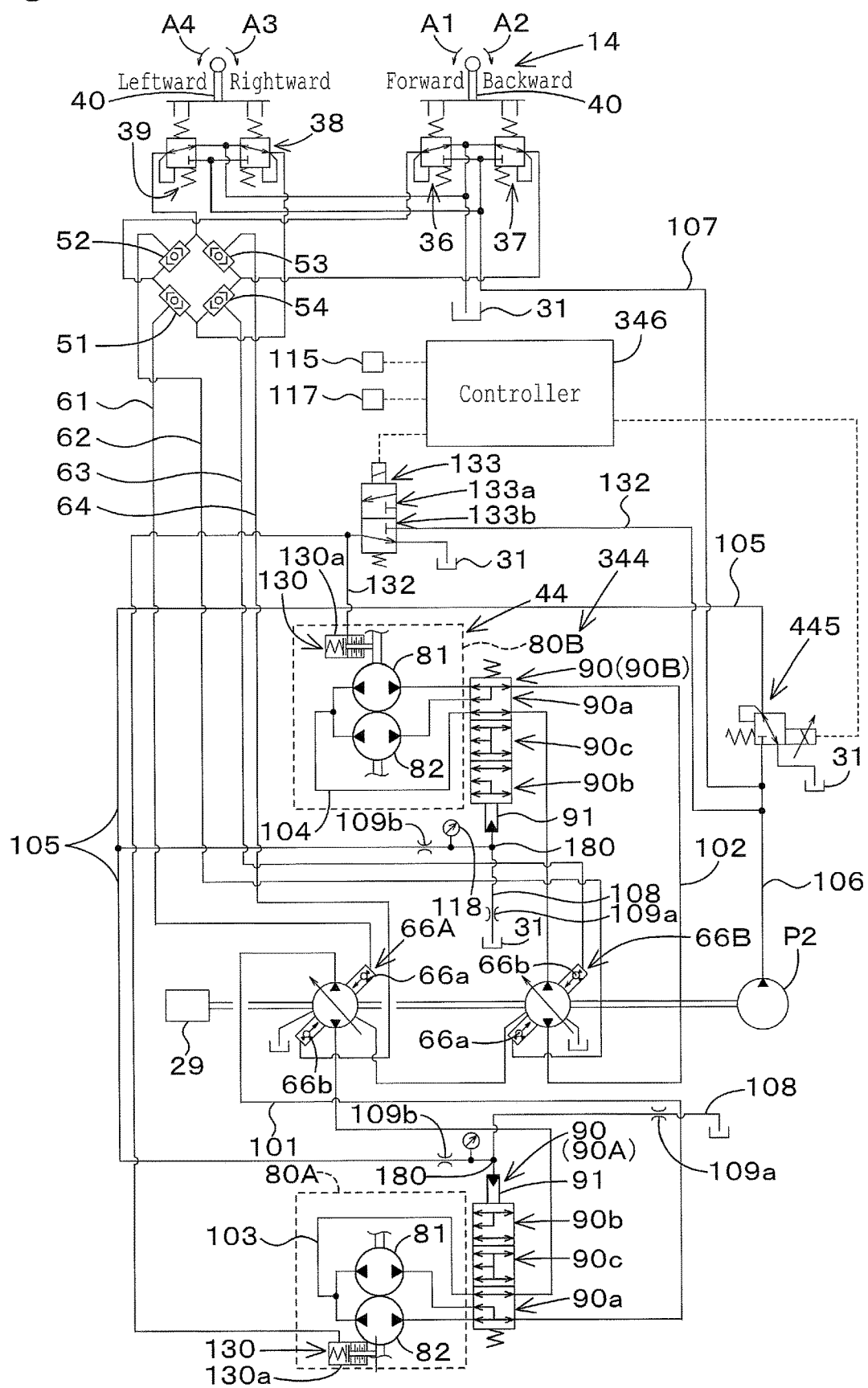
FIG. 32 is a view illustrating a hydraulic system for traveling according to an eighth embodiment of the present invention.

FIG. 32 shows a hydraulic system according to an eighth embodiment of the present invention. The hydraulic system for traveling according to the eighth embodiment can be applied to the hydraulic systems according to the above-mentioned seventh embodiment. The eighth embodiment omits the explanation of the configurations similar to the configurations according to the seventh embodiment.

As shown in FIG. 32, the hydraulic system includes the brake device 130, an operation valve (a first operation valve) 344, the operation valve (a second operation valve) 133, and a control device 346. The brake device 130 and the operation valve 133 have the configurations similar to the configurations described in the seventh embodiment.

The operation valve (the first operation valve) 344 includes an electromagnetic proportional valve (the proportional valve) 445 and the hydraulic switch valve 90. The proportional valve 445 operates in accordance with the setting by the setup member 115, and thereby switches the hydraulic switch valve to the first position (the first speed) and to the second position (the second speed).

The setup member 346 controls a proportional valve 445. When the setup member 115 sets the first speed, the control device 346 demagnetizes the solenoid of the proportional valve 445, and thereby sets the travel motor to the first speed as shown in the applied pressure L30a of FIG. 29A.

In addition, when the setup member 115 sets the second speed, the control device 346 magnetizes the solenoid of the proportional valve 445, and thereby sets the travel motor to the second speed as shown in the applied pressure L30b of FIG. 29A.

When the setup member 115 sets the first speed under a state where the travel motor is in the second speed, the control device 346 demagnetizes the solenoid of the proportional valve 445, and thereby sets the travel motor to the second speed as shown in the applied pressure L30d of FIG. 29A.

In addition, when the engine stall has been caused, the operation valve 133 is switched from the releasing position to the braking position. In a case where an elapsed time (a continuous time) when the actual revolution speed of engine is 400 rpm or less is 0.5 seconds or more, the actual revolution speed being detected by the measurement device 117, the control device 310 determines that the engine stall has been caused.

When determining that the engine stall has been caused, the control device 310 demagnetizes the solenoid of the operation valve 133 in advance to the proportional valve 445, and thereby switches the operation valve 133 to the second position 133b. After that, the control device 310 demagnetizes the solenoid of the proportional valve 445. The hydraulic switch valve is switched from a high position that is the second position 90b to a low position that is the first position 90a due to the demagnetization of the solenoid of the proportional valve 445.

In this manner, the hydraulic switch valve is switched from the high position to the low position under the state where the operation valve 133 is at the braking position, and thereby the travel motor decreases the speed from the second speed to the first speed. Accordingly, the brake device 130 provides the braking quickly when the engine stall is caused. In addition, the travel motor decreases the speed from the second speed to the first speed after the braking by the brake device 130, and thus the movement (the behavior) of the work machine can be stabilized in the engine stall.

Figure 33:
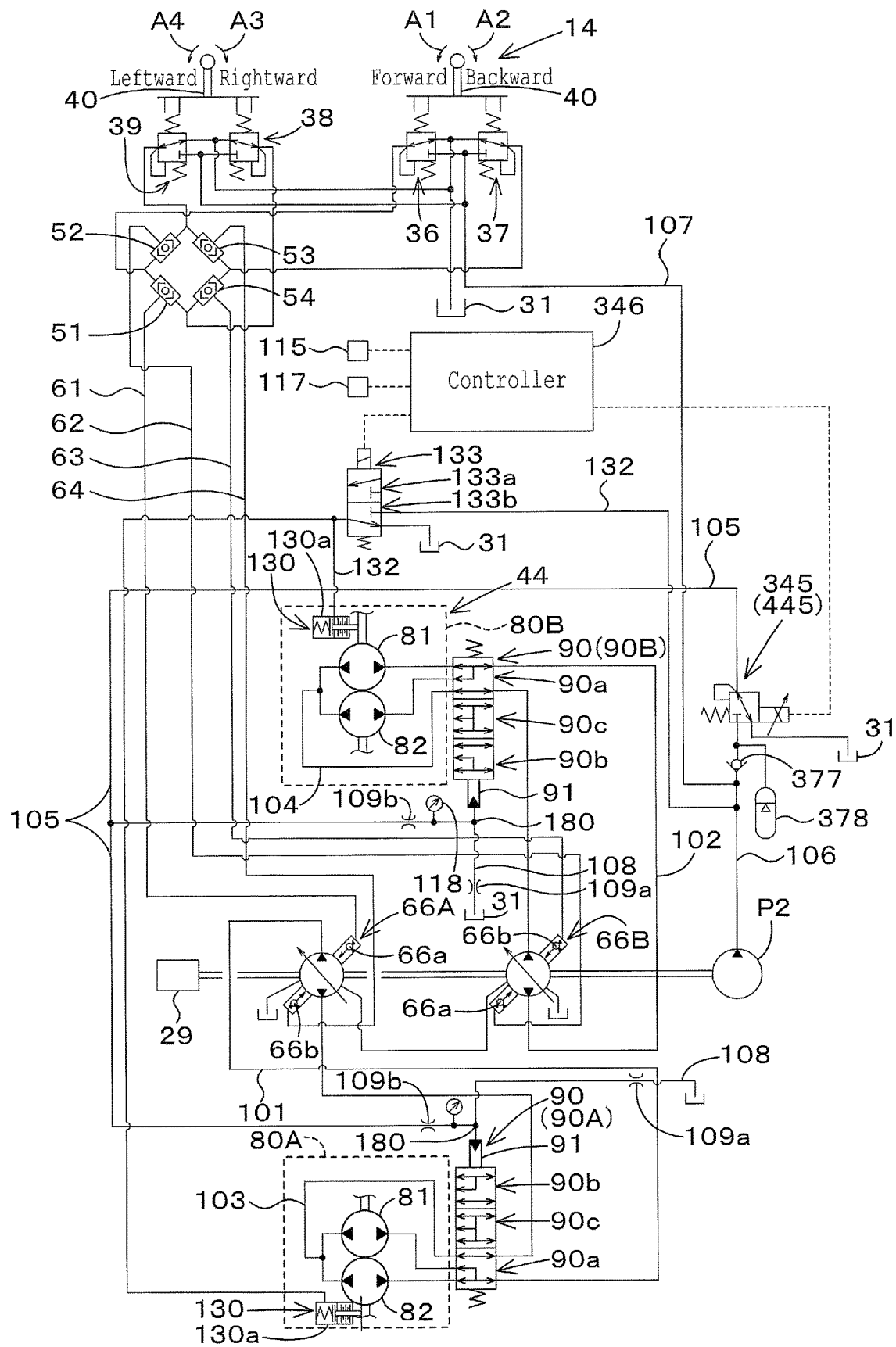
FIG. 33 is a view illustrating a hydraulic system that includes an accumulator according to the eighth embodiment.

As shown in FIG. 33, the fluid tube 106 is provided with a check valve 377. The check valve 377 is configured to allow the operation fluid to flow from the second hydraulic pump P1 toward the proportional valve 345 (the proportional valve 445) and to prevent the operation fluid to flow from the proportional valve 345 (the proportional valve 445) toward the second hydraulic pump P1. An accumulator 378 is disposed between the check valve 377 and the proportional valve 345 (the proportional valve 445).

In this manner, the accumulator 378 suppresses decreasing the pressure of the operation fluid in the fluid tube 105 when the engine stall has been caused under the state where the travel motor is in the second speed. Thus, the hydraulic switch valve can be maintained to the first position 90a (the low position, a low-order position) and to the second position 90b (the high position, a high-order position) for a predetermined time.

Thus, when the presage of causing the engine stall is present or when the engine stall has been caused, the accumulator 378 softly decreases the operation pressure. In this manner, the travel hydraulic device 44 is capable of decreasing the speed from the second speed to the first speed after the brake device 130 provides the braking.

Figure 34:
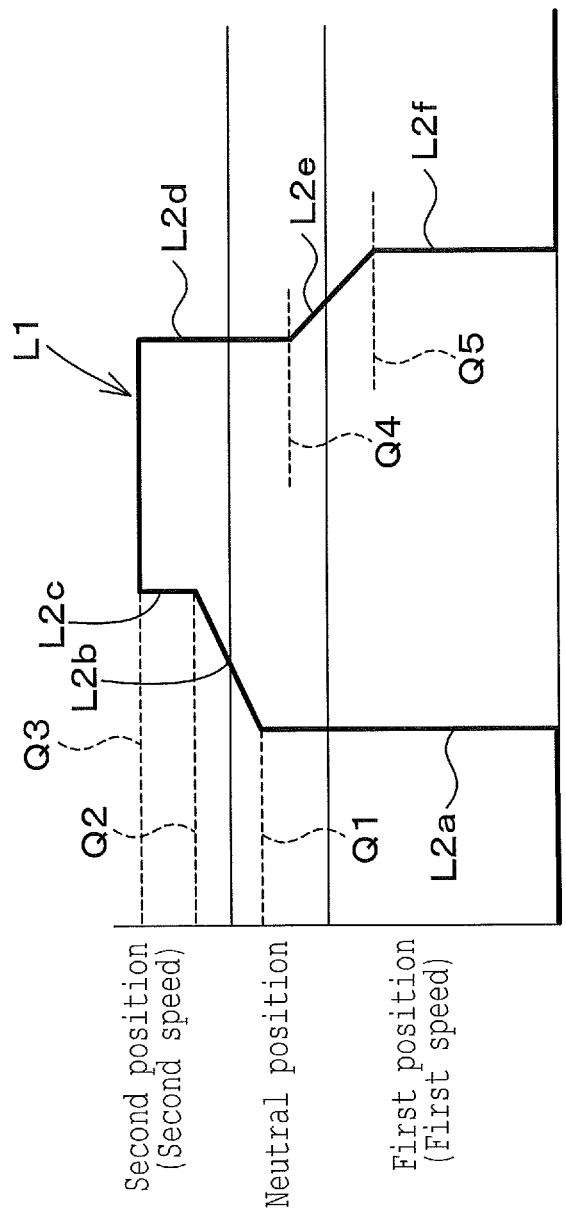
FIG. 34 is a view illustrating a modified example that shows a relation between a pilot pressure and a position of a hydraulic switch valve according to the eighth embodiment.

In addition, in the case where the proportional valve 345 changes the speed, the applied pressure may be changed in a stepwise manner as shown in FIG. 34. In the case where the proportional valve 345 changes the speed from the first speed to the second speed, the proportional valve 345 is opened from the fully-closed state and thereby increases the operation pressure once to the first setup pressure Q1 determined corresponding to the neutral position as shown in the applied pressure L2a of FIG. 34.

When the pressure applied to the pressure-receiving portions 91 of the hydraulic switch valve reaches the first setup pressure Q1, the applied pressure is gradually increased to the second setup pressure Q2 upon reaching to the first setup pressure Q1 as shown in the applied pressure L2b, the second setup pressure Q2 being determined corresponding to the second position. Then, when the pressure applied to the pressure-receiving portions 91 of the hydraulic switch valve reaches the second setup pressure Q2, the applied pressure is increased once to the third setup pressure Q3 as shown in the applied pressure L2c, the third setup pressure Q3 being determined corresponding to the second position.

That is, the applied pressure is increased in the three steps as shown in FIG. 34 in the case where the speed is changed from the first speed to the second speed.

On the other hand, the proportional valve 345 (the proportional valve 445) is closed from a state where the proportional valve 45 is maintained at a predetermined position and thereby decreases the speed-changing pressure at once to the fourth setup pressure Q4 as shown in the speed-changing pressure L2d of FIG. 34 in the case where the speed is changed from the second speed to the first speed, the fourth setup pressure Q4 being determined corresponding to the neutral position.

Then, when the pressure applied to the pressure-receiving portion 91 of the hydraulic switch valve reaches the fourth setup pressure Q4, the applied pressure is gradually decreased to a fifth setup pressure Q5 upon reaching the fourth setup pressure Q4. The fifth setup pressure Q5 is determined corresponding to the first position. That is, when the pressure applied to the pressure-receiving portions 91 of the hydraulic switch valve reaches the fifth setup pressure Q5, the applied pressure is decreased at once as shown in an applied pressure L2f of FIG. 5.

That is, the applied pressure is increased in the three steps as shown in FIG. 34 in the case where the speed is changed from the second speed to the first speed.

Meanwhile, as shown in FIG. 34, the control device 310 preliminarily stores the relation between the control signal (for example, the electric current) outputted to the proportional valve 345 and the first setup pressure Q1, the second setup pressure Q2, the third setup pressure Q3, the fourth setup pressure Q4, and the fifth setup pressure Q5. The control device 310 may output a predetermined electric current to the proportional valve 345 in the speed-changing in the procedure mentioned above, thereby control the speed-changing pressure L2.

In the case where the control device 310 controls the proportional valve 345 (the proportional valve 445), the detected pressure detected by the measurement device 118 is fed back to the control device 310, and then the control device 310 may control the proportional valve 345 (the proportional valve 445) such that a value fed back can be identical to the applied pressure.

Figure 35:
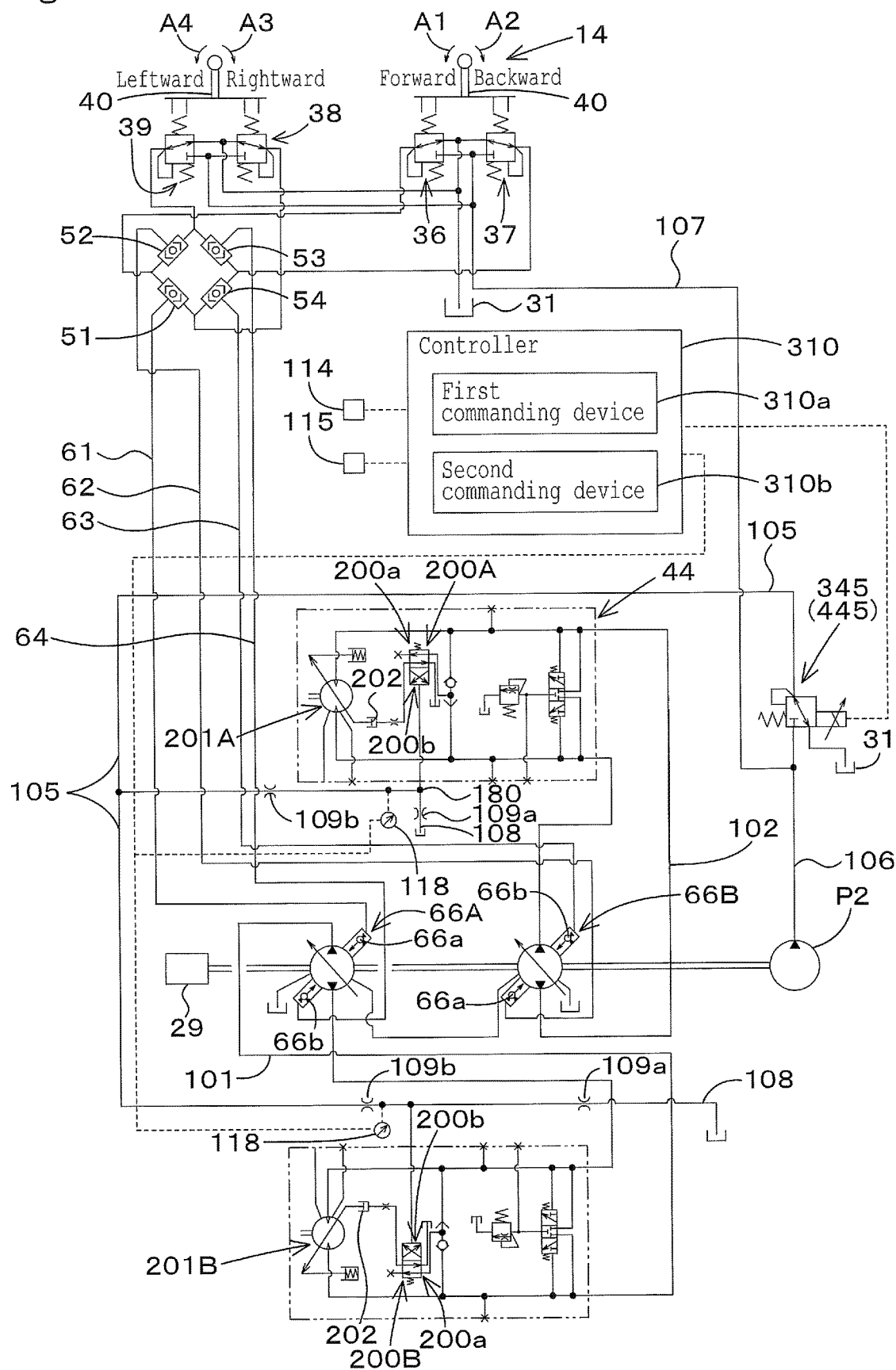
FIG. 35 is a view illustrating modified examples of a travel hydraulic device and a hydraulic switch valve according to the eighth embodiment.

As shown in FIG. 35, the hydraulic valve and the travel motor may be modified. That is, the hydraulic switch valve may be replaced by a valve having the first hydraulic switch valve 200A and the second hydraulic switch valve 200B. In addition, the travel motor may be replaced by a motor having the first travel motor 201A and the second travel motor 201B.

Figure 37A:
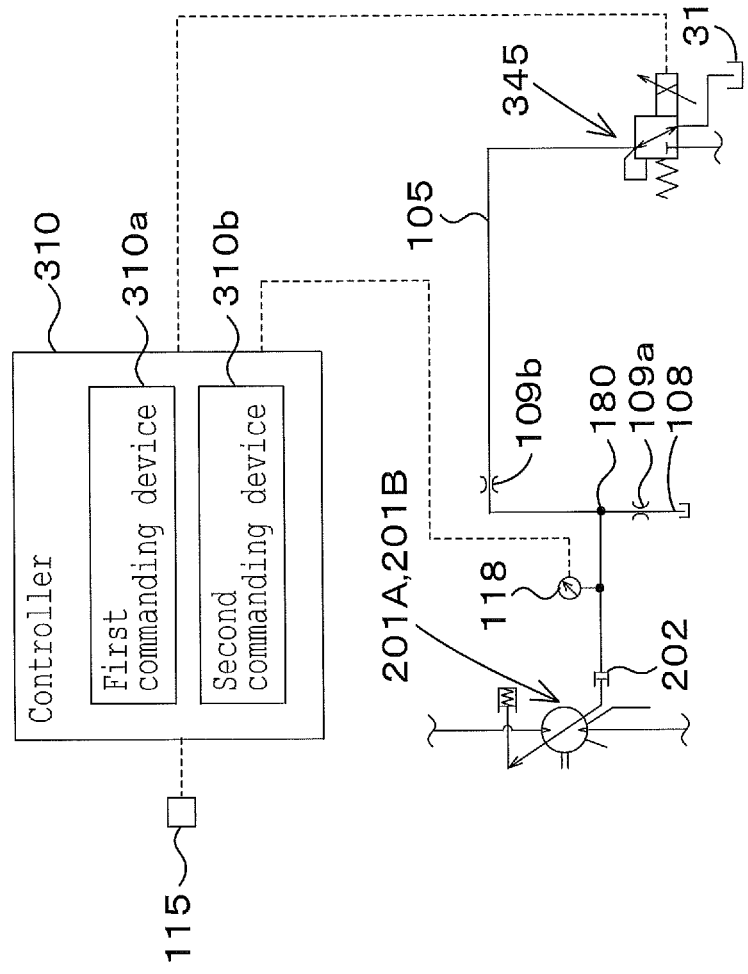
FIG. 37A is a view illustrating a case where an operation valve is connected to a servo cylinder of the travel motor according to the eighth embodiment.
Figure 37B:
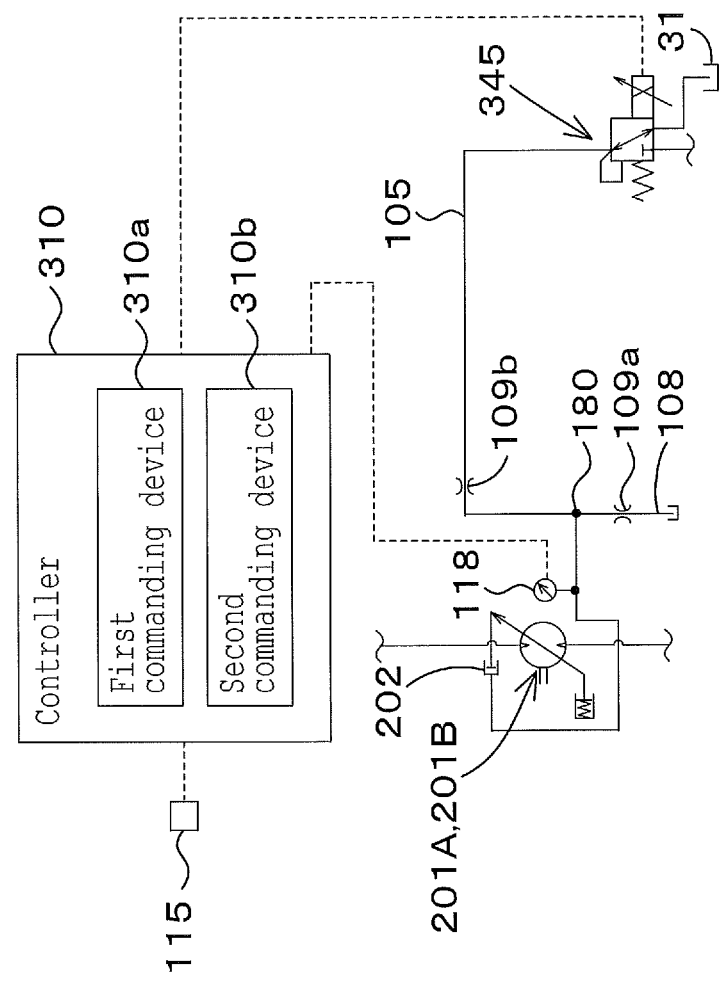
FIG. 37B is a view illustrating another case where an operation valve is connected to a servo cylinder of the travel motor according to the eight embodiment.

In addition, as shown in FIG. 37A and FIG. 37B, the proportional valve 345 may be connected to the swash plate switch cylinder (the servo cylinder) 202 by the fluid tube 105. In this manner, the proportional valve 345 may switch the travel motors (the first travel motor 201A and the second travel motor 201B) to the first speed and to the second speed.

The first commend device 310a and the second command device 310b are different from the embodiments mentioned above only in that the control target is the swash plate switch cylinder 202, and thus the other operations are similar to the operations described in the embodiments mentioned above. That is, replacing the hydraulic switch valve by the swash plate switch cylinder, the operations of the first command device 310a and the second command device 310b shown in FIG. 37A and FIG. 37B are obtained.

Figure 36:
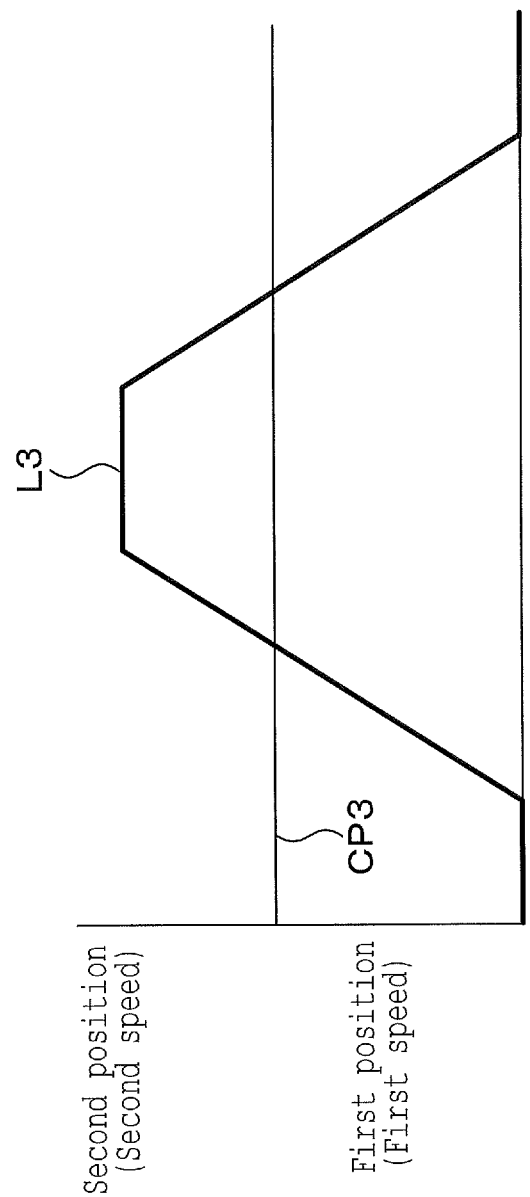
FIG. 36 is a view illustrating a relation between the pilot pressure and the position of the hydraulic switch valve according to the modified example of the eighth embodiment.

In the case shown in FIG. 37, when the pressure applied to the swash plate switch cylinder 202 is less than the predetermined pressure CP3, the travel motor in the first speed as in FIG. 36. When the pressure applied to the swash plate switch cylinder 202 is equal to or more than the predetermined pressure CP3, the travel motor in the second speed as in FIG. 36. For example, in the case where the setup member 115 sets the first speed, the second command device 310b sets the pressure applied to the swash plate switch cylinder 202 to be less than the predetermined pressure CP3.

In the case where the setup member 115 sets the second speed, the second command device 310b sets the pressure applied to the swash plate switch cylinder 202 to be equal to or more than the predetermined pressure CP3. The first command device 310a orders the first operation to the proportional valve 345 when the detected pressure is gradually decreased under the state where the travel motor is in the second speed and is decreased by a predetermined pressure (F1) or more from the setup pressure Q3 corresponding to the second speed. In this manner, the proportional valve 345 decreases the pressure applied to the swash plate switch cylinder 202, thereby decreasing the speed from the second speed to the first speed.

In addition, in the case shown in FIG. 37B, the travel motor is in the second speed in the case where the pressure applied to the swash plate switch cylinder 202 is less than the predetermined pressure CP3, and the travel motor is in the first speed in the case where the pressure applied to the swash plate switch cylinder 202 is equal to or more than the predetermined pressure CP3.

In the embodiment mentioned above, each of the first hydraulic switch valve 90A and the second hydraulic switch valve 90B includes the discharge fluid tube 108, the first throttle 109a, the second throttle 109b, and the measurement device 118. However, the discharge fluid tube 108, the first throttle 109a, the second throttle 109b, and the measurement device 118 may be shared with the first hydraulic switch valve 90A and the second hydraulic switch valve 90B as in FIG. 26.

A hydraulic system for a work machine includes the motor 29 including an engine, a hydraulic pump configured to be driven by a motive power and to output an operation fluid, the travel hydraulic device 44 configured to change a speed to a first speed and to a second speed higher than the first speed in accordance with a pressure of the operation fluid, an operation valve 344 configured to change a pressure of the operation fluid applied to the travel hydraulic device 44, and the measurement device 118 configured to detect the pressure of the operation fluid. The operation valve 344 decreases the pressure of the operation fluid applied to the travel hydraulic device 44 and sets the speed of the travel device 44 to the first speed in the case where the detected pressure is decreased to a predetermined pressure or less from a setup pressure corresponding to the second speed, the detected pressure being a pressure of the operation fluid detected by the measurement device 118.

In the hydraulic system for the work machine, the operation valve 344 is a proportional valve configured to decrease the pressure of the operation fluid applied to the travel hydraulic device 44 when the detected pressure is decreased to the predetermined pressure or less from the predetermined pressure.

The hydraulic system for the work machine includes a setup member 115 configured to set a speed of the travel hydraulic device 44 at least one of the first speed and the second speed, and the control device 310 having a first command device 310a configured to order a first operation to the proportional valve 344 when the detected pressure is decreased to the predetermined pressure or less from the setup pressure, the first operation decreasing the pressure of the operation fluid applied to the travel hydraulic device 44 and set the travel hydraulic device 44 to the first speed, and a second command device 310b configured to order a second operation to the proportional valve 344 when the setup member 115 sets the speed from the second speed to the first speed, the second operation decreasing the pressure applied to the travel hydraulic device 44 and set the travel hydraulic device 44 to the first speed.

A hydraulic system for a work machine includes the motor 29 including an engine, a hydraulic pump configured to be driven by a motive power and to output an operation fluid, the travel hydraulic device 44 configured to change a speed to a first speed and to a second speed higher than the first speed in accordance with a pressure of the operation fluid, an operation valve 344 configured to change a pressure of the operation fluid applied to the travel hydraulic device 44, and the measurement device 118 configured to detect the pressure of the operation fluid. The operation valve 344 decreases the pressure of the operation fluid applied to the travel hydraulic device 44 and sets the speed of the travel device 44 to the first speed in the case where a decreased differential pressure is equal to or more than a predetermined pressure (a threshold value), the decreased differential pressure being a difference between the detected pressure and the setup pressure corresponding to the second speed, the detected pressure being the pressure of the operation fluid detected by the measurement device 118.

The operation valve 344 is a proportional valve configured to decrease the pressure of the operation fluid applied to the travel hydraulic device 44 in the case where the decreased differential pressure between the detected pressure and the setup pressure is equal to or more than the predetermined pressure (the threshold value).

The hydraulic system for the work machine includes a setup member 115 configured to set a speed of the travel hydraulic device 44 at least one of the first speed and the second speed, and the control device 310 having a first command device 310a configured to order a first operation to the proportional valve 344 when the decreased differential pressure between the detected pressure and the setup pressure is equal to or more than the predetermined pressure (the threshold value), the first operation decreasing the pressure of the operation fluid applied to the travel hydraulic device 44 and set the travel hydraulic device 44 to the first speed, and a second command device 310b configured to order a second operation to the proportional valve 344 when the setup member 115 sets the speed from the second speed to the first speed, the second operation decreasing the pressure applied to the travel hydraulic device 44 and set the travel hydraulic device 44 to the first speed.

The first command device 310a increases a speed of decreasing the pressure applied to the travel hydraulic device 44 in comparison with the speed of the second command device 310b.

The first command device 310a orders the first operation to the operation valve in a case where a time when the detected pressure is decreased to the predetermined pressure or less (the threshold value or less) continues for a predetermined time or more or in a case where a time when the decreased differential pressure between the detected pressure and the setup pressure is equal to or more than the predetermined pressure or less (the threshold value or less) continues for a predetermined time or more.

The control device 310 changes the predetermined pressure on the basis of a temperature of the operation fluid.

The control device 310 changes the predetermined time on the basis of a temperature of the operation fluid.

The hydraulic system for the work machine includes a first fluid tube 105 connecting the hydraulic switch valve to the operation valve 344, a discharge fluid tube connected to the first fluid tube 105 or to the pressure-receiving portions of the hydraulic switch valve and configured to discharge the operation fluid of the first fluid tube 105, the first throttle 109a disposed on the discharge fluid tube, and the second throttle 109b disposed on the first fluid tube 105 being closer to the proportional valve 344 than a connecting portion connecting the first fluid tube 105 to the discharge fluid tube.

The measurement device 118 is disposed on the pressure-receiving portion of the hydraulic switch valve or on the first fluid tube 105 between the second throttle 109b and the pressure-receiving portion.

The hydraulic system for the work machine includes the brake device 130 configured to be switched between the braking state to brake the travel hydraulic device 44 and the releasing state to release the braking and to be switched from the releasing state to the braking state when the engine stall has been caused.

A hydraulic system for a work machine includes the motor 29 including an engine, a hydraulic pump configured to be driven by a motive power and to output an operation fluid, the travel hydraulic device 44 configured to change a speed to a first speed and to a second speed higher than the first speed in accordance with a pressure of the operation fluid, an operation valve 344 configured to change a pressure of the operation fluid applied to the travel hydraulic device 44, the brake device 130 configured to be switched between the braking state to brake the travel hydraulic device 44 and the releasing state to release the braking in accordance with the pressure of the operation fluid, and the operation valve 133 configured to be switched between a braking position to set the brake device 130 to the braking state and a releasing position to set the brake device 130 to the releasing state. The operation valve 344 is switched after the operation valve 133 is switched from the releasing position to the braking position when the engine stall has been caused.

The operation valve 344 is a hydraulic switch valve configured to be switched to a plurality of switching positions including the neutral position at least. When the operation valve 133 is at the braking position, the operation valve 344 is switched from the high position where the pressure of the operation fluid is higher than the neutral position to the low position where the pressure of the operation fluid is lower than the neutral position.

The hydraulic system for the work machine includes the accumulator 378 configured to suppress decreasing the pressure of the operation fluid when the engine stall has been caused, and thereby maintain the hydraulic switch valve at the high position for a predetermined time.

The hydraulic system according to the embodiment mentioned above controls the travel hydraulic device adequately even when the pressure of the operation fluid is decreased under the state where the travel hydraulic device is in the second speed.

Ninth Embodiment

Figure 38:
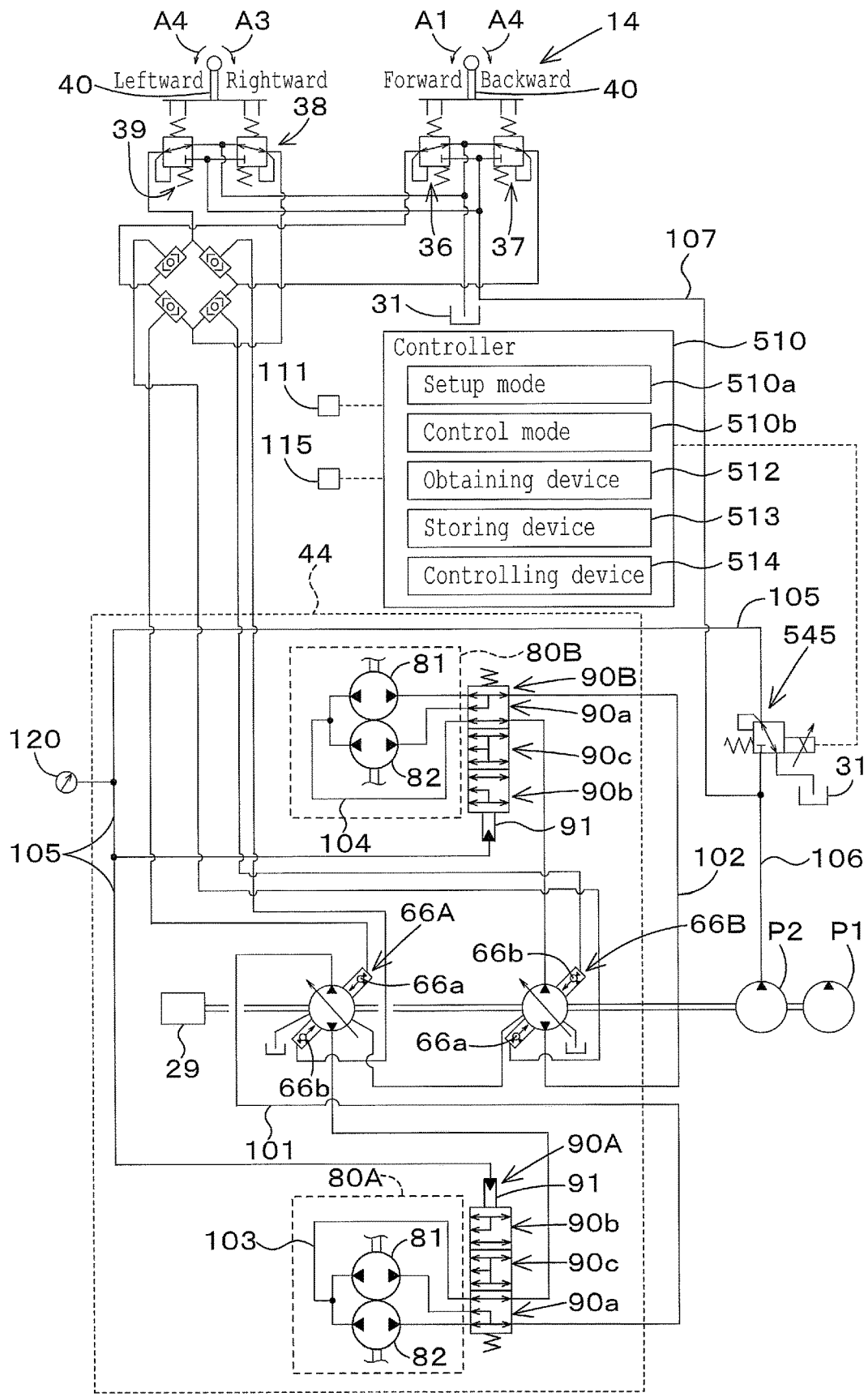
FIG. 38 is a view illustrating a hydraulic system according to a ninth embodiment of the present embodiment of the present invention.

FIG. 38 shows a hydraulic system according to a ninth embodiment. Explanations of the configurations described in the first embodiment to the eighth embodiment will be omitted. In the embodiment explained below, the machine body 2 is provided with a control valve (a hydraulic control device) for the operation device 3.

As shown in FIG. 38, the hydraulic system includes the travel hydraulic device 44 and an operation valve 545. The travel hydraulic device 44 is a device configured to change an operating state in accordance with the operation fluid outputted from the operation valve 545. In particular, the travel hydraulic device 44 is a device configured to change a speed with use of the operation fluid.

That is, the travel hydraulic device 44 changes a number of revolutions (a revolution speed) of the travel motor. In other words, the travel hydraulic device 44 is a device configured to change a thrust power for the traveling of the travel device 4. For example, the travel hydraulic device 44 is configured to change the speed to a first speed and to a second speed being higher than the first speed.

In the embodiment, the second speed is a speed higher than the first speed. Thus, the revolution speeds (the thrust powers) of the travel hydraulic device 44 is not limited to only two speeds. For example, when the revolution speeds (the thrust powers) of the travel motor is switched in five steps, the revolution speed corresponding to a predetermined step is the first speed, and the revolution speed corresponding to a step higher than the predetermined step is the second speed.

In other words, a predetermined revolution speed is the first speed (a low speed), and revolution speed higher than the predetermined revolution speed is the second speed (a high speed).

The travel hydraulic device 44 includes the first travel hydraulic pump 66A, the second travel hydraulic pump 66B, the first travel motor 80A, the second travel motor 80B, and the hydraulic switch valve 90. The hydraulic switch valve 90 and the travel hydraulic device 44 may be configured separately from each other.

The first hydraulic switch valve 90A, the second hydraulic switch valve 90B, and the operation valve 545 are connected to each other by a fluid tube (a fluid path) 105. The operation valve 545 and the second hydraulic pump P2 are connected to each other by a fluid tube (a fluid path) 106. The operation valve 545 is a valve configured to be operated to output the operation fluid on the basis of a control signal outputted from a control device 510, and is constituted of an electromagnetic proportional valve (a proportional valve) configured to change an opening aperture in accordance with the control signal, thereby changing a pressure of the operation fluid.

For example, when the operation valve 545 is closed (fully closed), the pilot pressure applied to the first hydraulic switch valve 90A and the second hydraulic valve 90B is substantially zero. As the result, the first hydraulic switch valve 90A and the second hydraulic switch valve 90B each are at the first position 90a. When the operation valve 545 is gradually opened from the closed state and thereby increase the opening aperture of the operation valve 545, the pilot pressures applied to the first hydraulic switch valve 90A and the second hydraulic switch valve 90B increase in accordance with the opening aperture of the operation valve 545.

When the opening aperture of the operation valve 545 is increased to an extent where the pilot pressures applied to the first hydraulic switch valve 90A and the second hydraulic switch valve 90B exceed a setup value, the first hydraulic switch valve 90A and the second hydraulic switch valve 90B are switched to the second position 90b through the neutral position 90c.

That is, the pilot pressures applied to the first hydraulic switch valve 90A and the second hydraulic switch valve 90B are proportional to the opening aperture of the operation valve 545, and thus the switching positions of the first hydraulic switch valve 90A and the second hydraulic switch valve 90B are changed in accordance with the opening aperture of the operation valve 545. The fluid tube 106 is branched at an upper stream portion of the operation valve, and the fluid tube 107 branched from the fluid tube 106 is connected to the travel operation device 14.

The control device 510 is a device configured to control the operation valve 545, and is constituted of a CPU and the like, for example. The control device 510 is capable of being switched at least to a setup mode 510a and to a control mode 510b. The setup mode 510a is a mode for various setup relating to the controlling. The control mode 510b is a mode for the controlling.

A switch device 111 switches the mode between the setup mode 510a and the control mode 510b. The switch device 111 is connected to the control device 510. The switch device 111 is constituted of a switch and the like. For example, the control device 510 is set to the control mode 510b in starting the engine 29, and when the switch device 111 is operated, the mode is switched from the control mode 510b to the setup mode 510a.

Meanwhile, a method for the switching between the control mode 510b and the setup mode 510a is not limited to the method described above. For convenience of the explanation, the setup mode 510a is referred to as a first mode, and the control mode 510b is referred to as a second mode.

The first mode 510a sets a relation between a pressure of the operation fluid and a control signal, the pressure being applied to the travel hydraulic device 44, the control signal being outputted by the control device 510. In the embodiment, the pressure of the operation fluid applied to the travel hydraulic device 44 is a pressure of the operation fluid applied to the hydraulic switch valve (the first hydraulic switch valve 90A and the second hydraulic switch valve 90B) of the travel hydraulic device 44.

The pressures applied to the hydraulic switch valves of the travel hydraulic device 44 is detected by a first measurement device 520 connected to the fluid tube 105. Then, the first mode 510a obtains a relation (referred to as a first relation) between the pressure of the operation fluid detected by the measurement device 520 and the control signal outputted to the operation valve 545 by the control device 510, that is, an electric current. Further, the first mode 510a stores the relation between the pressure of the operation fluid and the electric current. The mode 510b controls the operation valve 545 on the basis of the first relation.

The setup mode and the control mode will be explained below in addition to a configuration of the control device.

The control device 510 includes an obtain device 512, a storage 513, and a controller 514. Each of the obtain device 512 and the controller 514 is constituted of a computer program and the like stored in the control device 510.

The obtain device 512 is configured to be operated in the first mode 510a and to obtain the first relation between the control signal (for example, an electric current) and the pressure of the operation fluid (a detected pressure) detected by the measurement device 520. That is, when the switch device 111 sets the first mode 510a, the obtain device 512 obtains the first relation between the detected pressure and the control signal corresponding to the opening aperture of the operation valve 545.

In particular, as shown in FIG. 29, the control device 510 in the first mode 110 varies an electric current outputted to the operation valve 545 from an electric current (the minimum current) to fully close the operation valve 545 to an electric current (the maximum current) to fully open the operation valve 545.

The obtain part 512 obtains the detected pressure and an electric current value of the predetermined output electric current in the case where the output electric current is varied from the minimum current to the maximum current. That is, the obtain device 512 obtains the first relation between the detected pressure and a predetermined opening aperture (the output electric current) under a state where the operation valve 545 is changed from the fully closed state to the fully opened state. The storage 513 is configured to be operated in the first mode 510a and to store the first relation between the output pressure and the output electric current obtained by the obtain device 512.

In the embodiment described above, the obtain device 512 in the first mode 510a obtains the first relation between the detected pressure and the control signals from a control signal to fully open the operation valve 545 to a control signal to fully close the operation valve 545. However, the obtain device 512 in the first mode 510a may obtain the detected pressure and control electric currents in a predetermined range.

Figure 40:
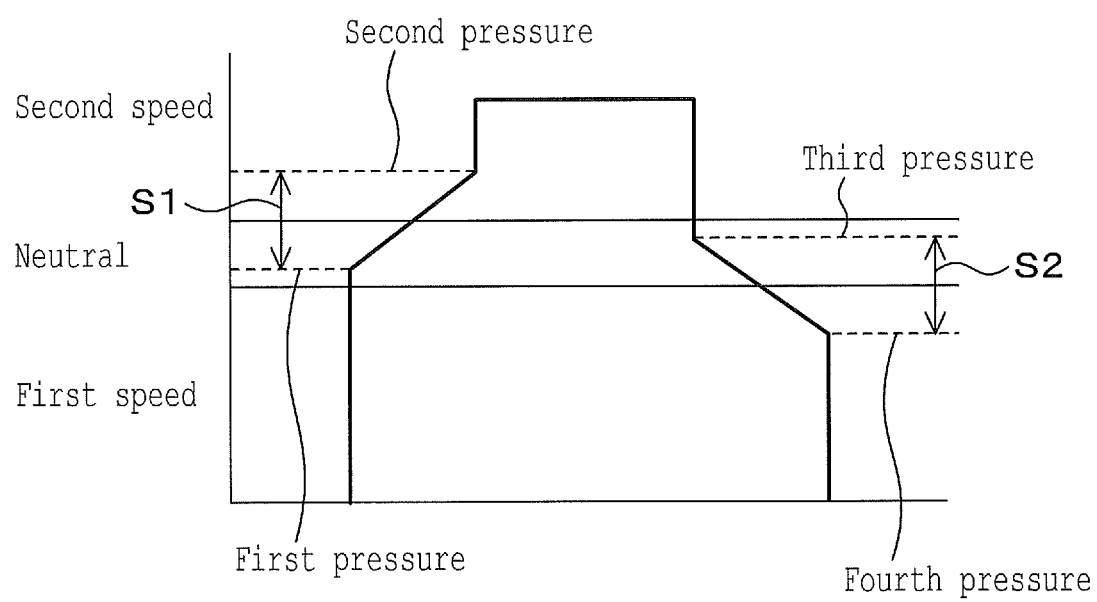
FIG. 40 is a view illustrating a pressure (a detection pressure) of a case where a speed is changed from a first speed to a second speed and from the second speed to the first speed according to the ninth embodiment.

FIG. 40 shows a transition of a pressure of a case where the speed is changed from the first speed to the second speed and from the second speed to the first speed. As shown in FIG. 40, in the case where the hydraulic switch valves (the first hydraulic switch valve 90A and the second hydraulic switch valve 90B) are switched from the first speed to the second speed, the control device 510 controls the pressures of the hydraulic switch valves to gradually change the pressure after the pressure reaches the first pressure until the pressure reaches the second pressure.

Assuming that the hydraulic switch valves are switched from the first speed to the second speed, the obtain device 512 may obtain a relation (the first relation) between the electric current and the detected pressure in a predetermined range (a first switching range S1) where the pressure of the hydraulic switch valve is increased from the first pressure to the second pressure.

That is, when the first mode 510a is set, the control device 510 varies the output electric current from a vicinity of a first electric current value corresponding to the first pressure preliminarily set to a vicinity of a second electric current value corresponding to the second pressure. The obtain device 512 obtains the detected pressure and the output electric current values in the first switch range S1 where the detected pressure is varied from the first pressure preliminarily set to the second pressure. In that case, the storage 513 stores the detected pressure and the output electric current value in the first switch range S1.

On the other hand, as shown in FIG. 40, the control device 10 controls the pressure of the hydraulic switch valve to be gradually varied for example after the pressure reaches the third pressure until the pressure reaches the fourth pressure in a case where the hydraulic switch valves (the first hydraulic switch valve 90A and the second hydraulic switch valve 90B) are switched from the second speed to the first speed.

Assuming that the hydraulic switch valve is switched from the second speed to the first speed, the obtain device 512 may obtain the relation (the first relation) between the electric current and the detected pressure in a predetermined range (a second switching range S2) where the pressure of the hydraulic switch valve is decreased from the third pressure to the fourth pressure.

That is, when the first mode 510a is set, the control device 510 varies the output electric current from a vicinity of a third electric current value corresponding to the third pressure preliminarily set to a vicinity of a fourth electric current value corresponding to the fourth pressure. The obtain device 512 obtains the detected pressure and the output electric current values in the second switch range S2 where the detected pressure is varied from the third pressure preliminarily set to the fourth pressure. In that case, the storage 513 stores the detected pressure and the output electric current value in the second switch range S2.

In the embodiment described above, the predetermined range of the case where the hydraulic switch valve is switched from the first speed to the second speed is the range (the first switch range S1) where the detected pressure changes from the first pressure to the second pressure. However, the predetermined range is not limited to the range mentioned above.

The predetermined range of the case where the hydraulic switch valve is switched from the second speed to the first speed is the range (the second switch range S2) where the detected pressure changes from the third pressure to the fourth pressure. However, the predetermined range is not limited to the range mentioned above. For example, in each of a case where the speed is increased from the first speed to the second speed and a case where the speed is decreased from the second speed to the first speed, the predetermined range may be a range (a range of use) of the pressure of the operation fluid applied to the hydraulic switch valve.

The controller 514 is configured to operate in the second mode 510b, and controls the operation valve 545. In particular, the operation member 115 is connected to the control device 510. In a case where the hydraulic switch valve is set to the first speed or the second speed, the controller 514 outputs the control signal to the operation valve 545 in accordance with the first relation between the pressure of the operation fluid (the detected pressure) and the control signal (the electric current) obtained by the obtain device 512.

In particular, the controller 514 in the second mode 510b refers to the output electric current value corresponding to the first switch range S1 in changing the hydraulic switch valves (the first hydraulic switch valve 90A and the second hydraulic switch valve 90B) from the first speed to the second speed in accordance with the operation of the operation member 115 (in changing the travel motors (the first travel motor 80A and the second travel motor 80B) from the first speed to the second speed), and thus outputs the output electric current value to the operation valve 545, the output electric current value being shown in the first switch range S1. That is, the controller 514 controls the operation valve 545 in accordance with the relation between the detected pressure and the output electric current value in the second switch range S2 stored in the storage 513.

Figure 39:
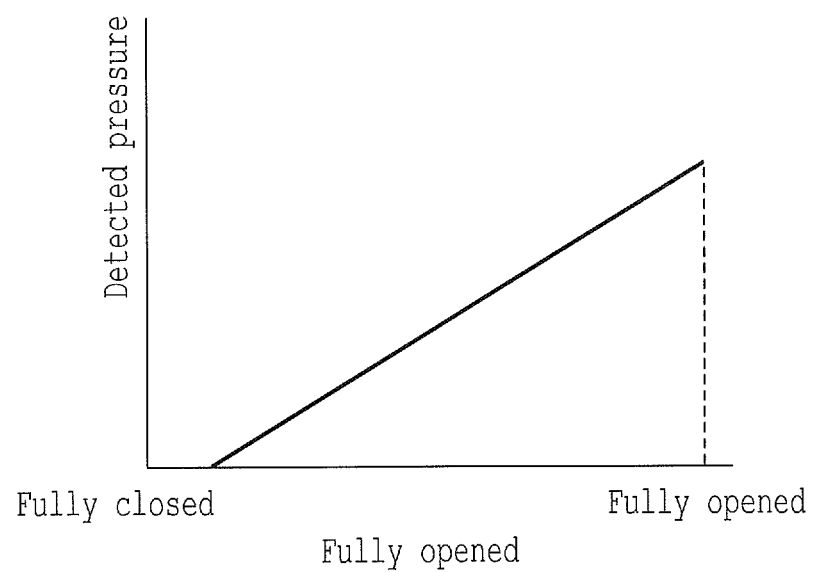
FIG. 39 is a view illustrating a first relation between an output electric current and a detection pressure according to the ninth embodiment, the relation being obtained in a case where an operation valve is fully opened from a fully closed state.

In addition, the controller 514 in the second mode 510b refers to the output electric current value corresponding to the second switch range S2 in changing the travel motors from the second speed to the first speed in accordance with the operation of the operation member 115, and thus outputs the output electric current value to the operation valve 545, the output electric current value being shown in the second switch range S2. That is, the controller 514 controls the operation valve 545 in accordance with the relation between the detected pressure and the output electric current value in the second switch range S2 stored in the storage 513. Meanwhile, the controller 514 may control the operation valve 545 in accordance with the first relation shown in FIG. 39, and thus the travel motor maintains the first speed and maintains the second speed.

For example, the control device 510 is set to the setup mode (the first mode) 510a in the manufacture, the delivery, the maintenance, and the like of the work machine 1. In this manner, the obtain device 532 obtains the first relation between the control signal outputted to the operation valve 545 and the pressure of the operation fluid detected by the measurement device 520, and then the storage 513 stores the obtained relation.

After the obtain device 512 obtains the first relation between the control signal and the pressure of the operation fluid, the control signal is outputted to the operation valve 545 in accordance with the first relation in the control mode (the second mode) 510b, and thereby the unevenness of operability is suppressed in every work machine 1 and the operability of the traveling can be constant. In particular, the travel motor is switched to the first speed or the second speed in accordance with the opening aperture of the operation valve 545, and thus an operability of the switching to the first speed and to the second speed can be constant.

In a case where the travel motor is changed from the first speed to the second speed, the control device 510 controls the operation valve 545 in accordance with the relation between the pressure of the operation fluid and the control signal corresponding to the predetermined range. In this manner, an operability of switching (speeding up) the travel motor from the first speed to the second speed can be improved.

And, in a case where the travel motor is changed from the second speed to the first speed, the control device 510 controls the operation valve 545 in accordance with the relation between the pressure of the operation fluid and the control signal corresponding to the predetermined range. In this manner, an operability of switching (speeding down) the travel motor from the second speed to the first speed can be improved.

Further, the hydraulic system employs the relation between the pressure and the control signal in a case where the operation valve 545 is operated to be switched from the first speed to the second speed (a case where the operation valve is operated toward one direction), and employs the relation between the pressure and the control signal in a case where the operation valve 545 is operated to be switched from the second speed to the first speed (a case where the operation valve is operated toward the other direction). Thus, the pressure of the hydraulic switch valves and the like can be controlled adequately even when the operation valve 545 has the hysteresis.

As described above, the hydraulic system according to the embodiment is capable of suppressing the unevenness of operability in every work machine.

Tenth Embodiment

Figure 41:
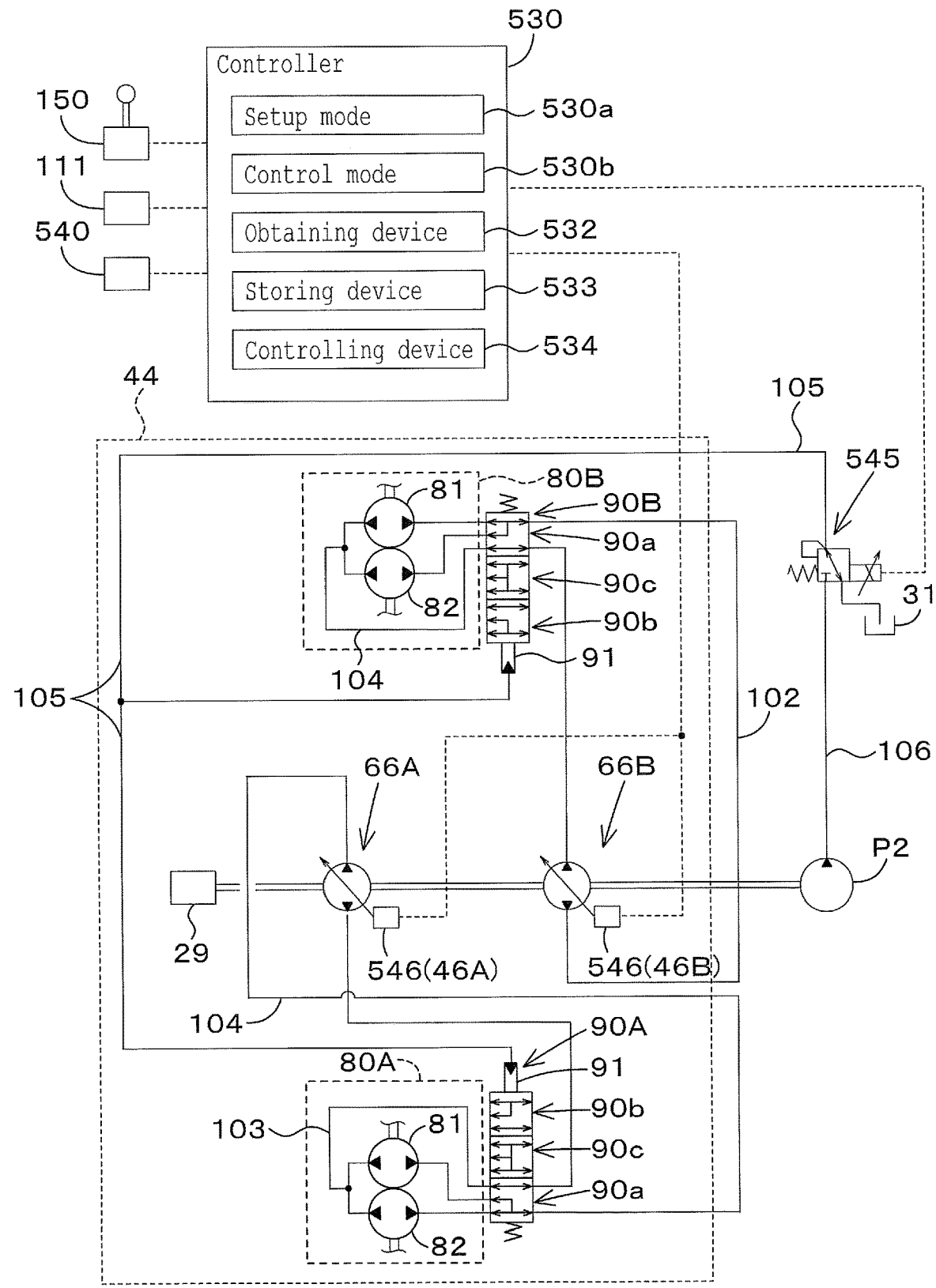
FIG. 41 is a view illustrating a hydraulic system according to a tenth embodiment of the present invention.

FIG. 41 shows a hydraulic system according to a tenth embodiment. The hydraulic system for traveling according to the tenth embodiment can be applied to the hydraulic system according to the ninth embodiment. The tenth embodiment omits explanations of the configurations similar to the configurations according to the above-mentioned embodiments.

In the above-mentioned embodiments, the first travel hydraulic pump 66A and the second travel hydraulic pump 66B are operated by the remote control valves 36, 37, 38, and 39. However, in the tenth embodiment, the first travel hydraulic pump 66A and the second travel hydraulic pump 66B are operated by an operation valve 546A and an operation valve 546B.

The operation valve 546A and the operation valve 546B are electromagnetic proportional valves (proportional vales) configured to change an opening aperture in accordance with a control signal. A swash plate of the first travel hydraulic pump 66A is moved on the basis of an operation of the operation valve 546A. A swash plate of the second travel hydraulic pump 66B is moved on the basis of an operation of the operation valve 546B. The opening apertures of the operation valve 546A and the operation valve 546B can be changed in accordance with the operation of the operation member.

The control device 530 is a device configured to control the operation valve 546A and the operation valve 546B, and for example is constituted of a CPU and the like. The control device 530 is configured to be switched at least between a setup mode 530a and a control mode 530b. The setup mode 530a is a mode provided for various settings of the control. The control mode 530b is a mode provided for the control. The switch device 111 switches the control device 530 between the setup mode 530a and the control mode 530b, the switch device 111 being connected to the control device 530.

The first mode 530a sets a relation between the revolution speed of the travel hydraulic device 44 and the control signal outputted to the operation valves 546 (the operation valve 546A and the operation valve 546B) by the control device 530. The revolution speed of the travel hydraulic device 44 is a revolution speed is the travel motors (the first travel motor 80A and the second travel motor 80B) in the embodiment. The revolution speed of the travel hydraulic device 44 is detected by the measurement device 540. The measurement device 540 is configured to detect a speed of an output shaft of the travel motor.

Further, the first mode 530a obtains a relation (referred to as a second relation) between the revolution speed detected by the measurement device 540 and a control signal (that is, an electric current) outputted to the operation valve 546 by the control device 530, and then stores the relation between the electric current and the revolution speed of the travel motor. The control mode 530b controls the operation valve 546 in accordance with the second relation.

The setup mode and the control mode will be explained below in addition to a configuration of the control device 530.

The control device 530 includes an obtain device 532, a storage 533, and a controller 534. The obtain device 532 and the controller 534 are constituted of a computer program and the like stored in the control device 530.

The obtain device 532 is configured to be operated in the first mode 530a, and obtains the second relation between the control signal (for example, an electric current) and the revolution speed detected by the measurement device 540 (a detected revolution speed).

When the switch device 111 sets the control device 530 to the first mode 30a, the obtain device 532 obtains the second relation between the detected revolution speed and the control signal outputted to the operation valve 546. In particular, the control device 530 in the first mode 530a changes the electric current outputted to the operation valve 546 (an output electric current) from the minimum value to the maximum value.

Figure 42A:
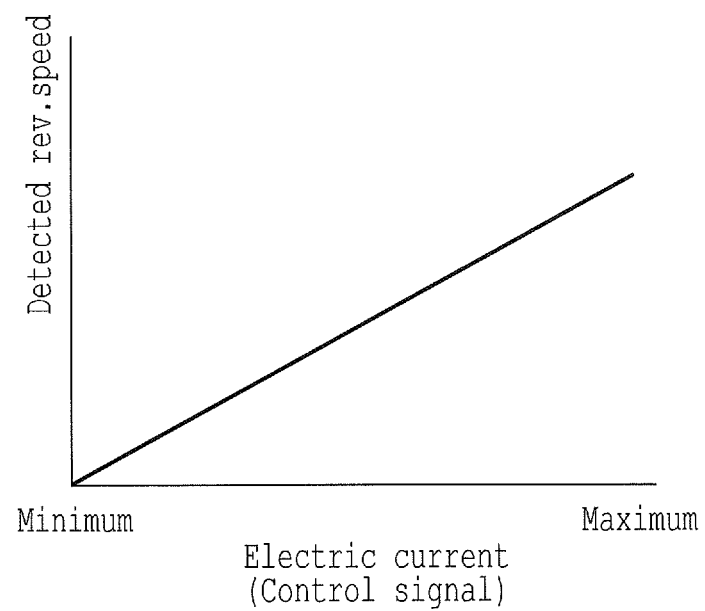
FIG. 42A is a view illustrating a detected revolution speed of a case where an output electric current (a swash plate) is changed from the minimum current to the maximum current according to the tenth embodiment.

As shown in FIG. 42A, in a case where the output electric current is changed from the minimum value to the maximum value, the obtain device 532 obtains the detected revolution speed and an electric current of a predetermined output electric current. That is, the obtain device 532 obtains the second relation between the output electric current and the detected revolution speed, the relation being provided for a case where the angle of the swash plate of the travel hydraulic pump is changed from the minimum angle (at the minimum output electric current) to the maximum angle (at the maximum output electric current).

The storage 533 is configured to be operated in the first mode 530a, and obtains a relation (the second relation) between the detected revolution speed and the output electric current obtained by the obtain device 532.

Figure 42B:
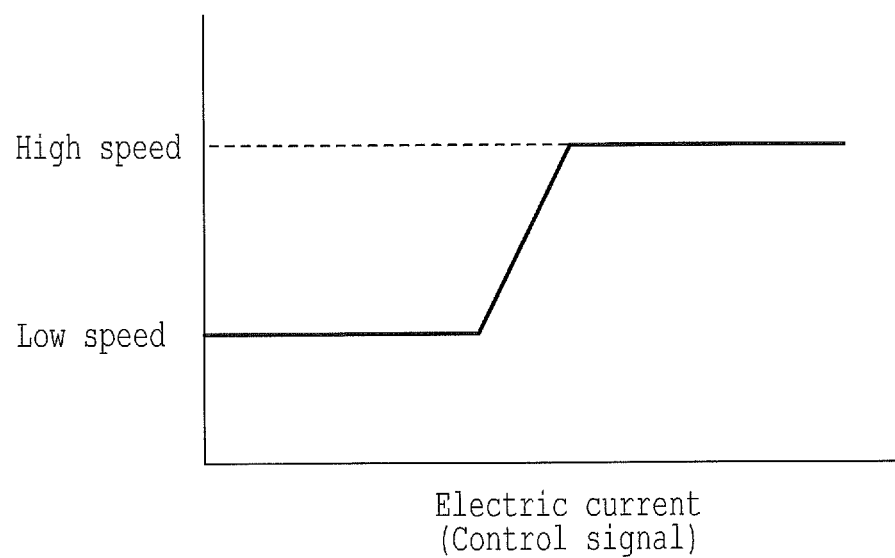
FIG. 42B is a view illustrating a relation between an output electric current and a detected revolution speed according to the tenth embodiment, the relation being obtained in a case where a speed is changed from a low speed to a high speed.

In particular, in a case where the revolution speeds of the travel motors (the first travel motor 80A and the second travel motor 80B) are increased (in a case where the revolution speed of the travel motor is increased from the high speed to the low speed), the obtain device 532 may obtain the second relation between the detected revolution speed and the output electric current in a predetermined range between the low speed and the high speed as shown in FIG. 42B.

The storage 533 stores the second relation shown in FIG. 42B. The low speed means a low revolution speed of the travel motor, and the high speed means a high revolution speed of the travel motor. The low speed may correspond to a range of the revolution speed preliminarily, and the high speed also may correspond to another range of the revolution speed preliminarily. For example, the low speed may correspond to a speed less than a half of the maximum revolution speed of the travel motor, and the high speed may correspond to a speed equal to or more than a half of the maximum revolution speed of the travel motor. However, the speed and the range regarding the low speed and the high speed are not limited to the above-mentioned speed and the range.

Figure 42C:
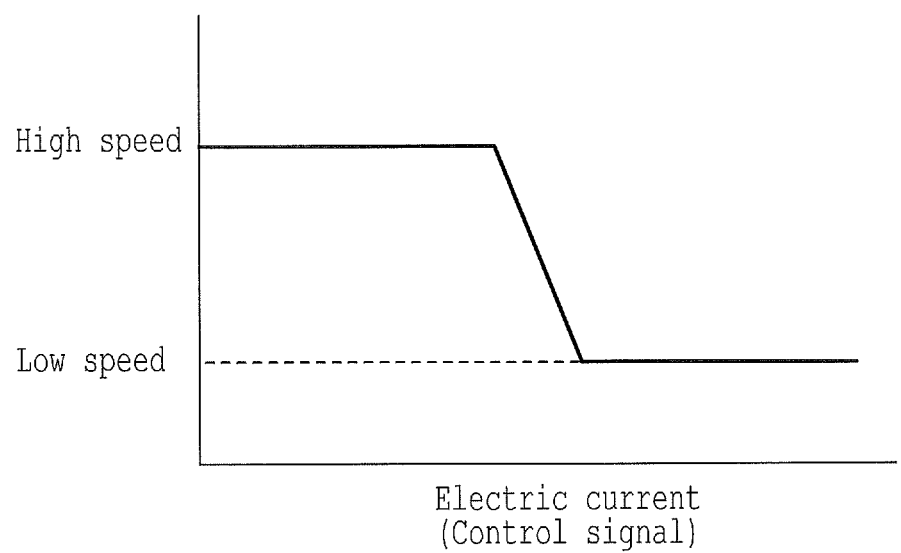
FIG. 42C is a view illustrating a relation between the output electric current and the detected revolution speed according to the tenth embodiment, the relation being obtained in a case where the speed is changed from the high speed to the low speed.

In addition, in a case where the revolution speeds of the travel motors (the first travel motor 80A and the second travel motor 80B) are decreased (in a case where the revolution speed of the travel motor is decreased from the high speed to the low speed), the obtain device 532 may obtain the second relation between the detected revolution speed and the output electric current in a predetermined range between the high speed and the low speed as shown in FIG. 42C. The storage 533 stores the second relation shown in FIG. 42C.

The controller 534 is configured to operate in the second mode 530b, and controls the operation valve 546. In particular, the operation member 150 is connected to the control device 530. The operation member 150 is a member for operating the operation valve 546. The operation member 150 is a lever and the like configured to be swingable.

When the operation member 150 is operated, the controller 534 outputs the control signal to the operation valve 546 in accordance with the second relation between the detected revolution speed and the control signal (an electric current) obtained by the obtain device 532.

In particular, the controller 534 in the second mode 530b outputs the control signal to the operation valve 546 in accordance with an operation extent (an operation amount) of the operation member 150. When the operation member 150 is swung from the neutral position toward one direction or the other direction, the controller 534 increases the angle of the swash plate of the travel motor.

That is, in a case where the operation member 150 is swung from the neutral position toward a direction or another direction, the controller 534 determines that the revolution speed of the travel motor is to be increased. Then, referring to the storage 533, the controller 534 outputs the control signal to the operation valve 546, the control signal corresponding to a predetermined range from the low speed to the high speed.

The controller 534 in the second mode 530b outputs the control signal to the operation valve 546 in accordance with the operation extent (the operation amount) of the operation member 150. When the operation member 150 is swung from a position in one direction or a position in the other direction toward the neutral position, the controller 534 decreases the angle of the swash plate of the travel motor.

That is, when the operation member 150 is swung from a position in one direction or a position in the other direction toward the neutral position, the controller 534 determines that the revolution speed of the travel motor is to be decreased. Then, referring to the storage 533, the controller 534 outputs the control signal to the operation valve 546, the control signal corresponding to a predetermined range from the high speed to the low speed.

For example, the control device 530 is set to the setup mode (the first mode) 530a in the manufacture, the delivery, the maintenance, and the like of the work machine 1. In this manner, the obtain device 532 obtains the second relation between the control signal outputted to the operation valve 546 and the revolution speed of the travel motor detected by the measurement device 540, and then the storage 533 stores the obtained relation.

After the obtain device 532 obtains the second relation between the control signal and the revolution speed of the travel motor, the control signal is outputted to the operation valve 546 in accordance with the second relation in the control mode (the second mode) 530b, and thereby the unevenness of operability is suppressed in every work machine 1 and the operability of the traveling can be constant. In particular, the travel hydraulic pump changes the angle of the swash plate in accordance with the opening aperture of the operation valve 546, and thus an operability of the speed increasing and the speed decreasing can be constant.

In a case where the revolution speed of the travel motor is increased, the control device 530 controls the operation valve 546 in accordance with the relation between the revolution speed of the travel motor and the control signal in a predetermined range from the low speed to the high speed. In this manner, an operability of increasing the revolution speed of the travel motor can be improved.

In a case where the revolution speed of the travel motor is decreased, the control device 530 controls the operation valve 46 in accordance with the relation between the revolution speed of the travel motor and the control signal in a predetermined range from the high speed to the low speed. In this manner, an operability of decreasing the revolution speed of the travel motor can be improved.

Figure 43:
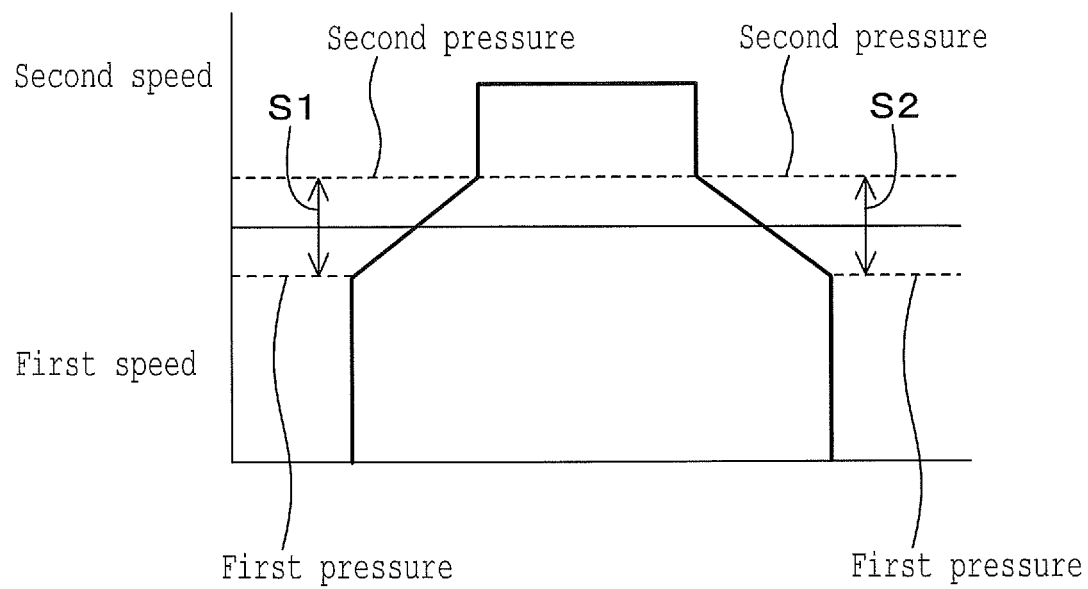
FIG. 43 is a view illustrating a pressure (a detection pressure) of a case where the speed is changed without a neutral position from a first speed to a second speed and from the second speed to the first speed according to the tenth embodiment.

The hydraulic switch valves mentioned above (the first hydraulic switch valve 90A and the second hydraulic switch valve 90B) have the neutral position 90c. Instead of that, the hydraulic switch valve may be a valve having no neutral position, that is, a switch valve configured to be switched to the first position 90a and to the second position 90b. In that case, FIG. 43 shows the pressures (the detected pressure) of a case where the travel motor is switched from the first speed to the second speed and a case where the travel motor is switched from the second speed to the first speed.

Figure 44:
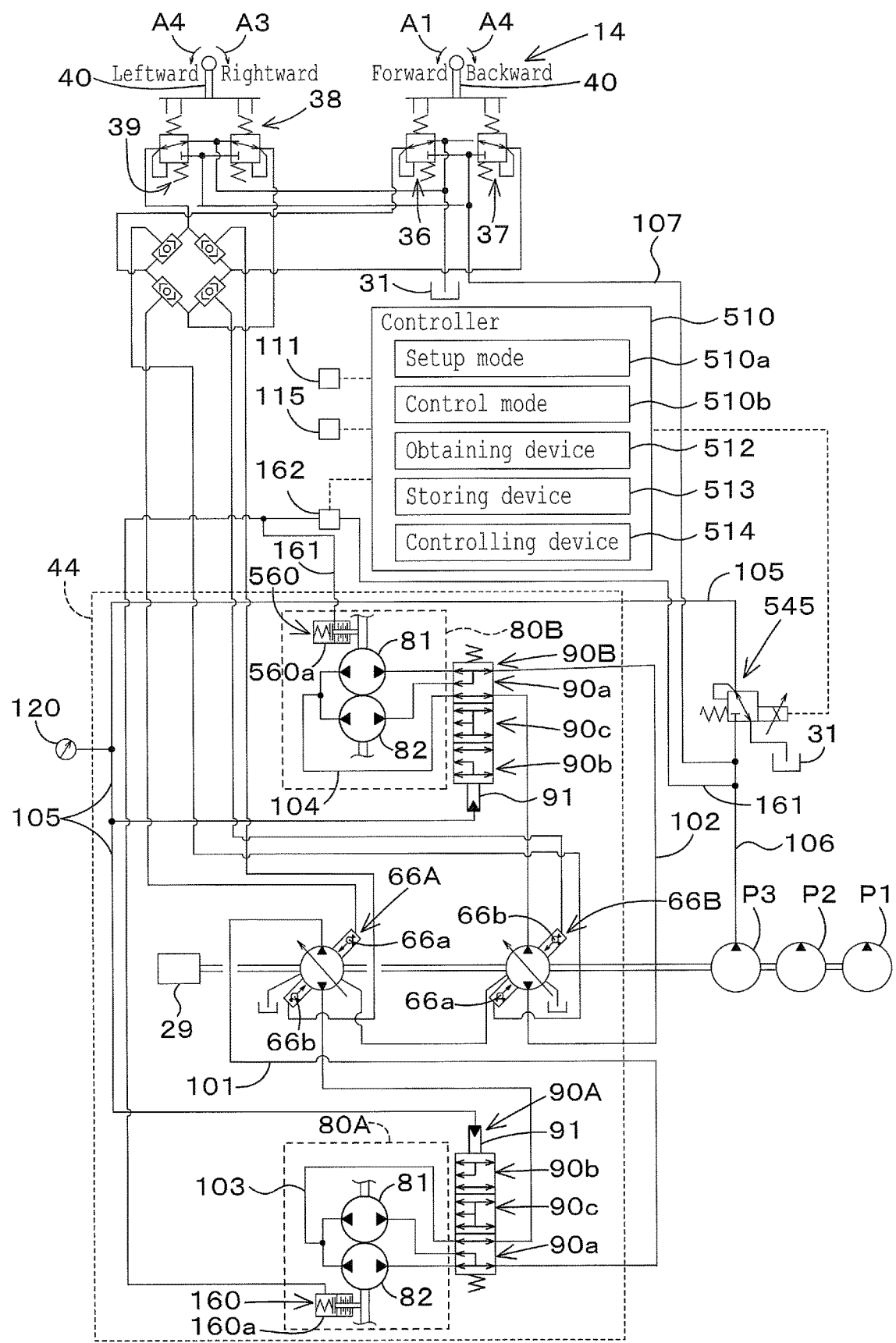
FIG. 44 is a view illustrating a hydraulic system that includes a brake device according to the tenth embodiment.

In addition, as shown in FIG. 44, the hydraulic system described above may include a brake device 560. The brake device 560 is configured to be switched between a braking state to brake the travel hydraulic device 44 and a releasing state to release the braking state.

The braking device 560 brakes the travel motors (the first travel motor 80A and the second travel motor 80B). The brake device 560 includes a first disc, a second disc, and a spring. The first disc is disposed on an output shaft of the first travel motor 80A. The second disc is movable. The spring is configured to press the second disc to the first disc. In addition, the braking device 560 includes a housing (a housing case) 560a configured to house the first disc, the second disc, and the spring. In the housing 560a, a fluid tube 161 is connected to a storage that stores the second disc.

A fluid tube 106 is connected to the fluid tube 161, and thereby the operation fluid is supplied to the storage of the housing 560a. The operation valve 162 is connected to the fluid tube 161, the operation valve 162 being openable and closable. The operation valve 162 is controlled by the control device 510. When the control device 510 controls the operation valve 162 to open the operation valve 162, the operation fluid is supplied to the storage of the housing 560a. When the pressure of the operation fluid is a predetermined pressure or more in the storage, the second disc moves to a side opposite to a side for the braking (a side opposite to a pressing direction of the spring), and thus the brake device 560 releases the braking.

When the control device 510 controls the operation valve 162 to close the operation valve 162, the pressure of the pilot fluid is decreased in the storage of the housing 560a. When the pressure of the operation fluid is equal to or less than the predetermined pressure (a threshold value) in the storage, the second disc moves to a side for pressing the second disc to the first disc, and thus the brake device 560 provides the braking.

The control device 510 in the first mode 510a closes the operation valve 162 to set the brake device 560 to the braking state. In addition, the control device 510 in the second mode 510b releases the operation valve 162 in a case where the operation member such as the travel lever 40 is operated, and thereby the brake device 560 releases the braking state.

The control device 510 closes the operation valve 162 when the control mode if in the second mode 510b and the operation member such as the travel lever 40 is not operated. In this manner, the brake device 560 carried out the braking. Thus, the relation between the control signal and a pressure of the operation fluid can be obtained under a state where the work machine 1 is braked so as not to travel.

FIG. 44 exemplifies the configuration of the first embodiment in the explanation. However, the configuration of the second embodiment can be applied to the embodiment. That is, the above-mentioned operations of the braking device 560 and the control device can be applied to the hydraulic system according to the second embodiment.

The above-mentioned embodiment exemplifies the cam motor (the radial piston motor) as the travel motor. However, the travel motor is not limited to the above-mentioned motor, and may be a piston motor other than the radial piston motor and any of other motors.

A hydraulic system for a work machine includes a hydraulic pump configured to output an operation fluid, an operation valve configured to change a pressure of the operation fluid, a travel hydraulic device 44 configured to change an operation state in accordance with the operation fluid of the operation valve, a measurement device 520 configured to detect a pressure of the operation fluid applied to the travel hydraulic device 44, and a control device 510. The control device 510 includes an obtain device 512 configured to obtain a relation between a control signal and the pressure of the operation fluid detected by the measurement device 520, a storage 513 configured to store the relation between the control signal and the pressure of the operation fluid, the relation being obtained by the obtain device 512, and a controller 514 configured to control the operation valve on the basis of the relation stored in the storage 513. The hydraulic system for the work machine further includes a switch device 111 configured to be switched between a first mode to operate the obtain device 512 and the storage 513 and a second mode to operate the controller 514.

The obtain device 512 obtains a relation between the pressure of the operation fluid and the control signal corresponding to an opening aperture of the operation valve in the first mode.

The operation valve is a proportional valve configured to change the pressure of the operation fluid. The travel hydraulic device 44 includes a travel motor configured to be switched to a first speed and to a second speed in accordance with the opening aperture of the proportional valve. The measurement device 520 detects the pressure of the operation fluid applied to the travel pressure device 44.

The obtain device 512 in the first mode obtains a relation between the pressure of the operation fluid and the control signal corresponding to a predetermined range. The controller 514 in the second mode controls the proportional valve on the basis of the relation between the pressure of the operation fluid and the control signal corresponding to the predetermined range in changing the travel motor from the first speed to the second speed.

The obtain device 512 in the first mode obtains a relation between the pressure of the operation fluid and the control signal corresponding to a predetermined range. The controller 514 in the second mode controls the proportional valve on the basis of the relation between the pressure of the operation fluid and the control signal corresponding to the predetermined range in changing the travel motor from the second speed to the first speed.

The hydraulic system includes a brake device configured to be switched between a braking state to brake the travel hydraulic device 44 and a releasing state to release the braking state, and to be switched to the braking state in the first mode.

A hydraulic system for a work machine includes a hydraulic pump configured to output an operation fluid, an operation valve configured to change a pressure of the operation fluid, a travel hydraulic device 44 configured to change a revolution speed in accordance with the operation fluid of the operation valve, a measurement device 540 configured to detect the revolution speed of the travel hydraulic device 44 in operation, and a control device 530. The control device 530 includes an obtain device 532 configured to obtain a relation between a control signal and the revolution speed of the travel hydraulic device 44 detected by the measurement device 540, a storage 533 configured to store the relation between the control signal and the revolution speed of the travel hydraulic device 44, the relation being obtained by the obtain device 532, and a controller 534 configured to control the operation valve on the basis of the relation stored in the storage 533. The hydraulic system for the work machine further includes a switch device 111 configured to be switched between a first mode to operate the obtain device 532 and the storage 533 and a second mode to operate the controller 534.

The operation valve is a proportional valve configured to change the pressure of the operation fluid. The travel hydraulic device 44 includes a travel hydraulic pump configured to change an angle of a swash plate in accordance with an operation of the proportional valve, and a travel motor configured to change the revolution speed in accordance with the angle of the swash plate of the travel hydraulic pump. The measurement device 540 detects the revolution speed of the travel motor in operation of the travel hydraulic pump.

The obtain device 532 in the first mode obtains the relation between the control signal and the revolution speed of the travel motor, the relation being provided for a case where the revolution speed of the travel motor is increased. And, the controller 534 in the second mode controls the proportional valve on the basis of the relation in a case where the revolution speed of the travel motor is increased.

The obtain device 532 in the first mode obtains the relation between the control signal and the revolution speed of the travel motor, the relation being provided for a case where the revolution speed of the travel motor is decreased. And, the controller 534 in the second mode controls the proportional valve on the basis of the relation in a case where the revolution speed of the travel motor is decreased.

As described above, the hydraulic system according to the embodiment is capable of suppressing the unevenness of operability in every work machine.

In the above description, the embodiment of the present invention has been explained. However, all the features of the embodiments disclosed in this application should be considered just as examples, and the embodiments do not restrict the present invention accordingly. A scope of the present invention is shown not in the above-described embodiments but in claims, and is intended to include all modifications within and equivalent to a scope of the claims.

What is claimed is:

1. A control method for a hydraulic system in a work machine, the hydraulic system comprising:
a hydraulic pump to output an operation fluid;
a hydraulic switch valve to be switched among switching positions in accordance with a pilot pressure of the operation fluid;
a proportional valve to change the pilot pressure of the operation fluid applied to the hydraulic switch valve;
a travel hydraulic device to change a travel speed in accordance with the switching positions of the hydraulic switch valve;
the hydraulic switch valve being switched among a first switching position allowing the travel speed to be a first speed, a second switching position allowing the travel speed to be a second speed greater than the first speed, and a neutral position between the first switching position and the second switching position; and
a controller to control the proportional valve,
the control method comprising:
immediately increasing the pilot pressure from a bottom pressure to a first intermediate pressure;
gradually increasing the pilot pressure from the first intermediate pressure to a second intermediate pressure; and
immediately increasing the pilot pressure from the second intermediate pressure to a top pressure.

2. The control method according to claim 1, wherein
the pilot pressure is increased from the bottom pressure to the first intermediate pressure at a first rate,
the pilot pressure is increased from the first intermediate pressure to the second intermediate pressure at a second rate,
the pilot pressure is increased from the second intermediate pressure to the top pressure at a third rate, and
the second rate is less than the first rate and the third rate.

3. The control method according to claim 1, wherein
the bottom pressure is the pilot pressure applied to the hydraulic switch valve when the proportional valve is fully closed,
the first intermediate pressure allows the hydraulic switch valve to be switched to the neutral position,
the second intermediate pressure allows the hydraulic switch valve to be switched to the second position, and
the top pressure is the pilot pressure applied to the hydraulic switch valve when the proportional valve is fully opened.

4. The control method according to claim 1, further comprising:
immediately decreasing the pilot pressure from the top pressure to a fourth intermediate pressure;
gradually decreasing the pilot pressure from the fourth intermediate pressure to a fifth intermediate pressure; and
immediately decreasing the pilot pressure from the fifth intermediate pressure to the bottom pressure.

5. The control method according to claim 4, wherein
the pilot pressure is decreased from the top pressure to the fourth intermediate pressure at a fourth rate,
the pilot pressure is decreased from the fourth intermediate pressure to the fifth intermediate pressure at a fifth rate,
the pilot pressure is decreased from the fifth intermediate pressure to the bottom pressure at a sixth rate, and
the fifth rate is less than the fourth rate and the sixth rate.

6. The control method according to claim 5, wherein
the second rate is less than the fifth rate.

7. The control method according to claim 4, wherein
the fourth intermediate pressure allows the hydraulic switch valve to be switched to the neutral position, and
the fifth intermediate pressure allows the hydraulic switch valve to be switched to the first switching position.

8. A control method for a hydraulic system in a work machine, the hydraulic system comprising:
a hydraulic pump to output an operation fluid;
a hydraulic switch valve to be switched among switching positions in accordance with a pilot pressure of the operation fluid;
a proportional valve to change the pilot pressure of the operation fluid applied to the hydraulic switch valve;
a travel hydraulic device to change a travel speed in accordance with the switching positions of the hydraulic switch valve;
the hydraulic switch valve being switched among a first switching position allowing the travel speed to be a first speed, a second switching position allowing the travel speed to be a second speed greater than the first speed, and a neutral position between the first switching position and the second switching position; and
a controller to control the proportional valve,
the control method comprising:
immediately decreasing the pilot pressure from a top pressure to a fourth intermediate pressure;
gradually decreasing the pilot pressure from the fourth intermediate pressure to a fifth intermediate pressure; and
immediately decreasing the pilot pressure from the fifth intermediate pressure to a bottom pressure.

9. The control method according to claim 8, wherein
the pilot pressure is decreased from the top pressure to the fourth intermediate pressure at a fourth rate,
the pilot pressure is decreased from the fourth intermediate pressure to the fifth intermediate pressure at a fifth rate,
the pilot pressure is decreased from the fifth intermediate pressure to the bottom pressure at a sixth rate, and
the fifth rate is less than the fourth rate and the sixth rate.

10. The control method according to claim 8, wherein
the bottom pressure is the pilot pressure applied to the hydraulic switch valve when the proportional valve is fully closed,
the fourth intermediate pressure allows the hydraulic switch valve to be switched to the neutral position,
the fifth intermediate pressure allows the hydraulic switch valve to be switched to the first position, and
the top pressure is the pilot pressure applied to the hydraulic switch valve when the proportional valve is fully opened.

* * * * *